US011874930B2

(12) United States Patent
Rieger et al.

(10) Patent No.: US 11,874,930 B2
(45) Date of Patent: Jan. 16, 2024

(54) ANOMALY DETECTION FOR CYBER-PHYSICAL SYSTEMS

(71) Applicant: BATTELLE ENERGY ALLIANCE, LLC, Idaho Falls, ID (US)

(72) Inventors: Craig G. Rieger, Pocatello, ID (US); Timothy R. McJunkin, Idaho Falls, ID (US)

(73) Assignee: Battelle Energy Alliance, LLC, Idaho Falls, ID (US)

(*) Notice: Subject to any disclaimer, the term of this patent is extended or adjusted under 35 U.S.C. 154(b) by 74 days.

(21) Appl. No.: 17/027,463

(22) Filed: Sep. 21, 2020

(65) Prior Publication Data
US 2021/0089661 A1  Mar. 25, 2021

Related U.S. Application Data

(60) Provisional application No. 62/902,885, filed on Sep. 19, 2019.

(51) Int. Cl.
*G06F 21/57* (2013.01)
*G06F 11/07* (2006.01)
*G06F 11/34* (2006.01)
*G06F 21/71* (2013.01)

(52) U.S. Cl.
CPC ........ *G06F 21/577* (2013.01); *G06F 11/0754* (2013.01); *G06F 11/3466* (2013.01); *G06F 21/71* (2013.01)

(58) Field of Classification Search
CPC .............. G06F 21/577; G06F 11/0754; G06F 11/3466; G06F 21/71; G06F 11/0736; G06F 21/554; G06F 11/0751; G06F 2221/034; G05B 23/024
See application file for complete search history.

(56) References Cited

U.S. PATENT DOCUMENTS

| | | | |
|---|---|---|---|
| 2018/0329593 A1* | 11/2018 | Mehta | G05B 23/0272 |
| 2020/0159624 A1* | 5/2020 | Malkov | G06N 20/00 |
| 2020/0175171 A1* | 6/2020 | Rieger | H04L 63/1433 |
| 2020/0195007 A1* | 6/2020 | Sun | G01R 31/086 |

(Continued)

OTHER PUBLICATIONS

O. Linda, M. Manic, T. Vollmer and J. Wright, "Fuzzy logic based anomaly detection for embedded network security cyber sensor," 2011 IEEE Symposium on Computational Intelligence in Cyber Security (CICS), 2011, pp. 202-209, doi: 10.1109/CICYBS.2011.5949392.

(Continued)

*Primary Examiner* — Tae K Kim

(57) ABSTRACT

An anomaly detector is configured to construct cyber and/or physical features comprising information configured to characterize the cyber and/or physical state of a cyber-physical system. The physical features may be based on physical and/or physics-based relationships between a plurality of physical state attributes. A health of the cyber-physical system may be based on an error between estimates of one or more of the physical state attributes and measurements of the one or more physical state attributes. The relationships may be incorporated into machine learning membership functions used to classify cyber and/or physical behavior of the system.

21 Claims, 11 Drawing Sheets

(56) References Cited

U.S. PATENT DOCUMENTS

2020/0210263 A1* 7/2020 Lavrentyev ......... G06F 18/2148
2020/0233956 A1* 7/2020 Wang .................... B60L 53/305

OTHER PUBLICATIONS

T. Vollmer, M. Manic and O. Linda, "Autonomic Intelligent Cyber-Sensor to Support Industrial Control Network Awareness," in IEEE Transactions on Industrial Informatics, vol. 10, No. 2, pp. 1647-1658, May 2014, doi: 10.1109/TII.2013.2270373.
A. Zadeh, Fuzzy sets, Information and Control, vol. 8, Issue 3, 1965, pp. 338-353, ISSN 0019-9958, https://doi.org/10.1016/S0019-9958(65)90241-X.

* cited by examiner

ANOMALY DETECTION FOR CYBER-PHYSICAL SYSTEMS

CROSS REFERENCE TO RELATED APPLICATIONS

This application claim priority to U.S. Provisional Patent Application No. 62/902,885 filed Sep. 19, 2019, which is hereby incorporated by reference.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

TECHNICAL FIELD

This disclosure relates to systems, methods, apparatus, and/or non-transitory computer-readable storage media for securing cyber-physical systems.

BACKGROUND

A control system may be configured to monitor and/or control a process (e.g., a physical process, such as an industrial process, a chemical processes, a manufacturing process, a power generation and/or distribution process, and/or the like). Controlling a physical process may involve a number of complex, inter-related, and potentially dangerous operations. Moreover, the physical process managed by a control system may involve potentially hazardous materials and conditions (e.g., chemicals, radioactive materials, high temperatures, and/or the like). Unauthorized or malicious access to a control system may have serious consequences, including damage to the physical process, harm to personnel, release of potentially dangerous materials, and so on.

Many control systems lack security perimeter protections needed to defend against inadvertent access and/or cyber-attack. Conventional security anomaly detection means that primarily on cyber behavior can be exploited by attackers (e.g., by conforming cyber attacks to certain network traffic patterns). Although it may be possible to model the physical state of a facility for anomaly detection, the development of such models can require extensive engineering efforts, are not scalable, and are not suitable for integration with other cyber-based anomaly detection means. What is needed, therefore, are means for anomaly detection based on integrated cyber and physical state data and in particular, means for integrating scalable, simplified sets of physical relationships and features into machine learning anomaly detection algorithms.

SUMMARY

Disclosed herein are systems and methods for securing a cyber-physical control system and, in particular, for detecting and/or mitigating attacks directed against control system components and/or involving physical processes of the control system. Disclosed herein are examples of a method for anomaly detection in a cyber-physical control system, comprising acquiring a physical feature of the cyber-physical control system, the physical feature defining a relationship between a plurality of physical attributes of the cyber-physical control system, determining a physical state error metric, the physical state error metric configured to quantify deviation between the relationship defined between the plurality of physical attributes and measurements of one or more of the plurality of physical attributes, and detecting anomalous behavior of the cyber-physical control system based, at least in part, on the physical state error metric. The relationship defined by the physical feature may correspond to a physics-based correlational relationship between the plurality of physical attributes.

In some implementations, the method further comprises receiving measurements of one or more physical attributes of the plurality of physical attributes from a sensor device coupled to a physical process of the cyber-physical control system. An estimate of a first physical attribute of the plurality of physical attributes may be determined based on the relationship between the plurality of physical attributes and measurements of one or more other physical attributes of the plurality of physical attributes. The physical state error metric may be based, at least in part, on a difference between the estimate of the first physical attribute and a measurement of the first physical attribute. An estimate of a second physical attribute of the plurality of physical attributes may be determined based, at least in part, on the relationship between the plurality of physical attributes and the measurement of the first physical attribute. The physical state error metric may be based, at least in part, on the difference between the estimate of the first physical attribute and the measurement of the first physical attribute and a difference between the estimate of the second physical attribute and a measurement of the second physical attribute.

In some aspects, the method further includes determining an error threshold for the physical feature, the error threshold based on a deviation between training measurements of the plurality of physical attributes, the training measurements configured to characterize nominal operation of the cyber-physical control system, and detecting the anomalous behavior of the cyber-physical control system responsive to the physical state error metric exceeding the error threshold.

Implementations of the method may further comprise deriving a first membership function from one or more fuzzy sets, the one or more fuzzy sets corresponding to nominal operation of the cyber-physical control system and comprising training measurements of the plurality of physical attributes. The first membership function may be configured to model a physical state error distribution, the physical state error distribution corresponding to differences between the training measurements of the plurality of physical attributes and the relationship between the plurality of physical attributes defined by the physical feature. The method may further comprise acquiring measurements of the plurality of physical attributes, and utilizing the first membership function to determine the physical state error metric, the physical state error metric configured to quantify a degree to which the acquired measurements of the physical attributes conform to the physical state error distribution of the first membership function.

In some implementations, the one or more fuzzy sets may further comprise training measurements of a cyber feature, the training measurements of the cyber feature corresponding to nominal operation of an electronic communication network of the cyber-physical control system. The method may further include deriving a second membership function from the training measurements of the cyber feature, utilizing the second membership function to determine a cyber state error metric, the cyber state error metric configured to quantify a degree to which acquired measurements of the cyber feature correspond to the second membership function, and detecting the anomalous behavior of the cyber-physical control system based, at least in part, on the physical state error metric and the cyber state error metric.

Disclosed herein are examples of an apparatus for monitoring a cyber-physical control system. The apparatus may comprise a physical state monitor configured to acquire measurements of a plurality of physical attributes of the cyber-physical control system, the plurality of physical attributes corresponding to a physical feature that defines a correlational relationship between the plurality of physical attributes. The apparatus may further comprise an anomaly detector configured for operation on a processor. The anomaly detector may be configured to determine a first affinity metric, the first affinity metric configured to quantify a degree to which the measurements of the plurality of physical attributes of the cyber-physical control system conform with the correlational relationship between the plurality of physical attributes, and detect anomalous behavior of the cyber-physical control system based, at least in part, on a health metric determined for the cyber-physical control system, the health metric based, at least in part, on the first affinity metric and a second affinity metric, the second affinity metric configured to quantify a degree to which a cyber feature conforms with nominal behavior of an electronic communication network of the cyber-physical control system. The correlational relationship between the plurality of physical attributes may correspond to a physics-based relationship between the plurality of physical attributes. The physical state monitor may be communicatively coupled to a sensor device through the electronic communication network of the cyber-physical control system.

In some implementations, the anomaly detector is further configured to determine an estimate of a first physical attribute of the plurality of physical attributes based on measurements of one or more other physical attributes of the plurality of physical attributes and the correlational relationship between the plurality of physical attributes defined by the physical feature. The first affinity metric may be based, at least in part, on an error between the estimate of the first physical attribute and a measurement of the first physical attribute. The anomaly detector may be further configured to determine an estimate of a second physical attribute of the plurality of physical attributes based, at least in part, on the measurement of the first physical attribute and the correlational relationship between the plurality of physical attributes defined by the physical feature. The first affinity metric may be based, at least in part, on the error between the estimate of the first physical attribute and the measurement of the first physical attribute and an error between the estimate of the second physical attribute and the measurement of the second physical attribute.

The anomaly detector may be further configured to derive a first membership function from one or more fuzzy sets, the one or more fuzzy sets comprising training measurements of the plurality of physical attributes, the training measurements configured to characterize nominal operation of the cyber-physical control system. The first membership function may be configured to model an error distribution between respective training measurements of the plurality of physical attributes and the correlational relationship between the plurality of physical attributes defined by the physical feature. The anomaly detector may utilize the first membership function to determine the first affinity metric.

In some aspects, the apparatus further includes a cyber state monitor configured to acquire measurements of the cyber feature. The anomaly detector may be further configured to derive a second membership function from the one or more fuzzy sets, the second membership function configured to model a distribution of the cyber feature under nominal operation of the cyber-physical control system, and utilize the second membership function to determine the second affinity metric.

Disclosed herein are examples of a non-transitory computer-readable storage medium comprising instructions configured to cause a processor to implement operations for anomaly detection in a cyber-physical control system. The operations may comprise acquiring a physical feature of the cyber-physical control system, the physical feature defining a correlation between a plurality of physical attributes of the cyber-physical control system, determining a health metric for the cyber-physical control system, the health metric based, at least in part, on a first affinity metric configured to quantify a degree to which measurements of the plurality of physical attributes conform to the correlation between the plurality of physical attributes defined by the physical feature, and detecting an anomaly pertaining to the cyber-physical control system based, at least in part, on the health metric. The operations may further include receiving measurements of one or more of the plurality of physical attributes of the cyber-physical control system from one or more sensor devices coupled to a physical process of the cyber-physical control system.

In some implementations, the operations include determining an estimate of a first physical attribute of the plurality of physical attributes based on a measurement of one or more other physical attributes of the plurality of physical attributes and the correlation between the plurality of physical attributes defined by the physical feature, and determining the first affinity metric based, at least in part, on a difference between the estimate of the first physical attribute and a measurement of the first physical attribute. An estimate of a second physical attribute of the plurality of physical attributes may be determined based, at least in part, on the measurement of the first physical attribute and the correlation between the plurality of physical attributes defined by the physical feature. The first affinity metric may be based, at least in part, on the difference between the estimate of the first physical attribute and the measurement of the first physical attribute and a difference between the estimate of the second physical attribute and a measurement of the second physical attribute.

The operations may further include determining the first affinity metric by use of a membership function determined for the physical feature, the membership function configured to model a distribution of physical error metrics of one or more physical attributes of the plurality of physical attributes of the physical feature. The distribution may correspond to anomalous operation of the cyber-physical control system, and the first affinity metric may be inversely proportional to a degree to which measurements of the plurality of physical attributes conform with the membership function.

Alternatively, or in addition, the operations may include determining the first affinity metric by use of a first membership function determined for the physical feature, the first membership function configured to model a distribution of physical error metrics of one or more physical attributes of the plurality of physical attributes of the physical feature, the distribution corresponding to nominal operation of the cyber-physical control system, The first affinity metric may be configured to quantify a degree to which measurements of the plurality of physical attributes conform with the first membership function. The operations may further include acquiring a cyber feature of the cyber-physical control system, the cyber feature configured to characterize a state of an electronic communication network of the cyber-physical control system, and determining a second affinity metric based, at least in part, on a degree to which the acquired cyber feature conforms to a second membership function, the second membership function configured to model a distribution of the cyber feature under nominal operation of the cyber-physical control system. The health metric determined for the cyber-physical control system may be based, at least in part, on a combination of the first affinity metric and the second affinity metric.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements and have been solely selected for ease of recognition in the drawings.

DETAILED DESCRIPTION

Figure 1A:
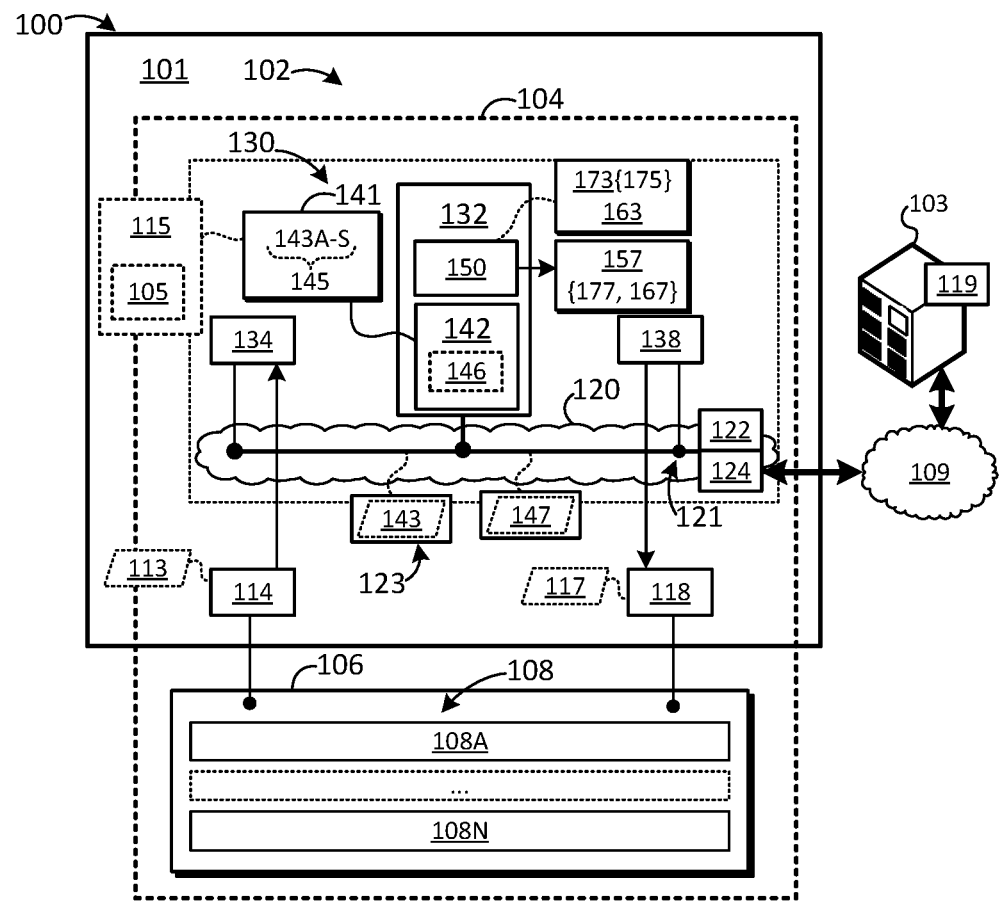
FIG. 1A illustrates an example of a cyber-physical system comprising an anomaly detector.

FIG. 1A illustrates an example of a cyber-physical system 100 comprising an example of an anomaly detector 150. The cyber-physical system 100 may comprise a cyber-physical control (CPC) system 101, which may include, but is not limited to: an industrial control system, an intelligent control system, a distributed control system, an open-loop control system, a closed-loop control system, an embedded control system, a vehicle control system, a building control system, a process control system, a plant control system, a manufacturing control system, a power control system, a power grid system, a Supervisory Control and Data Acquisition (SCADA) system, and/or the like. The CPC system 101 may comprise, embody, and/or be configured to implement one or more cyber-physical control elements 104. As used herein, a "cyber-physical control element" (CPCE) 104 refers to implementation of a control function pertaining to a process 106. As used herein, a process 106 refers to the totality of actions effecting each other in a system in which matter, energy, and/or information are manipulated, converted, transported, stored, and/or expended including, but not limited to: a physical process, an industrial process, a mechanical process, an electromechanical process, an electrical process, an electrical power process, an electrical power generation process, an electrical power distribution process, an electrical power conditioning process, an electrical power storage process, an electrical power load process, a manufacturing process, a fluid process, a chemical process, and/or the like. A process 106 may comprise and/or be embodied by one or more elements 108 (e.g., elements 108A-N), which may comprise any suitable means for performing actions involved in implementation of the process 106 (e.g., power generators, transformers, power transmission systems, power loads, rotors, movers, alternators, valves, relays, switches, bus bars, and/or the like).

As disclosed above, the CPCE 104 of the CPC system may comprise and/or be embodied by control system components 102, including components 102 configured to be operably and/or physically coupled to the physical process 106 (and/or respective elements 108 of the physical process 106), which may include, but are not limited to: field devices, acquisition devices 114 (e.g., sensor devices, monitoring devices, and/or the like), actuation devices 118 (e.g., control units, motor control units, and/or the like), and so on. As used herein, an acquisition device 114 may comprise any suitable means for obtaining physical state data 113 pertaining to the process 106. As used herein, "physical state (PS) data" 113 may refer to any suitable information pertaining to the process 106 and/or element 108 thereof (and/or control system components 102 coupled thereto). An acquisition device 114 may include, but is not limited to: a monitor device, a sensor, a sensor device, a SCADA sensor, an active sensor, a passive sensor, a measurement device, a monitoring device, an electromechanical sensor device, an electrical measurement device, a current measurement device, a voltage measurement device, a capacitance measurement device, an inductive sensor, a resistance measurement device, an impedance measurement device, a phase measurement unit (PMU), a magnetic sensor, a magnetic field sensor, an Anisotropic Magneto-Resistive (AMR) sensor, an arc detection device, a Hall effect sensor, a power measurement device, an electrical power measurement device (e.g., a power meter), a light sensor, a color sensor, a photoelectric sensor, an electro-optical radiation sensor, an infrared sensor, an image capture device, a mechanical measurement device, a mechanical power measurement device, a torque sensor, a tachometer, a position sensor, a Global Positioning System (GPS) device, a velocity measurement device, a vehicle speed sensor, a speedometer, an angular velocity sensor, an orientation sensor, a tile sensor, a compass, an accelerometer, a gyroscope, a pressure sensor, a shock sensor, a vibration sensor, an ultrasonic sensor, a temperature sensor, a thermocouple device, a humidity sensor, a proximity sensor, a chemical sensor, a particulate sensor, a gas sensor, a smoke sensor, a flow sensor, a level sensor, a touch sensor, a nanosensor, and/or the like.

As used herein, an actuation device 118 may comprise any suitable means for actuating, implementing, monitoring, controlling, and/or otherwise managing physical operations pertaining to physical process 106 (and/or one or more components 102 of the CPC system 101). An actuation device 118 may comprise, but is not limited to, one or more of: a SCADA actuator, a linear actuator, a rotary actuator, a fluid actuator, a hydraulic actuator, a hydraulic cylinder actuator, a pneumatic actuator, a mechanical actuator, a rack and pinion actuator, a comb drive actuator, a chain actuator, a screw jack actuator, a magnetic actuator, an electric actuator, an electromechanical actuator, a motor control unit, an electric motor, an electric motor controller, a power controller, a voltage controller, a current controller, a servomechanism, a solenoid, a stepper motor, a torque motor, a shape-memory allow actuator, a switch, a rotary switch, a toggle switch, an electronic switch, an electrically operated switch, a relay, a solid-state relay, an analog switch, a crossbar switch, a transistor switch, an electromechanical relay, an attracted armature relay, an induction relay, a mechanical relay, a moving coil relay, a motor-operated relay, a thermal relay, a circuit breaker, a Twisted and Coiled Polymer actuator, a Supercoiled Polymer (SCP) actuator, a thermal actuator, a thermal bimorph actuator, a soft actuator, a Shape Memory Polymer (SMP) actuator, a Photopolymer/Light Activated Polymer (LAP) actuator, a Dielectric Elastomer (DE) actuator, an Ionic Polymer Metal Composite (IPMC) actuator, an Electroactive Polymer (EAP) actuator, and/or the like. In some implementations, an actuation device 118 may be configured to acquire state information pertaining to the physical process 106, the actuation device 118 itself, physical operations implemented by the actuation device 118, and/or the like (e.g., may act as an acquisition device 114, as disclosed herein).

The cyber-physical system 100 may further comprise a cyber-physical system (CPS) network 120. As used herein, a CPS network 120 may refer to any suitable means for electronic communication, including, but not limited to: a communication network, an electronic communication network, an internal network, an Internet Protocol (IP) network, a wireless network, a Local Area Network (LAN), a Wide Area Network (WAN), a Virtual Private Network (VPN), a wireless network (e.g., IEEE 802.11a-n wireless network, Bluetooth® network, Near-Field Communication (NFC) network, and/or the like), a public switched telephone network (PSTN), a mobile network (e.g., a network configured to implement one or more technical standards or communication methods for mobile data communication, such as Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), High Speed Uplink Packet Access (HSUPA), Long Term Evolution (LTE), LTE-A (Long Term Evolution-Advanced), and/or the like), an embedded network, a control network, a process control network, a sensor network, an actuator network, a SCADA network, a Distributed Network Protocol (DNP3) network, an International Electrotechnical Commission 60870 (IEC 60870) network, an Experimental Physics and Industrial Control System (EPICS), a combination of networks, a Phasor network, a plurality of networks, a plurality of separate networks, a plurality of communicatively and/or operatively coupled networks, and/or the like.

In some examples, the CPS network 120 comprises an internal and/or private network of the CPC system 101 (and/or CPCE 104). The CPC system 101 may comprise cyber security components 122 configured to secure the CPS network 120. Securing the CPS network 120 may comprise encrypting, signing, authenticating, and/or verifying the integrity of components 102 coupled to the CPS network 120 and/or messages 123 communicated by and/or through the CPS network 120. As used herein, a "message" 123 refers to any information communicated by and/or through a communication network, such as the CPS network 120. A message 123 may include, but is not limited to: data, electronic data, signals, control signals, control system signals, commands, sensor data, sensor signals, sensor commands, actuator data, actuator signals, actuator commands, synchrophasors, synchrophasor data, network data, network address data, network protocol data, a packet (e.g., an IP packet, a DNP3 packet, a SCADA packet, and/or the like), network security data (e.g., authentication data, signature data, and/or the like), network integrity data, and/or the like. The cyber security components 122 may comprise internal security means configured to detect anomalous cyber-behavior within the CPS network 120 (e.g., a network monitor, network anomaly sensor, and/or the like). A message 123 may comprise control system data such as, PS data 113 and/or the like. In some implementations, the CPS network 120 further comprises one or more perimeter security components 124 configured to securely couple the CPS network 120 (and/or portions thereof) to one or more other networks, such as an external network 109 (a LAN, WAN, VLAN, the Internet, and/or the like). The perimeter security components 124 may be configured to prevent, detect, and/or mitigate attacks originating from outside of the CPS network 120 (e.g., from an external network 109). The perimeter security components 124 may include, but are not limited to: a gateway, a secure channel, a firewall, a port monitor, a network filter, an intrusion detection system, and/or the like.

Figure 1B:
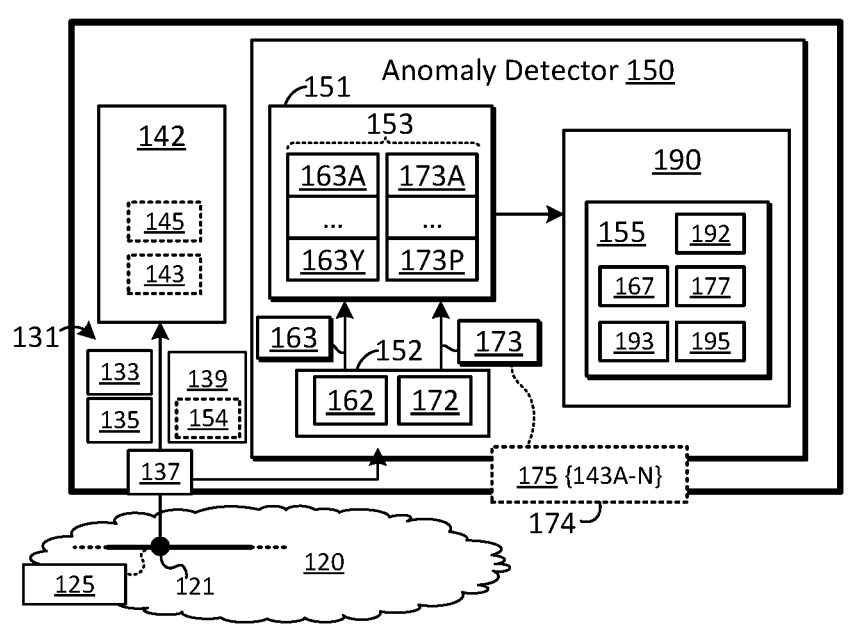
FIG. 1B illustrates an example of an anomaly detector.

The CPC system 101 may further comprise one or more intelligent control system components 130. As used herein, an "intelligent control system component" (ICSC) 130 refers to a control system component 102 that comprises computing capabilities and/or resources. An ICSC 130 may refer to a component capable of being operably and/or communicatively coupled to the CPS network 120 (e.g., a component capable of network communication). An ICSC 130 may comprise a microprocessor-based component or device, such as a computing device, an intelligent electronic device (IED), an electronic communication device, a network communication device, an input/output (I/O) device, an input device, an output device, a controller, a process controller, a microcontroller, control logic, programmable logic, a programmable logic controller (PLC), a relay, a protective relay, a safety relay, a switch, an automation controller, a Real-Time Automation Controller (RTAC), a human-machine interface (HMI) device, a supervisory computing device, a Remote Terminal Unit (RTU), and/or the like. As illustrated in FIG. 1B, an ICSC 130 may comprise computing resources 131, which may include, but are not limited to: a processor 133, memory 135, communication interface 137, persistent storage 139, and/or the like. The processor 133 may comprise any suitable processing means, including, but not limited to: circuitry, logic circuitry, an integrated circuit, an application-specific integrated circuit (ASIC), a processor, a central processing unit (CPU), a general purpose processor, a special-purpose processor, an embedded processor, programmable logic, a Field Programmable Gate Array (FPGA), a controller, a PLC, a microcontroller, a system on a chip (SoC), and/or the like. The memory 135 may comprise any suitable memory means, including, but not limited to: volatile memory, random access memory (RAM), static RAM (SRAM), dynamic RAM (DRAM), non-volatile memory, battery-backed RAM, and/or the like. The communication interface 137 may be configured to communicatively couple the ICSC 130 to network communication means, such as the CPS network 120. The communication interface 137 may be configured to couple the ICSC 130 to a node 121 of the CPS network 120 (e.g., a bus, backplane, switch, router, and/or the like). In some examples, an ICSC 130 may further comprise persistent storage 139, which may comprise any suitable data storage means, such as non-volatile storage, non-transitory storage, a non-transitory storage device, a non-transitory storage medium, a solid-state storage device, a solid-state storage medium, Flash memory, an electrically erasable programmable read-only memory (EEPROM), and/or the like.

Referring back to FIG. 1A, the CPC system 101 may further comprise HMI components 119, which may include, but are not limited to: input devices (e.g., keyboard, mouse, touch input device, and/or the like), output devices (e.g., a display, monitor, audio output device, haptic feedback device), and/or the like. The HMI components 119 may be embodied in one or more computing device(s), such as a terminal 103. The terminal 103 may comprise a computing device having processing, memory, and/or storage resources (not shown in FIG. 1A to avoid obscuring aspects of the illustrated examples). The terminal 103 may comprise a mobile computing device, such as a smart phone, tablet, personal digital assistant (PDA), and/or the like. The terminal 103 may be communicatively coupled to one or more components 102 of the CPC system 101. In some implementations, the terminal 103 may be communicatively coupled to the CPS network 120 through an external network 109 (e.g., through a perimeter security component 124, such as a gateway or the like, as disclosed herein). Alternatively, or in addition, the terminal 103 may be directly coupled to the CPS network 120 (e.g., may comprise and/or be communicatively coupled to an internal node 121 of the CPS network 120). The terminal 103 may be configured to enable an entity, such as an operator (user) to monitor, configure, and/or otherwise manage the CPC system 101. The terminal 103 may comprise means for monitoring, configuring, and/or otherwise managing components 102 of the CPC system 101 (e.g., circuitry, logic, computer-readable instructions stored within non-transitory storage, and/or the like). The terminal 103 may provide applications and/or interfaces to enable operators to monitor, configure, and/or otherwise manage the CPCE 104, which may comprise configuring input functionality, control functionality, and/or output functionality of the CPCE 104, as disclosed in further detail herein.

As disclosed above, the CPCE 104 of the CPC system 101 may be configured to control the process 106, which may comprise, inter alia, sensing, measuring, monitoring, adjusting, manipulating, managing, regulating, protecting, and/or otherwise controlling the process 106 and/or elements 108 thereof. The CPCE 104 may comprise input functionality configured to acquire PS data 113, control functionality configured to implement a control function 142 based on, inter alia, the acquired PS data 113, and output functionality configured to realize decisions of the control functionality. In the FIG. 1A example, the input, control, and/or output functionality of the CPCE 104 may be implemented and/or embodied by one or more ICSC 130 coupled to the CPS network 120 (cyber components 102); the input functionality may comprise and/or be embodied by one or more input components 134; the control functionality by comprise and/or be embodied by a controller 132; and the output functionality may comprise and/or be embodied by one or more output components 138.

The controller 132 may be configured to implement a control function 142 of the CPCE 104. The control function 142 may acquiring, monitoring, adjusting, manipulating, managing, regulating, and/or otherwise controlling a physical state 115 of the CPC system 101. As used herein, the physical state 115 of the CPC system 101 refers to information pertaining to the state of physical devices, components, and/or elements of the CPC system 101 and/or physical actions, operations, conditions, and/or states thereof. The physical state 115 of the CPC system 101 of the FIG. 1A example may refer to the state of the process 106, the state of respective elements 108 of the process 106 (e.g., the state of elements 108A-N), the state of one or more physical components 102 coupled to the process 106 (e.g., acquisition devices 114, actuation devices 118, and/or the like), and so on. The controller 132 may be configured to acquire physical state (PS) control data 141 pertaining to the physical state 115 of the CPC system 101. The PS control data 141 may comprise one or more physical attributes 143 (e.g., physical attributes 143A-S). As used herein, a physical attribute 143 refers to any suitable information pertaining to the physical state 115 of the CPC system 101. A physical attribute may comprise and/or be derived from PS data 113 acquired by the input functionality of the CPCE 104 (e.g., input components 134). The physical attributes 143A-S acquired by the controller 132 may be configured to characterize and/or describe aspects of the physical state 115 of the CPC system 101 pertaining to the CPCE 104 and/or control function 142. The controller 132 may be configured to acquire PS control data 141 (e.g., physical attributes 143A-S) by use of the input functionality of the CPCE 104 (e.g., the input components 134).

As disclosed above, the input components 134 may be configured to acquire physical attributes 143 pertaining to the physical state 115 of the CPC system 101. In the FIG. 1A example, the input components 134 may be configured to acquire physical attributes 143 pertaining to the process 106 and/or respective process elements 108. The physical attributes 143 acquired by the input components 134 may comprise and/or be derived from PS data 113 obtained by use of one or more acquisition devices 114, as disclosed herein. The input components 134 may be configured to: acquire PS data 113 from one or more acquisition devices 114, derive physical attributes 143 from the acquired PS data 113, and provide the physical attributes 143 to control functionality of the CPCE 104 (e.g., the controller 132). The input components 134 may be configured to communicate physical attributes 143 acquired thereby on the CPS network 120 (e.g., physical attributes 143 may be included in messages 123 communicated on the CPS network 120). The input components 134 may be configured to interface with and/or be communicatively coupled to acquisition devices 114 by any suitable means including, but not limited to: the CPS network 120, a device network (e.g., sensor network), a device-to-device connection, an analog connection, and/or the like. The input components 134 may be further configured to process the acquired PS data 113, which may comprise converting, filtering, cleaning, interpreting, aggregating, validating, deriving, generating and/or otherwise producing physical attributes 143 comprising the acquired PS data 113. The input components 134 comprise hardware elements, such as acquisition device interfaces (e.g., interfaces configured to operatively and/or communicatively couple an input component 134 to an acquisition device 114); cyber communication interfaces (e.g., interfaces to communicatively couple input components 134 to the CPS network 120); conversion circuitry, such as digital-to-analog conversion (DAC) circuitry, analog-to-digital conversion (ADC) circuitry, and/or the like; I/O circuitry; sense circuitry; signal amplifier circuitry; buffer circuitry; and/or the like. In some examples, the input components 134 are configured to acquire physical attributes 143 in accordance with an acquisition configuration. The acquisition configuration may be adapted to configure the input components 134 to acquire suitable PS control data 141 (e.g., acquire PS control data 141 and/or physical attributes 143A-S involved in implementation of control functionality of the CPCE 104 by the controller 132). The acquisition configuration may comprise any suitable information pertaining to input functionality, including, but not limited to: physical attributes 143 to be acquired by the input components 134, data sources of respective physical attributes 143 (e.g., configure the input components 134 to acquire physical attributes 143 comprising PS data 113 acquired from specified acquisition devices 114), characteristics of PS data 113 comprising respective physical attributes 143 (e.g., data type, resolution, scale, and/or other characteristics of the PS data 113), processing operations to perform on PS data 113 comprising respective physical attributes 143, an acquisition frequency of respective physical attributes 143 (e.g., specify the frequency and/or period at which to acquire respective physical attributes 143), destinations for respective physical attributes 143 (e.g., configure the input components 134 to send physical attributes 143 to control system components 102), and/or the like.

As disclosed above, the controller 132 may be configured to implement control functionality of the CPCE 104. Implementing the control functionality may comprise acquiring PS control data 141 pertaining to the physical state 115 of the CPC system 101 and determining control decisions 147 in accordance a control function 142. In some implementations, the controller 132 is configured to implement a control function 142 pertaining to a physical control state 145. As used herein, a "physical control state" 145 refers to one or more characteristics, properties, and/or attributes pertaining to the physical state 115 of the CPC system 101. The physical control state 145 may comprise and/or refer to characteristics, properties, and/or attributes of the process 106 and/or one or more process elements 108 (e.g., power output by a power generation process 106, voltage potential at a specified element 108, pressure and/or flow rates at respective elements 108 of flow control process 106, and/or the like). The physical control state 145 may, therefore, comprise, correspond to, and/or be derived from one or more physical attributes 143 (e.g., physical attributes 143A-S). The controller 132 may be configured to acquire, monitor, adjust, manipulate, manage, regulate, and/or otherwise control aspects of the physical control state 145. The controller 132 may be configured to transition the physical control state 145 to a target state 146 and/or maintain the physical control state 145 at the target state 146 (e.g., transition and/or maintain one or more physical attributes 143 at levels specified by the target state 146). The controller 132 may be configured to implement control operations, comprising: acquiring the physical control state 145 (e.g., acquiring physical attributes 143), evaluating the acquired physical control state 145 (e.g., determining an error between the acquired physical control state 145 and the target state 146), and determining control decisions 147 based on the evaluating (e.g., determine control decisions 147 to, inter alia, reduce the determined error). The controller 132 may be configured to communicate the determined control decisions 147 on the CPS network 120 (e.g., may transmit the control decisions 147 in messages 123 communicated on the CPS network 120). The controller 132 may be configured to implement control operations in accordance with a control configuration. The control configuration may comprise any information pertaining to the implementation of control functionality, including, but not limited to: the physical control state 145 acquired by the controller 132 (e.g., specify physical attributes 143 comprising the physical control state 145, identify input components 134 configured to acquire respective physical attributes 143, and/or the like), the control function 142 implemented by the controller 132 (e.g., specify control function algorithms, algorithm parameters, and/or the like), control operations performed by the controller 132 (e.g., designate a frequency and/or period at which control operations are to be performed), control decisions 147 determined by the controller 132 (e.g., specify control decisions 147 capable of being realized by the output functionality, a response of the physical control state 145 to control decisions 147, output components 138 configured to realize the control decisions 147, and/or the like), and so on.

As disclosed above, the control decisions 147 determined by the controller 132 may be realized and/or implemented by output functionality of the CPCE 104 (e.g., the output components 138). The output components 138 may receive control decisions 147 through the CPS network 120. The output components 138 may realize and/or implement control decisions 147 by use of one or more actuation devices 118. Implementing the control decisions 147 may comprise configuring the actuation devices 118 to operate in accordance with the control decisions 147. The output components 138 may be configured to send actuation commands 117 to respective actuation devices 118, the actuation commands 117 configured to cause the respective actuation devices 118 to implement physical operations, actions, and/or tasks in accordance with the control decisions 147. The output components 138 may be configured to convert and/or translate control decisions 147 into actuation commands 117 capable of being implemented by respective actuation devices 114. The output components 138 may be configured to interface with actuation devices 118 by any suitable means, including, but not limited to: the CPS network 120, a device network (e.g., an actuator network), a device-to-device connection, an analog connection, and/or the like. The output components 138 may comprise hardware elements, such actuation device interfaces (e.g., interfaces configured to operatively and/or communicatively couple output components 138 to actuation devices 118), communication interfaces (e.g., interfaces configured to communicatively couple output components 138 to the CPS network 120); I/O circuitry, conversion circuitry (e.g., DAC, ADC, and/or the like), I/O circuitry, signal driver circuitry, signal amplifier circuitry, buffer circuitry, and/or the like.

The process 106 controlled by the CPC system 101 may involve potentially hazardous materials and conditions (e.g., chemicals, radioactive materials, high temperatures, and/or the like). Moreover, control decisions 147 (and/or corresponding actuation commands 117) produced by the CPC system 101 may impact complex, inter-related, and potentially dangerous operations. Unauthorized or malicious access to the CPC system 101 may have serious consequences, result in harm to personnel, damage to sophisticated equipment, release of potentially dangerous materials, and so on. As such, conventional cyber-physical control systems often incorporate anomaly detection means. That rely on monitoring cyber state characteristics (e.g., monitor network communication, such as communication on the CPS network 120). These systems, however, may be incapable of detecting cyber-attacks that conform with "nominal" cyber behavior. Increasing the sensitivity of these systems may result in excessive false positives. Moreover, even more sophisticated machine learning (ML) systems capable of dynamically learning cyber-behavior characteristics may conform with cyber-behavior patterns that can be recognized and exploited by attackers. Although attempts have been made to augment cyber state anomaly detection systems to incorporate physical data and/or models, developing models capable characterizing the physical state 115 of a CPC system 101 require extensive engineering efforts, are error-prone, and are non-scalable. Moreover, physical state data (e.g., PS data 113 and/or physical attributes 143) may not be suitable for ML anomaly detection. ML anomaly detection models are typically trained to baseline behavior. Physical state data, however, may vary over time and/or under different "nominal" baseline conditions (e.g., operation in different modes, different conditions, and/or the like). Therefore, even if ML anomaly detection models were trained to fit physical state data associated with a particular baseline, the ML anomaly detection models would still produce false positives during "nominal" operation (e.g., produce false positives as physical state data shifts during operation in different baseline conditions). Furthermore, physical quantities may span large ranges during "nominal" operation (e.g., due to operation under different modes, conditions, baselines, and/or the like); ML anomaly detection models trained to fit such physical quantities may be incapable of providing meaningful anomaly detection information (e.g., may be incapable of distinguishing physical state quantities associated with "nominal" physical behavior from "anomalous" physical behavior due to, inter alia, the large ranges spanned thereby). Moreover, even if an ML anomaly detection model were capable of characterizing certain physical quantities over limited ranges, the models would only indicate whether observed physical quantities conform with previous training data and provide no indication whether the physical quantities represent a valid, "nominal" physical state 115 of the CPC system 101.

In the FIG. 1A example, the CPC system 101 comprises a cyber-physical anomaly detector (anomaly detector 150). The anomaly detector 150 may be operably and/or communicatively coupled to components 102 of the CPC system 101 through, inter alia, the CPS network 120. The anomaly detector 150 may comprise and/or be embodied by a component 102 of the CPC system 101, such as ICSC 130. The anomaly detector 150 may be implemented on an ICSC 130 configured to implement control functionality of the CPCE 104 (e.g., may be embodied and/or implemented by computing resources 131 of the controller 132). The disclosure is not limited in this regard, however, and could be adapted to deploy the anomaly detector 150 on any suitable ICSC 130 and/or other computing device.

The anomaly detector 150 may be configured to detect anomalies pertaining to the CPC system 101 (and/or CPCE 104) based on an integrated cyber-physical feature set capable of characterizing the physical state 115 of the CPC system 101. The anomaly detector 150 may be capable of detecting anomalous cyber and/or physical behaviors indicative of attack and/or compromise. The anomaly detector 150 may, therefore, be capable of detecting attacks that conform with "nominal" cyber behaviors (e.g., detect attacks resulting in anomalous physical behavior regardless of observed network traffic patterns). As used herein, "nominal" behavior or "nominal" operation refers to healthy, non-anomalous, and/or otherwise nominal behavior and/or operation of the CPC system 101. Nominal cyber behavior may refer to a healthy, non-anomalous, and/or nominal cyber state of the CPC system 101 (e.g., nominal operation of cyber components of the CPC system 101). Nominal physical behavior may refer a healthy, non-anomalous, and/or nominal physical state 115 of the CPC system 101. By contrast, "anomalous" or "non-nominal" operation refers to unhealthy, anomalous, and/or disruptive behavior and/or operation of the CPC system 101. Anomalous cyber behavior may refer to unhealthy, anomalous, and/or disruptive cyber behavior and/or operation of the CPC system 101 (e.g., anomalous behavior and/or operation of the CPS network 120). Anomalous physical behavior may refer to unhealthy, anomalous, and/or disruptive physical behavior and/or operation of the CPC system 101 (e.g., anomalous behavior and/or operation of a CPCE 104, physical attributes 143, and/or the like).

The anomaly detector 150 may be further configured to develop physical features 173 capable of characterizing the physical state 115 of the CPC system 101 without the need for complex, error-prone, non-scalable, system-specific physical state models. The disclosed physical features 173 may be configured to characterize the physical state 115 of the CPC system 101 over large value ranges (as opposed to individual physical data quantities, which may be incapable of distinguishing "nominal" physical states 115 from "anomalous" physical states 115). The physical features 173 may define physical and/or physics-based constraints, relationships, and/or correlations (PCRC 175) involving specified physical attributes 143 (as opposed to respective data quantities). Therefore, as used herein, a "physical feature" 173 may refer to a PCRC 175 involving specified physical attributes 143 (e.g., may comprise a PCRC 175 that, inter alia, defines a correlational relationship between a plurality of physical attributes 143).

The physical features 173 and/or corresponding PCRC 175 may be configured in accordance with physical characteristics of the process 106 controlled by the CPC system 101. The elements 108 comprising the process 106 may be subject to determined physical and/or physics-based constraints, relationships, and/or correlations (PCRC) 175. The PCRC 175 may pertain to physical attributes 143 of respective elements 108 and/or PS attributes associated with different elements 108. A PCRC 175 may define a correlational relationship between a plurality of physical attributes 143 (e.g., a numerical or mathematical relationship). The PCRC 175 may enable the anomaly detector 150 to determine an estimate of a first physical attribute 143 of the plurality of physical attributes 143 based, at least in part, on measurements of one or more other physical attributes 143 of the plurality of physical attributes. Physical state (PS) error metrics 177 for the physical feature 173 may be based, at least in part, on a difference between the estimate of the first physical attribute 143 and a measurement of the first physical attribute 143. The PCRC 175 may further enable the anomaly detector 150 to determine an estimate of a second physical attribute 143 of the plurality of physical attributes 143 based, at least in part, on the correlational relationship between the plurality of physical attributes 143 defined by the physical feature 173 and the measurement of the first physical attribute 143. The PS error metrics 177 for the physical feature 173 may be based, at least in part, on the difference between the estimate of the first physical attribute 143 and the measurement of the first physical attribute 143 and a difference between the estimate of the second physical attribute 143 and a measurement of the second physical attribute 143.

In some examples, the anomaly detector 150 (and/or other component 102) may be configured to maintain information pertaining to particular PCRC 175 (maintain PCRC data 105). As used herein, PCRC data 105 refers to any suitable expression, definition, and/or representation of PCRC 175 involving specified physical attributes 143 pertaining to one or more of: the physical state 115 of the process 106; specified elements 108 of the process 106; actions implemented by specified elements 108 (e.g., PCRC 175 between physical attributes 143 of elements 108); physical states 115 of specified elements 108 (e.g., relationships, constraints, and/or correlations involving physical attributes 143 pertaining to the physical state 115 of a designated element 108); and/or the like.

By way of non-limiting example, PCRC data 105 pertaining to a process 106 involving liquid flow may define a physics-based correlation between a first physical attribute quantifying the flow rate (Q) of a liquid at a first element 108A and second physical attributes 143 indicating a pressure differential (ΔP) across the first element 108A (the PCRC data 105 specifying that the flow rate Q is proportional to the square root of the pressure differential ΔP). In another non-limiting example, PCRC data 105 pertaining to a process 106 involving supplying power to a resistive load may define a physical relationship between a first physical attribute quantifying power output by a first element 108A, and a second physical attribute comprising a corresponding current measurement (e.g., may define a physics-based constraint that power output values of the first physical attribute are proportional to a square of the current measurements of the second physical attribute). By way of further non-limiting example, PCRC data 105 pertaining to a CPCE 104 configured to control an electrical power network may specify power flow relationships between respective elements 108 (nodes) (e.g., may define a swing equation describing physics-based distribution of inertial correlations between power flow at respective nodes). Although particular examples of PCRC 175 and/or PCRC data 105 are described herein, the disclosure is not limited in this regard and could be adapted to incorporate any suitable physical and/or physics-based relationships, constraints, correlations pertaining to any suitable attribute, characteristic, and/or variable pertaining to the physical state 115 of a process 106 and/or respective process elements 108.

In some implementations, PCRC data 105 pertaining the CPC system 101 may be embodied as electronic information maintained by a computing device and/or stored on a non-transitory storage medium. As disclosed above, the PCRC data 105 may pertain to a specified subset of physical attributes 143 (a subset of physical attributes 143 describing the physical state 115 of the process 106 and/or physical control state 145 of the controller 132). The PCRC data 105 may define a simplified set of physical state information capable of characterizing physical behavior of the CPC system 101 (e.g., capable of evaluating whether physical attributes 143 describing the physical state 115 of the CPC system 101 conform with the physical relationships and/or constraints defined by the PCRC data 105). The anomaly detector 150 configure physical features 173 in accordance with the PCRC data 105. The physical features 173 may incorporate PCRC 175 involving specified physical attributes 143 as defined by the PCRC data 105. The physical features 173 may, therefore, be capable of characterizing the physical state 115 of the CPC system 101, without the need for complex, error-prone, non-scalable physical state models. The physical features 173 may indicate whether physical attributes 143 describing the physical state 115 of the control system conform with solid physical principals incorporated into the respective physical features 173.

In a first example, the anomaly detector 150 may be configured to implement anomaly detection operations, comprising: a) acquiring physical attributes 143 configured to characterize the physical state 115 of the CPC system 101; b) evaluating the acquired physical attributes 143; and c) classifying the physical and/or cyber behavior of the CPC system 101 in response to the evaluating (e.g., classifying the physical and/or cyber behavior as "nominal" or "anomalous"). The evaluating may comprise determining PS error metrics 177 configured to quantify the degree to which measurements of the physical attributes 143 conform with respective classifications of physical and/or cyber behavior of the CPC system 101.

In a second example, the anomaly detection operations implemented by the anomaly detector 150 may comprise: a) acquiring physical attributes 143 corresponding to respective physical features 173 (e.g., physical attributes 143A-S), the physical features 173 defining PCRC 175 between specified physical attributes 143; b) evaluating the physical features 173; and c) determining health metrics 193 for the CPC system 101 based, at least in part, on the evaluating. The evaluating may comprise determining PS error metrics 177 for respective physical features 173, the PS error metrics 177 configured to quantify the degree to which acquired measurements of the physical attributes 143 of respective physical features 173 correspond and/or conform to the PCRC 175 defined by the respective physical features 173. The PS error metrics 177 may be based on differences between estimates of one or more physical attributes 143 of a physical feature 173 and measurements of the one or more physical attributes 143, as disclosed herein. The anomaly detector 150 may detect anomalous operation of the CPC system 101 in response to health metrics 193 (and/or PS error metrics 177) that exceed one or more thresholds.

In a third example, the anomaly detection operations implemented by the anomaly detector 150 may comprise: a) acquiring physical features 173, each physical feature comprising and/or incorporating one or more physical attributes 143; b) acquiring one or more cyber features 163 configured to characterize a cyber state of the CPC system 101 (e.g., characterize a state of the CPS network 120); c) evaluating the physical features 173 and/or cyber features 163; and d) determining health metrics 193 for the CPC system 101 based, at least in part, on the evaluating. As used herein, a "cyber feature" 163 refers to any suitable information configured to characterize cyber behavior and/or the cyber state of the CPC system 101. The evaluating may comprise determining PS error metrics 177 for respective physical features 173, as disclosed herein. The evaluating may further comprise determining cyber state (CS) error metrics 167 configured quantify a degree to which the cyber features 163 diverge from "nominal" cyber behavior of the CPC system 101. Alternatively, or in addition, the CS error metrics 167 may quantify a degree to which the cyber features 163 conform with "anomalous" cyber behavior of the CPC system 101. The anomaly detector 150 may detect anomalous operation of the CPC system 101 in response to health metrics 193 (e.g., PS error metrics 177 and/or CS error metrics 167) that exceed one or more thresholds.

FIG. 1B illustrates an example of an anomaly detector 150. The anomaly detector 150 may comprise, be embodied by, and/or be configured for operation on a computing device, such as an ICSC 130. The anomaly detector 150 may comprise and/or be embodied by, inter alia, computer-readable instructions stored on and/or within a non-transitory storage medium (e.g., instructions stored within persistent storage 139 of the ICSC 130, the instructions configured for execution by the processor 133 of the ICSC 130). In the FIG. 1B example, the anomaly detector 150 may be embodied on the controller 132 of the CPCE 104, as illustrated in FIG. 1A.

In the FIG. 1B example, the anomaly detector 150 comprises an acquisition module 152. The acquisition module 152 may be configured to construct features configured to characterize observed behavior and/or operation the CPC system 101. The acquisition module 152 may be configured to construct physical and/or cyber feature vectors pertaining to the CPC system 101 (cyber-physical control system (CPCS) feature vectors 151, or simply feature vectors 151). A feature vector 151 may comprise, incorporate and/or be derived from one or more features pertaining to physical and/or cyber behavior of the CPC system 101 (CPCS features 153, or simply features 153). The features 153 (and corresponding feature vectors 151) may comprise one or more physical features 173 configured to characterize the physical state 115 of the CPC system 101 (e.g., physical features 173A-P). The features 153 may further comprise zero or more cyber features 163 configured to characterize the cyber state of the CPC system 101, such as the state of the CPS network 120 (e.g., cyber features 163A-Y).

In the FIG. 1B example, the acquisition module 152 is configured to construct n-dimensional feature vectors 151, each comprising n features 153 (e.g., one or more physical features 173A-P and zero or more cyber features 163A-Y). The disclosure is not limited in this regard, however, and could be adapted for use with feature vectors 151 of any suitable dimensionality, comprising any number of PC features 153, and/or PC features 153 comprising any number of cyber features 163 and/or physical features 173.

The acquisition module 152 may acquire cyber features 163 by use of, inter alia, a cyber-state (CS) monitor 162. The CS monitor 162 may be configured to monitor cyber behavior and/or operation of the CPC system 101, such as cyber communication on the CPS network 120, communication between respective control system components 102, and/or the like. In some implementations, the CS monitor 162 is configured to capture messages 123 at and/or by use of the communication interface 137 of the ICSC 130. Alternatively, or in addition, the CS monitor 162 may comprise and/or be communicatively coupled to other network monitoring means, which may include, but are not limited to: one or more network interfaces, a network interposer, a network monitor, a network sniffer, a network analyzer, a cyber security component 122, a perimeter security component 124, and/or the like. The CS monitor 162 may be acquire cyber features 163 configured to characterize a cyber state of the CPC system 101, as disclosed herein. The cyber features 163 acquired by the CS monitor 162 may comprise any information configured to characterize cyber behavior of the CPC system 101 including, but not limited to: communication rate, communication bandwidth, message latency, time between messages 123, messages 123 per destination, messages 123 per sender, message size, message data length, message window size, and/or the like. In some implementations, the CS monitor 162 determines cyber features 163 in accordance with a sliding-window scheme, comprising: capturing message 123 communicated during respective time windows; and deriving cyber features 163 from the captured messages 123. The cyber features 163 may comprise one or more statistical characteristics, which may include, but are not limited to: message latency (e.g., average message latency), time between messages 123 (e.g., mean time between messages 123), message size (e.g., statistical distribution of message sizes), message data length (e.g., average data length), message window size (e.g., mean message window size), unique destination addresses (e.g., average number of unique destination addresses detected in respective monitoring windows), unique sender addresses (e.g., average number of unique sender addresses detected in respective monitoring windows), message protocols and/or flag codes (e.g., distribution of message protocols and/or flag codes), and/or the like. The CS monitor 162 may be configured to acquire cyber features 163 in accordance with the CPAD configuration 154, as disclosed herein. In some examples, the CS monitor 162 may be further configured to associate cyber features 163 with capture time(s) of the messages 123 from which the cyber features 163 were derived (e.g., may associate cyber features 163 with start, middle, and/or end times of the monitoring windows).

The acquisition module 152 may further comprise a physical state (PS) monitor 172. The PS monitor 172 may be configured to construct physical features 173, as disclosed herein. The physical features 173 may be constructed in accordance with respective physical feature (PF) specifications 174. As illustrated in FIG. 1B, a PF specification 174 may define one or more PCRC 175 involving specified physical attributes 143A-N; the PCRC 175 may define bounds of one or more physical attributes 143A-N, specify physics-based correlations between specified physical attributes 143A-N, specify relationships between specified physical attributes 143A-N, and/or the like. The PCRC 175 of the PF specifications 174 may be based on and/or defined by PCRC data 105 pertaining to the CPC system 101, as disclosed herein. The PF specifications 174 for physical features 173A-G may be maintained within the CPAD configuration 154 (e.g., may be stored within non-transitory storage, such as persistent storage 139 of the ICSC 130). Constructing a physical feature 173 may comprise acquiring the physical attributes 143A-N specified by the PF specification 174, and evaluating PCRC 175 of the PF specification 174 (e.g., applying and/or evaluating PCRC 175 involving specified physical attributes 143 of the physical attributes 143A-N).

The PS monitor 172 may be configured to acquire physical attributes 143 from any suitable source. The PS monitor 172 may be configured to acquire physical attributes 143 from the controller 132. As disclosed above, the controller 132 may acquire physical attributes 143 (e.g., physical attributes 143A-S). The physical attributes 143 involved construction of the physical features 173 may comprise a subset of the physical attributes 143A-S acquired by the controller 132. The PS monitor 172 may request, retrieve, extract, and/or otherwise obtain selected physical attributes 143 from the controller 132. Alternatively, or in addition, the PS monitor 172 may be configured to acquire selected physical attributes 143 from one or more other components 102 (e.g., acquire physical attributes 143 from input components 134, acquisition devices 114, other components 102, other ICSC 130, and/or the like). In some implementations, the PS monitor 172 may be further configured to extract physical attributes 143 from messages 123 captured by the CS monitor. The PS monitor 172 may be further configured to associate physical attributes 143 (and/or the physical features 173 derived therefrom) with respective capture times, as disclosed herein.

The anomaly detector 150 may further comprise an evaluation engine 190, which may be configured to evaluate the feature vectors 151 acquired by the acquisition module 152. The evaluating may comprise determining anomaly detection metrics (AD metrics 155) for respective feature vectors 151, the AD metrics 155 configured to quantify the degree to which physical and/or cyber behavior characterized by the feature vectors 151 conform with (and/or belong to) specified classes of cyber-physical behavior, such as "nominal" or "anomalous" behavior classifications. The AD metrics 155 may indicate whether the CPC system 101 is being attacked and/or has been compromised. In some aspects, the AD metrics 155 comprise a cyber-physical system classification (CPSC) value 192. The CPSC value 192 may indicate a determined classification of the observed behavior and/or operation of the CPC system 101, such as "nominal," "anomalous" or the like. A CPSC value 192 of "nominal" may indicate detection of nominal or healthy behavior and/or operation of the CPC system 101. Conversely, a CPSC value 192 of "anomalous" may indicate detection of anomalous behavior and/or operation of the CPC system 101. The CPSC value 192 may be based, at least in part, on PS error metrics 177 and/or CS error metrics 167. The PS error metrics 177 and/or CS error metrics 167 may be determined by, inter alia, evaluating feature vectors 151 acquired by the acquisition module 152.

Evaluating the feature vectors 151 may comprise determining PS error metrics 177, which may be configured to quantify the degree to which measurements of physical attributes 143 of respective physical features 173 conform with PCRC 175 defined by the respective physical features 173. As disclosed herein, the PCRC 175 of a physical feature 173 may define a physical and/or physics-based correlational relationship between a plurality of physical attributes 143 (e.g., a correlational relationship between physical attributes 143A-N). Evaluating a physical feature 173 having a PCRC 175 that defines a correlational relationship between physical attributes 143A-N may comprise determining a degree to which measurements of the plurality of physical attributes 143A-N conform with the PCRC 175 defined by the physical feature 173. The PS error metrics 177 may comprise differences and/or errors between measurements of one or more of the plurality of physical attributes 143A-N and estimates of the physical attributes 143A-N. The estimate of a physical attribute 143 may be based on the correlational relationship defined by the PCRC 175 and measurements of one or more others of the plurality of physical attributes 143. For example, an estimate for the physical attribute 143A may be based, at least in part, on the PCRC 175 and measurements of one or more of the physical attributes 143B-N. Evaluating the feature vectors 151 may further comprise determining CS error metrics 167, which may be configured to quantify the degree to which measurements of respective cyber features 163 conform with "nominal" cyber behavior and/or operation of the CPC system 101.

In some implementations, the CPSC value 192 determined by the evaluation engine 190 may be based, at least in part, on the PS error metrics 177 and/or the CS error metrics 167. The evaluation engine 190 may assign a "nominal" CPCS value 192 to a feature vector 151 in response determining that the corresponding PS error metrics 177 satisfy one or more "nominal" thresholds (e.g., PS error thresholds of respective physical features 173). Conversely, the evaluation engine 190 may assign an "anomalous" CPCS value 192 in response to determining that the PS error metrics 177 fail to satisfy one or more of the "nominal" thresholds (and/or satisfy one or more "anomalous" thresholds). Alternatively, or in addition, the evaluation engine 190 may determine the CPCS value 192 based on the CS error metrics 167. The evaluation engine 190 may assign a "nominal" CPCS value 192 in response to determining that the PS error metrics 177 and CS error metrics 167 satisfy respective "nominal" thresholds and may assign an "anomalous" CPCS value 192 otherwise.

In some implementations, the AD metrics 155 may comprise health metrics 193 (in addition to and/or in place of the CPC values 192). The health metrics 193 may quantify a degree to which physical and/or cyber behavior characterized by the feature vectors 151 correspond with (or belong to) "nominal" behavior and/or operation of the CPC system 101. The health metrics 193 may be based, at least in part, on the PS error metrics 177. The health metrics 193 determined for a feature vector 151 may, therefore, indicate a likelihood that the acquired physical features 173 correspond to "nominal" behavior and/or operation of the CPC system 101. The health metrics 193 may further include, incorporate, and/or be derived from the CS error metrics 167. The health metrics 193 may, therefore, indicate a likelihood that the acquired physical features 173 and/or cyber features 163 correspond to "nominal" cyber-physical behavior and/or operation of the CPC system 101. The anomaly detector 150 may detect an anomaly pertaining to the behavior and/or operation of the CPC system 101 responsive to the health metrics 193 failing to satisfy one or more "nominal" health thresholds.

In some implementations, the AD metrics 155 determined for feature vectors 151 may comprise anomaly metrics 195 (in addition to and/or in place of CPSC values 192 and/or health metrics 193). The anomaly metrics 195 may quantify a degree to which physical and/or cyber behavior characterized by the feature vectors 151 correspond with (or belong to) "anomalous" behavior and/or operation of the CPC system 101, such as cyber-physical behavior indicative of attack and/or compromise. The anomaly metrics 195 determined for a feature vector 151 may indicate a likelihood that the physical features 173A-P are a result of attack and/or compromise. The anomaly metrics 195 may be based on and/or derived from the PS error metrics 177. Alternatively, or in addition, the anomaly metrics 195 may be based on CS error metrics 167. The anomaly metrics 195 may indicate a degree to which the cyber behavior and/or operation characterized by the cyber features 163A-Y corresponds with (and/or belongs to) "anomalous" behavior and/or operation of the CPC system 101. The anomaly detector 150 may be configured to detect that the CPC system 101 is under attack (and/or has been compromised) in response to anomaly metrics 195 that satisfy the one or more anomaly thresholds.

Figure 1C:
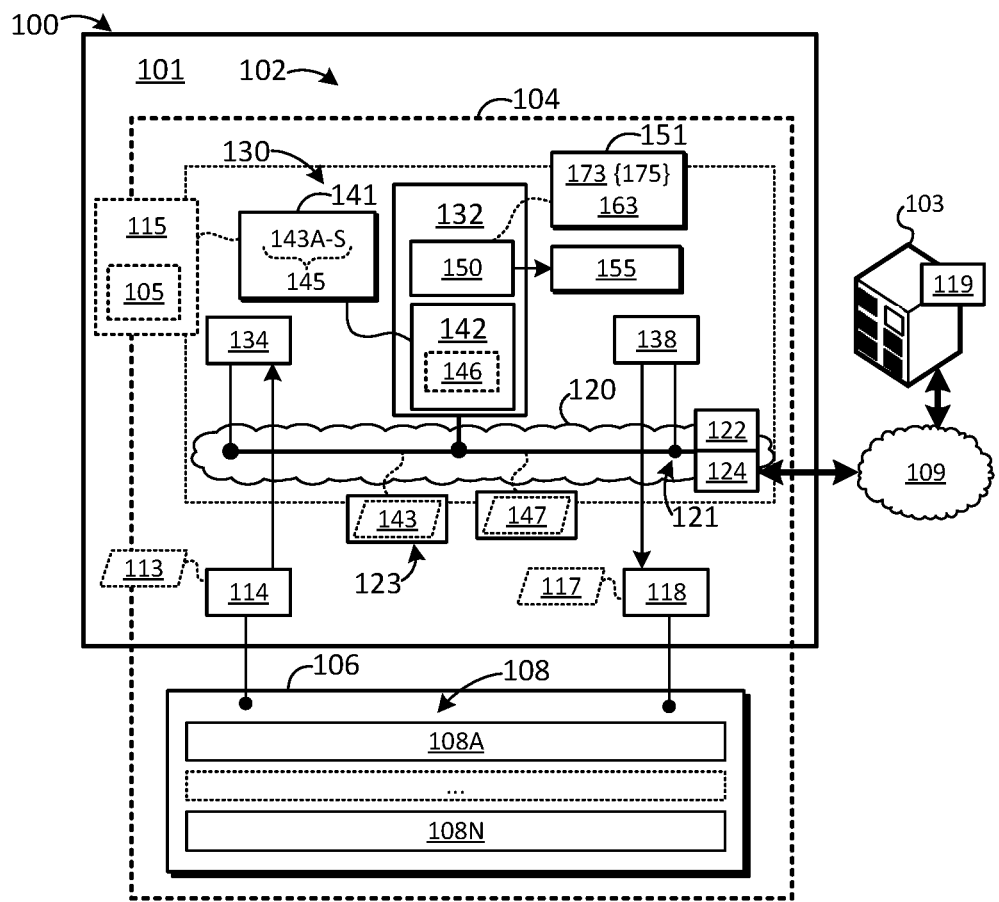
FIG. 1C illustrates another example of a cyber-physical system comprising an anomaly detector.

FIG. 1C illustrates another example of a cyber-physical system 100 comprising a CPC system 101 and anomaly detector 150. The CPC system 101 may comprise, embody, and/or be configured to implement one or more cyber-physical control elements 104. The CPCE 104 may comprise and/or be embodied by control system components 102, including components 102 configured to be operably and/or physically coupled to the physical process 106 (and/or respective elements 108 thereof). The CPC system 101 may further comprise a CPS network 120. The CPS network 120 may comprise an internal and/or private network of the CPC system 101 (and/or CPCE 104). The CPC system 101 may comprise cyber security components 122 configured to secure the CPS network 120. The CPC system 101 may further comprise one or more ICSC 130, HMI components 119, a terminal 103, and/or the like.

The CPCE 104 of the CPC system 101 may be configured to control the process 106. The CPCE 104 may comprise input functionality configured to acquire PS data 113, control functionality configured to implement a control function 142 based on, inter alia, the acquired PS data 113, and output functionality configured to realize decisions of the control functionality. In the FIG. 1C example, the input, control, and/or output functionality of the CPCE 104 may be implemented and/or embodied by one or more ICSC 130 coupled to the CPS network 120 (cyber components 102)L the input functionality may comprise and/or be embodied by one or more input components 134; the control functionality by comprise and/or be embodied by a controller 132; and the output functionality may comprise and/or be embodied by one or more output components 138.

The controller 132 may be configured to implement control functionality of the CPCE 104. Implementing the control functionality may comprise acquiring PS control data 141 pertaining to the physical state 115 of the CPC system 101 and determining control decisions 147 in accordance a control function 142 and/or the physical control state 145 determined of the CPCE 104 (as determined by the acquired physical attributes 143, such as physical attributes 143A-S). The controller 132 may be configured to transition the physical control state 145 to a target state 146 and/or maintain the physical control state 145 at the target state 146 (e.g., transition and/or maintain one or more physical attributes 143 at levels specified by the target state 146). Control decisions 147 determined by the controller 132 may be realized and/or implemented by output functionality of the CPCE 104 (e.g., the output components 138). The output components 138 may receive control decisions 147 through the CPS network 120. The output components 138 may realize and/or implement control decisions 147 by use of one or more actuation devices 118.

In the FIG. 1C example, the CPC system 101 comprises a cyber-physical anomaly detector (anomaly detector 150). The anomaly detector 150 may be operably and/or communicatively coupled to components 102 of the CPC system 101 through, inter alia, the CPS network 120. The anomaly detector 150 may comprise and/or be embodied by a component 102 of the CPC system 101, such as ICSC 130. As illustrated in the FIG. 1C example, the anomaly detector 150 may be implemented on an ICSC 130 configured to implement control functionality of the CPCE 104 (e.g., may be embodied and/or implemented by computing resources 131 of the controller 132). The disclosure is not limited in this regard, however, and could be adapted to deploy the anomaly detector 150 on any suitable ICSC 130 and/or other computing device.

The anomaly detector 150 may be configured to detect anomalies pertaining to the CPC system 101 (and/or CPCE 104) based on an integrated cyber-physical feature set capable of characterizing the physical state 115 of the CPC system 101 (and/or cyber state of the CPC system 101). The anomaly detector 150 may be capable of detecting anomalous cyber and/or physical behaviors indicative of attack and/or compromise. The anomaly detector 150 may, therefore, be capable of detecting attacks that conform with "nominal" cyber behaviors (e.g., detect attacks resulting in anomalous physical behavior regardless of observed network traffic patterns).

As disclosed herein, the anomaly detector 150 may be further configured to develop physical features 173 capable of characterizing the physical state 115 of the CPC system 101 without the need for complex, error-prone, non-scalable, system-specific physical state models. The disclosed physical features 173 may be configured to characterize the physical state 115 of the CPC system 101 over large value ranges (as opposed to individual physical data quantities, which may be incapable of distinguishing "nominal" physical states 115 from "anomalous" physical states 115).

The anomaly detector 150 may be configured to implement anomaly detection operations, comprising: a) acquiring physical features 173 configured to characterize the physical state 115 of the CPC system 101; b) evaluating the acquired physical features 173; and c) classifying the cyber-physical behavior of the CPC system 101 in response to the evaluating (e.g., classifying the cyber-physical behavior as "nominal" or "anomalous"). The evaluating may comprise determining physical state (PS) error metrics configured to quantify the degree to which measurements of the physical attributes 143 associated with the physical features 173 correspond to relationships between the physical attributes 143 defined by the physical features 173.

Alternatively, or in addition, the anomaly detection operations may comprise: a) acquiring feature vectors 151 comprising cyber features 163 configured to characterize a cyber-state of the CPC system 101 and physical features 173 configured to characterize the physical state 115 of the CPC system 101; b) evaluating the acquired feature vectors 151; and c) classifying the cyber-physical behavior of the CPC system 101 in response to the evaluating (e.g., classifying the cyber-physical behavior as "nominal" or "anomalous"). The evaluating may comprise determining AD metrics 155 for respective feature vectors 151, the AD metrics 155 configured to quantify the degree to which cyber-physical behavior characterized by the feature vectors 151 conforms with (and/or belongs to) specified classes of cyber-physical behavior, such as "nominal" or "anomalous" behavior classifications. The AD metrics 155 may indicate whether the CPC system 101 is being attacked and/or has been compromised.

As disclosed above, the anomaly detector 150 may be configured to acquire physical features 173 configured to characterize the physical state 115 of the CPC system 101. The physical features 173 may define PCRC 175 involving specified physical attributes 143. The physical features 173 (and PCRC 175) may be configured in accordance with physical characteristics of the process 106 controlled by the CPC system 101, as disclosed herein. In some implementations, the anomaly detector 150 (and/or other component 102) may be configured to maintain PCRC data 105 pertaining to physical and/or physics-based correlational relationships between respective physical attributes 143 within persistent storage resources of the CPC system 101 (e.g., within persistent storage 139 of an ICSC 130).

The PCRC 175 of a physical feature 173 may define a correlational relationship between a plurality of physical attributes 143, which may enable the anomaly detector 150 to determine an estimate of a first physical attribute 143 of the plurality of physical attributes 143 based, at least in part, on measurements of one or more other physical attributes 143 of the plurality of physical attributes. PS error metrics 177 for the physical feature 173 may be based, at least in part, on a difference between the estimate of the first physical attribute 143 and a measurement of the first physical attribute 143. The PCRC 175 may further enable the anomaly detector 150 to determine an estimate of a second physical attribute 143 of the plurality of physical attributes 143 based, at least in part, on the correlational relationship between the plurality of physical attributes defined by the physical feature 173 and the measurement of the first physical attribute 143. The PS error metrics 177 of the physical feature 173 may be based, at least in part, on the difference between the estimate of the first physical attribute 143 and the measurement of the first physical attribute 143 and a difference between the estimate of the second physical attribute 143 and a measurement of the second physical attribute 143.

Figure 1D:
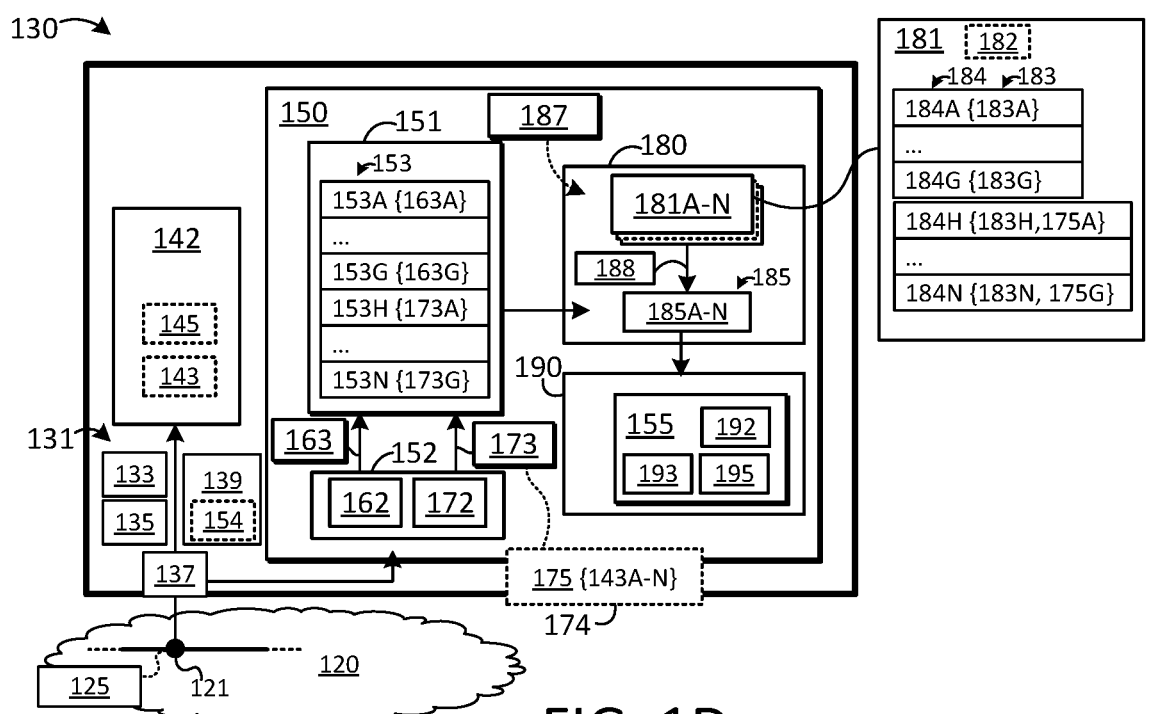
FIG. 1D illustrates another example of an anomaly detector.

FIG. 1D illustrates another example of an anomaly detector 150. The anomaly detector 150 may comprise, be embodied by, and/or be configured for operation on a computing device, such as an ICSC 130. The anomaly detector 150 may comprise and/or be embodied by, inter alia, computer-readable instructions stored non-transitory storage (e.g., instructions stored within persistent storage 139 of the ICSC 130, the instructions configured for execution by the processor 133 of the ICSC 130). In the FIG. 1D embodiment, the anomaly detector 150 may be embodied on the controller 132 of the CPCE 104, as illustrated in FIG. 1C.

As disclosed above, the anomaly detector 150 may be configured to monitor a cyber-physical health of the CPC system 101, which may comprise: a) acquiring feature vectors 151 comprising cyber features 163 configured to characterize a cyber state of the CPC system 101, and physical features 173 configured to characterize a physical state 115 of the CPC system 101 (e.g., in accordance with defined PCRC 175 involving specified physical attributes 143); and b) determining AD metrics 155 for respective feature vectors 151, the AD metrics 155 configured to quantify a degree to which the cyber and/or physical state 115 of the CPC system 101, as characterized by the feature vectors 151, conforms with "nominal" cyber-physical behaviors (and/or the degree to which the cyber and/or physical state 115 conforms with "anomalous" cyber-physical behavior indicative of attack or compromise). The anomaly detector 150 may be further configured to provide the AD metrics 155 to other components 102 of the CPC system 101, which may take actions to respond to and/or mitigate attacks detected by the anomaly detector 150 (e.g., the anomaly detector 150 may provide the AD metrics 155 to a supervisory control device, terminal 103, and/or the like). The anomaly detector 150 may be configured to monitor the cyber-physical health of the CPC system 101 in accordance with a cyber-physical anomaly detection (CPAD) configuration 154, as disclosed herein.

In the FIG. 1D embodiment, the anomaly detector 150 comprises an acquisition module 152. The acquisition module 152 may be configured to construct feature vectors 151 configured to characterize physical and/or cyber behavior of the CPC system 101. In the FIG. 1D example, each feature vector 151 may comprise a plurality of features 153, each feature 153 comprising one of a cyber feature 163 and a physical feature 173. The acquisition module 152 may be configured to construct n-dimensional feature vectors 151, each feature vector 151 comprising n features 153 (e.g., features 153A-G comprising respective cyber features 163A-G and features 153H-N comprising respective physical features 173A-G). The disclosure is not limited in this regard, however, and could be adapted for use with feature vectors 151 of any suitable dimensionality, comprising any number of features 153, and/or features 153 comprising any number of cyber features 163 and/or physical features 173.

The acquisition module 152 may acquire cyber features 163 by use of, inter alia, a cyber-state (CS) monitor 162. The CS monitor 162 may be configured to monitor cyber behavior, such as cyber communication on the CPS network 120, communication between respective control system components 102, and/or the like. In some embodiments, the CS monitor 162 is configured to capture messages 123 at and/or by use of the communication interface 137 of the ICSC 130. Alternatively, or in addition, the CS monitor 162 may comprise and/or be communicatively coupled to other network monitoring means, which may include, but are not limited to: one or more network interfaces, a network interposer, a network monitor, a network sniffer, a network analyzer, a cyber security component 122, a perimeter security component 124, and/or the like. The CS monitor 162 may be acquire cyber features 163 configured to characterize a cyber state of the CPC system 101, as disclosed herein.

The acquisition module 152 may further comprise a physical state (PS) monitor 172. The PS monitor 172 may be configured to construct physical features 173, as disclosed herein. The physical features 173 may be constructed in accordance with respective physical feature (PF) specifications 174. As illustrated in FIG. 1D, a PF specification 174 may define one or more PCRC 175 involving specified physical attributes 143A-N; the PCRC 175 may define bounds of one or more physical attributes 143A-N, specify physics-based correlations between specified physical attributes 143A-N, specify relationships between specified physical attributes 143A-N, and/or the like. The PCRC 175 of the PF specifications 174 may be based on and/or defined by PCRC data 105 pertaining to the CPC system 101, as disclosed herein. The PF specifications 174 for physical features 173A-G may be maintained within the CPAD configuration 154 (e.g., may be stored within non-transitory storage, such as persistent storage 139 of the ICSC 130). Constructing a physical feature 173 may comprise acquiring the physical attributes 143A-N specified by the PF specification 174, and evaluating PCRC 175 of the PF specification 174 (e.g., applying and/or evaluating PCRC 175 involving specified physical attributes 143 of the physical attributes 143A-N).

The PS monitor 172 may be configured to acquire physical attributes 143 from any suitable source. The PS monitor 172 may be configured to acquire physical attributes 143 from the controller 132. As disclosed above, the controller 132 may acquire physical attributes 143 (e.g., physical attributes 143A-S). The physical attributes 143 involved construction of the physical features 173 may comprise a subset of the physical attributes 143A-S acquired by the controller 132. The PS monitor 172 may request, retrieve, extract, and/or otherwise obtain selected physical attributes 143 from the controller 132. Alternatively, or in addition, the PS monitor 172 may be configured to acquire selected physical attributes 143 from one or more other components 102 (e.g., acquire physical attributes 143 from input components 134, acquisition devices 114, other components 102, other ICSC 130, and/or the like). In some embodiments, the PS monitor 172 may be further configured to extract physical attributes 143 from messages 123 captured by the CS monitor. The PS monitor 172 may be further configured to associate physical attributes 143 (and/or the physical features 173 derived therefrom) with respective capture times, as disclosed herein.

The anomaly detector 150 may further comprise a cyber-physical machine learning (CPML) engine 180. The CPML engine 180 may be configured to classify cyber-physical behavior characterized by the feature vectors 151, which may comprise determining AD metrics 155 for the feature vectors 151, as disclosed herein. In the FIG. 1D embodiment, the CPML engine 180 implements a fuzzy logic ML scheme. The CPML engine 180 may comprise fuzzy rules 181 (e.g., fuzzy rules 181A-N), each fuzzy rule 181 corresponding to a respective class of cyber-physical behavior. In some embodiments, the fuzzy rules 181 may be associated with respective cyber-physical behavior (CPB) classifications 182, which may identify the class, type, and/or nature of cyber-physical behavior classified by the fuzzy rule 181. The CPB classifications 182 comprise any suitable means for expressing, defining, quantifying and/or otherwise representing cyber-physical behavior classifications including, but not limited to: identifiers, semantic classifications (e.g., names, labels, designations, or the like, such as "healthy," "nominal," "unhealthy," "anomalous," "attack," "compromised," and/or the like), numeric quantities (e.g., values in a specified range, such as 10 to 1 corresponding to respective classes of cyber-physical behavior), classification probabilities (e.g., indications of the probability and/or likelihood of respective cyber-physical behavior classifications), and/or the like. The CPML engine 180 may comprise nominal fuzzy rules 181 corresponding to respective classes of "nominal" cyber-physical behavior. Alternatively, or in addition, the CPML engine 180 may comprise anomaly fuzzy rules 181 corresponding to respective classes of "unhealthy" and/or "anomalous" cyber-physical behavior (e.g., cyber-physical behavior indicative of attack and/or compromise of one or more control system components 102).

As disclosed above, the feature vectors 151 evaluated by the CPML engine 180 may define an n-dimensional feature space (each dimension corresponding to one of the features 153A-N). As illustrated in FIG. 1D, a fuzzy rule 181 may comprise n fuzzy sets 183, each corresponding to a respective dimension of the n-dimensional feature space (e.g., fuzzy sets 183A-N corresponding to respective features 153A-N). The fuzzy sets 183A-N may define a "fuzzy region" within the n-dimensional feature space that belongs to a specified class of cyber-physical behavior (per the CPB classification 182 of the fuzzy rule 181). The fuzzy rules 181 may further comprise membership functions 184A-N configured to model respective fuzzy sets 183A-N. The membership functions 184A-N may be configured to quantify the degree to which features 153A-N of a feature vector 151 belong to corresponding fuzzy sets 183A-N of the fuzzy rule 181. The degree to which a feature vector 151 belongs with the CPB classification 182 of a fuzzy rule 181 may be determined by, inter alia, applying features 153A-N of the feature vector 151 to corresponding membership functions 184A-N of the fuzzy rule 181, and combining and/or aggregating outputs of the membership functions 184A-N.

In the FIG. 1D embodiment, the CPML engine 180 is configured to determine affinity metrics 185 for respective feature vectors 151, each affinity metric 185 configured to quantify the degree to which cyber-physical behavior characterized by the feature vector 151 corresponds with and/or belongs to a respective fuzzy rule 181 (e.g., affinity metrics 185A-N quantifying the degree to which the feature vector 151 belongs to respective fuzzy rules 181A-N). The affinity metrics 185 may, therefore, quantify the degree to which the cyber-physical behavior characterized by the feature vector 151 belongs to CPB classifications 182 of respective fuzzy rules 181 (e.g., "nominal" cyber-physical behavior, "anomalous" cyber-physical behavior indicative of an attack, or the like).

In the FIG. 1D embodiment, a fuzzy rule 181 may comprise n antecedent fuzzy sets 183 (fuzzy sets 183A-N; $A^j$, j=1 ... n), each fuzzy set 183 ($A^j$) corresponding to a respective dimension of the n-dimensional input space (a respective one of the features 153A-N). As disclosed above, the fuzzy sets 183 may be modeled by respective membership functions 184, each configured to quantify the degree to which the value ($x_j$) of a specified feature 153 belongs to the corresponding fuzzy set 183, as follows:

$$f_{A^j}(x_j) \qquad \text{Eq. 1}$$

In Eq. 1, $f_{A^j}$ is the membership function 184 for the $j^{th}$ fuzzy set 183 ($A^j$) of the fuzzy rule 181, and $x_j$ is the value of the $j^{th}$ feature 153 of the feature vector 151 ($\vec{x}$) The CPML engine 180 may determine an affinity metric 185 between the feature vector 151 and the fuzzy rule 181 by, inter alia, applying values of respective features 153A-N of the feature vector 151 to corresponding membership functions 184A-N of the fuzzy rule 181. In one embodiment, the CPML engine 180 may calculate affinity metrics 185 as a minimum t-norm of the membership functions 184A-N, as follows:

$$f_R(\vec{x}) = \min_{j=1 \ldots n} \{f_{A^j}(x_j)\} \qquad \text{Eq. 2}$$

In Eq. 2, $\vec{x}$ represents an n-dimensional feature vector 151 (comprising features 153A-N), $f_R(\vec{x})$ is the affinity metric 185 for the fuzzy rule 181, $f_{A^j}(x_j)$ is the membership function 184 for the $j^{th}$ fuzzy set 183 of the fuzzy rule 181 ($A^j$), and $x_j$ is the value of the $j^{th}$ feature 153 of the feature vector 151 ($\vec{x}$).

The anomaly detector 150 may further comprise a cyber-physical evaluation (CPE) engine 190, which may be configured to determine AD metrics 155 pertaining to the CPC system 101 (and/or CPCE 104). The CPE engine 190 may be configured to determine AD metrics 155 in response to the acquisition of feature vectors 151 and/or the CPML engine 180 determining affinity metrics 185 for the feature vectors 151. The CPE engine 190 may determine the AD metrics 155 for a feature vector 151 based on, inter alia, the affinity metrics 185 determined for the feature vector 151. In some embodiments, the AD metrics 155 comprise CPSC value 192. The CPSC value 192 may indicate a determined classification of the cyber-physical state and/or behavior of the CPC system 101 as characterized by the feature vector 151. The CPSC value 192 may comprise any suitable means for representing a cyber-physical behavior classification, as disclosed herein (e.g., an identifier, a semantic classification, a numeric quantity, a classification probability, and/or the like). In some embodiments, the CPSC value 192 may comprise and/or correspond to CPB classifications 182 of one or more fuzzy rules 181. The CPSC value 192 determined for a feature vector 151 may comprise and/or correspond to the CPB classification 182 of a selected fuzzy rule 181. The fuzzy rule 181 may be selected based on the affinity metrics 185 determined for the feature vector 151, as follows:

$$y(\vec{x}) = \max_{i=1\ldots M} \{f_{R_i}(\vec{x})\} \quad \text{Eq. 3}$$

In Eq. 3, $y(\vec{x})$ selects the fuzzy rule 181 having maximum affinity with the feature vector 151 of M fuzzy rules 181 (e.g., maximum affinity metric 185, $f_{R_i}(\vec{x})$). In some embodiments, AD metrics 155 may further indicate a confidence in the CPSC value 192. The confidence may be based on and/or derived from the affinity metrics 185 of the selected fuzzy rule 181 (lower affinity metrics 185 indicating lower confidence and higher affinity metrics 185 indicating higher confidence).

As disclosed above, the CPML engine 180 may comprise one or more nominal fuzzy rules 181 configured to classify healthy and/or nominal cyber-physical behavior. In some embodiments, the CPE engine 190 determines AD metrics 155 for feature vectors 151 based on affinity metrics 185 determined for the nominal fuzzy rules 181. The CPE engine 190 may assign a "nominal" CPSC value 192 to a feature vector 151 in response to affinity metrics 185 determined for the nominal fuzzy rules 181 exceeding a threshold, as follows:

$$h(\vec{x}) = \max_{h=1\ldots G} \{f_{R_h}(\vec{x})\} \geq T_h \quad \text{Eq. 4}$$

In Eq. 5, CPE engine 190 assigns a "nominal" CPSC value 192 ($h(\vec{x})$) in response to the maximum affinity metric 185 of G nominal fuzzy rules 181 ($f_{R_h}(\vec{x})$) satisfying a "nominal" threshold ($T_h$); and assigns an "unhealthy" or "anomalous" CPSC value 192 otherwise. The AD metrics 155 may further indicate a confidence in the CPSC value 192, which may be based on, inter alia, the affinity metrics 185, as disclosed herein. The anomaly detector 150 may be configured to detect that the CPC system 101 is under attack (and/or has been compromised) based on the AD metrics 155 (e.g., in response to DA metrics 155 comprising an "unhealthy" or "anomalous" CPSC value 192).

In some embodiments, the AD metrics 155 may comprise health metrics 193 (in addition to and/or in place of CPC values 192). The health metrics 193 may quantify a degree to which cyber-physical behavior characterized by the feature vectors 151 correspond with (or belong to) "nominal" cyber-physical behavior (as defined by one or more nominal fuzzy rules 181). The health metrics 193 may be based, at least in part, on an PS error and/or PS error metric of one or more physical features 173. The PS error of a physical feature 173 may be based on a difference between an estimate of one or more physical attributes 143 of the physical feature 173 and measurements of the one or more physical attributes 143. The physical feature 173 may define a correlational relationship between a plurality of physical attributes 143 of the CPC system 101 (may comprise and/or define a PCRC 175). The estimate of a first physical attribute 143 of the plurality of physical attributes 143 may be derived from measurements of one or more other physical attributes 143 of the plurality of physical attributes 143. The PS error and/or PS error metric of the physical feature 173 may be based on a difference between the estimate of the first physical attribute 143 and a measurement of the first physical attribute 143.

The health metrics 193 determined for a feature vector 151 may, therefore, indicate a likelihood that the features 153A-N correspond with "nominal" CPB classifications 182. The health metrics 193 may be based on and/or derived from affinity metrics 185 determined for nominal fuzzy rules 181, as disclosed herein (e.g., by comparing the affinity metrics 185 to one or more thresholds). The anomaly detector 150 may be configured to detect that the CPC system 101 is under attack (and/or has been compromised) in response to AD metrics 155 comprising health metrics 193 that fail to satisfy one or more health thresholds (e.g., $T_h$). In some implementations, the health metrics 193 may comprise and/or be derived from a PS error and/or PS error metrics configured to quantify a degree to which measurements of the physical attributes 143 of a physical feature 173 conform to the PCRC 175 defined by the physical feature 173. The PCRC 175 may define a correlational relationship between a plurality of physical attributes 143. The PS error and/or PS error metrics may correspond to a difference between estimates of one or more of the plurality of physical attributes 143 and measurements of the one or more physical attributes 143. The estimate of a first physical attribute 143 may be based on measurements of other physical attributes 143 of the plurality of physical attributes 143 and the correlational relationship between the plurality of physical attributes 143 defined by the physical feature 173 (e.g., per the PCRC 175 of the physical feature 173). The PS error and/or PS error metrics may be based on a difference and/or error between the estimate of the first physical attribute 143 and a measurement of the first physical attribute 143.

Alternatively, or in addition, the CPML engine 180 may comprise one or more anomaly fuzzy rules 181 configured to classify "unhealthy" and/or "anomalous" cyber-physical behavior (e.g., cyber-physical behavior indicative of attack and/or compromise of one or more control system components 102). In some embodiments, the CPE engine 190 determines AD metrics 155 for feature vectors 151 based on affinity metrics 185 determined for anomaly fuzzy rules 181. The CPE engine 190 may assign an "unhealthy" or "anomalous" CPSC value 192 to a feature vector 151 in response to affinity metrics 185 for the anomaly fuzzy rules 181 exceeding a threshold, as follows:

$$a(\vec{x}) = \max_{h=1\ldots D} \{f_{R_a}(\vec{x})\} \geq T_a \quad \text{Eq. 5}$$

In Eq. 5, CPE engine 190 assigns an "anomalous" or "unhealthy" CPSC value 192 ($a(\vec{x})$) in response to the maximum affinity metric 185 of D anomaly fuzzy rules 181 ($f_{R_a}(\vec{x})$) satisfying an anomaly threshold ($T_a$); and assigns a "nominal" CPSC value 192 otherwise. The AD metrics 155 may further indicate a confidence in the CPSC value 192, which may be based on, inter alia, the affinity metrics 185, as disclosed herein.

In some embodiments, the AD metrics 155 determined for feature vectors 151 may comprise anomaly metrics 195 (in addition to and/or in place of CPC values 192 and/or health metrics 193). The anomaly metrics 195 may quantify a degree to which cyber-physical behavior characterized by feature vectors 151 correspond with (or belong to) "unhealthy and/or "anomalous" cyber-physical behavior, such as cyber-physical behavior indicative of attack and/or compromise (as defined by one or more anomaly fuzzy rules 181). The anomaly metrics 195 determined for a feature vector 151 may, therefore, indicate a likelihood that the features 153A-N thereof are a result of attack and/or compromise. The anomaly metrics 195 may be based on and/or derived from affinity metrics 185 determined for anomaly fuzzy rules 181, as disclosed herein (e.g., by comparing the affinity metrics 185 to one or more anomaly thresholds). The anomaly detector 150 may be configured to detect that the CPC system 101 is under attack (and/or has been compromised) in response to AD metrics 155 comprising anomaly metrics 195 that satisfy the one or more anomaly thresholds (e.g., $T_\alpha$).

Although particular examples of fuzzy rules 181, affinity metrics 185, and means for deriving AD metrics 155 therefrom as described herein, the disclosure is not limited in this regard and could be adapted to evaluate cyber-physical behavior characterized by respective feature vectors 151 using any suitable methodology and/or technique.

As disclosed above, the fuzzy rules 181 of the CPML engine 180 may be configured to model regions of an n-dimensional feature space. The CPML engine 180 use the fuzzy rules 181 to quantify the degree to which n-dimensional feature vectors 151 belong to respective classes of cyber-physical behavior (as indicated by CPB classifications 182 of the fuzzy rules 181). The fuzzy rules 181 of the CPML engine 180 may comprise n membership functions 184, each configured to quantify the degree to which a respective CF feature 153 belongs to a corresponding fuzzy set 183 of the fuzzy rule 181. In some embodiments, the fuzzy sets 183 and/or membership functions 184 may be developed in accordance with an ML procedure, such as online clustering, nearest neighbor clustering (NNC), and/or the like. The CPML engine 180 may be configured to develop fuzzy rules 181 in response to training data 187. As used herein, training data 187 refers to data involved in training, refining, validating and/or otherwise developing ML functionality, such as fuzzy rules 181, fuzzy sets 183, membership functions 184, and/or the like. Training data 187 may include training measurements of one or more physical attributes 143 of the CPC system 101, the training measurements corresponding to a determined behavior type and/or classification. The training measurements of the physical attributes 143 may correspond to "nominal" operation and/or behavior of the CPC system 101. Alternatively, the training measurements of the physical attributes 143 may correspond to "anomalous" operation and/or behavior of the CPC system 101. The training data 187 may further include training measurements of one or more cyber features 163. The training measurements of the cyber features 163 may correspond to one or more of "nominal" or "anomalous" operation and/or behavior of the CPC system 101 (e.g., "nominal" or "anomalous" operation and/or behavior of the CPS network 120).

In the FIG. 1D embodiment, training data 187 may comprise one or more training feature vectors 151, the training feature vectors 151 comprising features 153 corresponding to known, predetermined classes of cyber-physical behavior (e.g., specified CPB classifications 182). The training data 187 may comprise nominal training feature vectors 151 configured to characterize "nominal" operation of the CPC system 101. Alternatively, or in addition, the training data 187 may comprise anomaly training feature vectors 151 configured to characterize "unhealthy" and/or "anomalous" cyber-physical behaviors (operation during attack and/or compromise of one or more components 102). In some embodiments, the CPML engine 180 may implement an on-line training procedure in which fuzzy rules 181 are developed and/or refined in response to feature vectors 151 captured during operation of the CPC system 101 (e.g., feature vectors 151 captured during "nominal" operation of the CPC system 101). Alternatively, or in addition, the CPML engine 180 may implement dedicated training procedures by use of predetermined training data 187. The predetermined training data 187 may comprise previously captured feature vectors 151 (feature vectors 151 captured during periods in which the CPC system 101 was known to be operating in a "nominal" state), synthetic feature vectors 151 (e.g., algorithmically generated feature vectors 151), simulated feature vectors 151 (feature vectors 151 produced by and/or through simulation of the CPC system 101 and/or CPCE 104), and/or the like.

In some embodiments, the CPML engine 180 is configured to develop fuzzy rules 181 in accordance with an NNC procedure. Developing the fuzzy rules 181 may comprise: obtaining training data 187; iteratively creating and/or refining clusters P in response to the training data 187 (in accordance with an NNC procedure); and deriving fuzzy rules 181 from the clusters P (the fuzzy rules 181 assigned CPB classifications 182 corresponding to the training feature vectors 151 derived therefrom).

In the FIG. 1D embodiment, the CPML engine 180 is configured to develop nominal fuzzy rules 181 in response to nominal training data 187 (nominal training feature vectors 151). The CPML engine 180 may be configured to develop a set of clusters P in response to the nominal training data 187 (a set $\Omega$ of nominal clusters $P_{i\,\ldots\,m}$), each cluster $P_i$ defining a respective center of gravity $\vec{c}_i$, weight $w_i$, and matrix of boundary parameters $M_i$, as follows:

$$P_i = \{\vec{c}_i, w_i, M_i\}, \vec{c}_i = \{c_i^1, \ldots, c_i^n\}, M_i = \begin{vmatrix} \overline{c}_i^1 & \ldots & \overline{c}_i^n \\ \underline{c}_i^1 & \ldots & \underline{c}_i^n \end{vmatrix} \quad \text{Eq. 6}$$

In Eq. 6, i is the index of the $i^{th}$ cluster $P_i$ of the set $\Omega$, $c_i^j$ is the $j^{th}$ feature 153 of n features 153 (the $j^{th}$ dimension of an n-dimensional input space), and $\overline{c}_i^j$ and $\underline{c}_i^j$ are upper and lower bounds for values of the $j^{th}$ feature 153 of feature vectors 151 assigned to the cluster $P_i$. The CPML engine 180 may iteratively create and/or refine the set of clusters ($\Omega$) in accordance with an NNC procedure, comprising: a) receiving a nominal feature vector 151 ($\vec{x}_i$); b) identifying a cluster $P_\alpha$ of $\Omega$ with the smallest distance to $\vec{x}_i$ (e.g., Euclidean distance $d_{\alpha\_i}$); and c) creating a new cluster $P_{i+1}$ for $\vec{x}_i$ in response to $d_{\alpha\_i}$ exceeding a threshold, or d) updating $P_\alpha$ to incorporate $\vec{x}_i$ in response to $d_{\alpha\_i}$ being less than the threshold. Clusters may be created in accordance with the NNC procedure (e.g., per Eq. 6). Alternatively, the nearest cluster $P_\alpha$ may be updated to incorporate $\vec{x}_i$, as follows:

$$\vec{c}_a = \frac{w_a \vec{c}_a + \vec{x}_i}{w_{a+1}}, w_a = w_a + 1$$  Eq. 7

$$\overline{c}_i^j = \max_{j=1\ldots n}(x_i^j, \overline{c}_i^j), \underline{c}_i^j = \min_{j=1\ldots n}(x_i^j, \underline{c}_i^j)$$

In Eq. 7, $\vec{c}_\alpha$ is the center of gravity of cluster $P_\alpha$, $w_\alpha$ is the weight of cluster $P_\alpha$, and $\overline{c}_i^j$ and $\underline{c}_i^j$ are upper and lower bounds of the $j^{th}$ dimension of the n-dimensional input space ($j^{th}$ feature 153). The CPML engine 180 may iteratively create and/or refine the set of clusters (Ω) until one or more termination criteria are satisfied (e.g., a determined time period, after incorporating a threshold number of training feature vectors 151, exhausting available training data 187, user-specified criteria, other termination criteria, and/or the like). The clusters $P_i$ developed in response to nominal training data 187 may define regions of the n-dimensional input space corresponding to "nominal" cyber-physical behavior of the CPC system 101 in accordance with Eq. 6 (define centroids, weights, and/or bounds for each dimension of the n-dimensional input space, e.g., each feature 153A-N).

The CPML engine 180 may be further configured to covert the nominal set Ω of clusters P into respective fuzzy rules 181 (nominal fuzzy rules 181, each corresponding to a respective nominal cluster P). An n-dimensional cluster $P_i$ may be transformed into a fuzzy rule 181 (an $i^{th}$ fuzzy rule 181), which may comprise defining fuzzy sets 183A-N; e.g., fuzzy set 183 ($A_i^j$), which may comprise the $j^{th}$ fuzzy set 183 of the $i^{th}$ fuzzy rule 181. The fuzzy sets 183A-N of the $i^{th}$ fuzzy rule 181 may be derived from the $i^{th}$ cluster $P_i$, each fuzzy set 183 ($A_i^j$) may comprise values of the $j^{th}$ feature 153 distributed between specified bounds (values distributed between a lower bound $\underline{c}_i^j$ and upper bound $\overline{c}_i^j$, per Eq. 6). Developing the $i^{th}$ fuzzy rule 181 may further comprise determining membership functions 184A-N configured to model the respective fuzzy sets 183A-N. In some embodiments, fuzzy sets 183 comprising cyber features 163 may be modeled as statistical distributions (e.g., the membership functions 184 may comprise statistical distribution functions). A membership function 184 may model a fuzzy set 183 ($A_i^j$) associated with a cyber feature 163 by use of a non-symmetrical Gaussian function, $\mu_{A_i^j}(x_j)$, as follows:

$$m_i^j = c_i^j$$

$$\overline{\delta}_i^j = \alpha(\overline{c}_i^j - c_i^j)$$

$$\underline{\delta}_i^j = \alpha(c_i^j - \underline{c}_i^j)$$  Eq. 8

Figure 2:
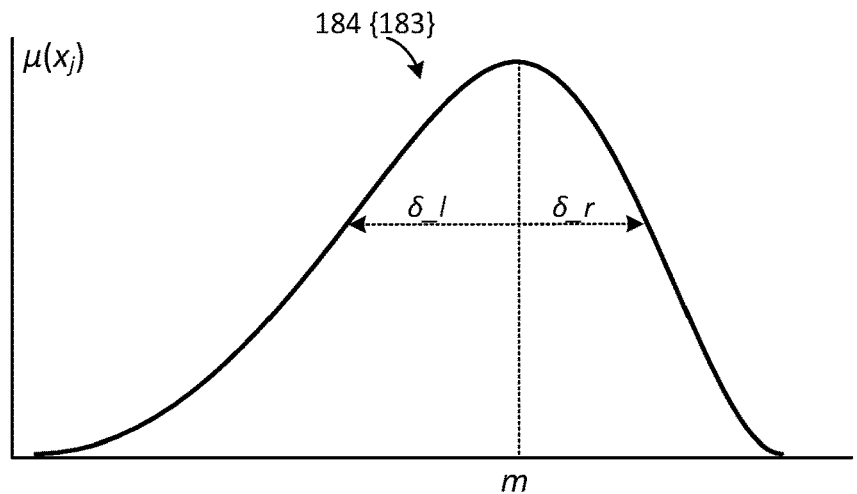
FIG. 2 illustrates examples of a membership function configured to model a feature distribution.

FIG. 2 illustrates a membership function 184 configured to model a distribution 253 of cyber feature 163 values comprising a fuzzy set 183, $A_i^j$ (individual values of the cyber feature 163 not shown in FIG. 2 to avoid obscuring details of the illustrated embodiments). In Eq. 8, $m_i^j$ is the mean, $\overline{\delta}_i^j$ is the left standard deviation, and $\underline{\delta}_i^j$ is the right standard deviation of the Gaussian fuzzy membership function 184, $\mu_{A_i^j}(x_j)$ (labeled as m, $\delta_l$ and $\delta_r$ in FIG. 2). Although particular examples of membership functions 184 are described herein, the disclosure is not limited in this regard and could be adapted to incorporate any suitable means for modeling fuzzy sets 183 ($A_i^j$) and/or suitable type of membership function 184.

As illustrated above, conventional membership functions 184 may be derived from available training data 187 (e.g., training feature vectors 151 comprising features 153 configured to characterize specified classes of cyber-physical behavior). Conventional membership functions 184 may be configured to model respective fuzzy sets 183 using statistical models, such as a Gaussian distribution function, or the like. Although conventional membership functions 184 may be capable of accurately modeling fuzzy sets 183 associated some types of features 153 (e.g., cyber features 163), such membership functions 184 may be incapable of modeling other, more complex phenomena, such as the physical state of the CPC system 101 and/or process 106. Developing models (and/or membership functions 184) pertaining to the physical state of the CPC system 101 may require extensive engineering efforts, be error prone, and non-scalable. Moreover, even if membership functions 184 capable of accurately modeling such physical phenomena could be developed, the capability of such membership functions 184 to produce accurate CPB classifications 182 would still be based entirely on the extent of available training data 187 from which the membership functions 184 (and/or corresponding fuzzy sets 183) were derived. For example, a membership function 184 developed to model particular physical attribute 143, such as an attribute of an element 108 of the process 106 (control variable), may be incapable of adapting to changing set points for the physical attribute 143 (e.g., may misclassify "nominal" cyber-physical behavior exhibited while transitioning between different target states 146 as being indicative of attack and/or compromise). Conventional anomaly detection means may, therefore, be incapable of adequately utilizing physical state information, incorporating physical state information with cyber state information (e.g., combining physical state information with cyber features 163), and/or modeling (and/or developing membership functions 184) capable of characterizing and/or classifying physical state behavior. The disclosed anomaly detector 150 may be configured to address these and other limitations by, inter alia, defining novel physical features 173 pertaining to the physical state of the CPC system 101, incorporating the disclosed physical features 173 into feature vectors 151, utilizing the feature vectors 151 comprising combine cyber features 163 and physical features 173 for ML-based anomaly detection, and constructing ML components (e.g., fuzzy rules 181 and/or membership functions 184) capable of evaluating the disclosed physical features 173 without the need for complex, non-scalable, error-prone physical process models.

As disclosed above, the feature vectors 151 may comprise physical features 173 pertaining to the physical state of the CPC system 101 (e.g., the physical state 115 of the process 106). The physical features 173 may be acquired and/or evaluated in accordance with PF specifications 174. The PF specification 174 of a physical feature 173 define one or more PCRC 175 involving specified physical attributes 143A-N. The PCRC 175 of a physical feature 173 may define one or more PCRC functions ($f_p$) by which estimates of specified physical attributes 143 may be derived from others of the specified physical attributes 143. The CPML engine 180 may be configured determine PCRC metrics for physical features 173, the PCRC metrics quantifying an error, difference, distance, and/or deviation between physical attributes 143 of the physical feature 173 and the PCRC 175 of the physical feature 173. The PCRC metrics may be configured to quantify deviations between respective physical attributes 143 and corresponding estimates derived from other physical attributes 143 in accordance with the PCRC 175 of the physical feature 173. The CPML engine 180 may be further configured to develop PCRC membership functions 184 for respective physical features 173. As used herein, a "PCRC membership function" 184 refers to a membership function 184 configured to incorporate a PCRC 175 of a physical feature 173 (e.g., quantify a degree to which physical attributes 143 of the physical feature 173 conform with the PCRC 175 of the physical feature 173). In the FIG. 1D embodiment, the CPML engine 180 may be configured to develop PCRC membership functions 184 for respective physical features 173 (e.g., develop PCRC membership functions 184H-N for physical features 173A-G, the PCRC membership functions 184H-N incorporating respective PCRC 175A-G of the physical features 173A-G). Developing and/or evaluating a physical feature 173 may comprise determining PCRC metrics 188 for the physical feature 173. The PCRC metrics 188 determined for a physical feature 173 may be configured to quantify a degree to which physical attributes 143 of the physical feature 173 deviate from the PCRC 175 of the physical feature 173. Developing and/or evaluating a plurality of physical features 173A-G may comprise determining a plurality of PCRC metrics 188A-G, each configured to quantify a degree to which physical attributes 143A-N of a respective one of the physical features 173A-G deviates from the PCRC 175A-G thereof.

Figure 3A:
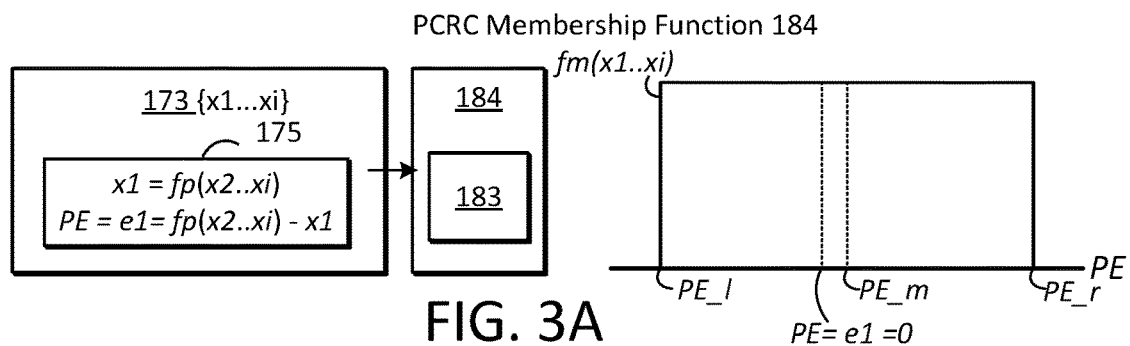
FIG. 3A illustrates a first example of a membership function configured to incorporate relationships between physical attributes.

FIG. 3A illustrates embodiments of a physical feature 173 having a PCRC 175 that defines a physical and/or physics-based correlation between a first physical attribute 143 ($x^1$) and one or more other physical attributes 143 ($x^2 \ldots x^i$). The PCRC 175 may define a PCRC function ($f_p$) by which an estimate of the first physical attribute 143 ($x^1$) may be derived from the physical attributes 143 ($x^2 \ldots x^i$), as follows:

$$\dot{x}^1 = f_p(x^2 \ldots x^i) \quad \text{Eq. 9}$$

In Eq. 9, $\dot{x}^1$ is the estimated value of the first physical attribute 143 ($x^1$) as derived other physical attributes 143 ($x^2 \ldots x^i$) in accordance with the PCRC function ($f_e$). PCRC metrics 188 for the physical feature 173 may comprise and/or be derived from a first estimate metric ($e^1$) configured to quantity an error, difference, distance, and/or deviation between the first physical attribute 143 ($x^1$) and the estimate derived in accordance with the PCRC 175 ($\dot{x}^1$), as $e^1 = f_e^{1}(x^1 \ldots x^i)$, where $f_e^{1}$ is a evaluation function configured to determine error quantities corresponding to estimates of the first physical attribute 143 ($x^1$). In some embodiments, $f_e^{1}$ may quantify differences, as follows: $f_e^{1}(x^1 \ldots x^i) = \dot{x}^1 - x^1$ or $f_e^{1}(x^1 \ldots x^i) = f_p(x^2 \ldots x^i) - x^1$. Alternatively, or in addition, $f_e^{1}$ may be configured to produce quantities between −1 and +1 (or 0 and 1), root mean square (RMS) quantities, and/or the like; e.g., $f_e^{1}(x^1 \ldots x^i) = \sqrt{(\dot{x}^1 - x^1)^2}$ or $$f_e^1(x^1 \ldots x^i) = \sqrt{\frac{(\dot{x}^1 - x^1)^2}{x_m^1}},$$

where $x_m^1$ is an mean value of observed values of the first physical attribute 143 (e.g., $x_{max}^1 - x_{min}^1$). The PCRC metrics 188 of the physical feature 173 may comprise and/or be derived from a plurality of estimate metrics ($e^i$), each corresponding to a respective physical and/or physics-based correlation of the PCRC 175; the PCRC metrics 188 may be derived in accordance with a PCRC evaluation function $f_{PCRC}$ comprising and/or derived from $f_p^{i}$ functions by which estimates of specified physical attributes 143 may be derived and/or corresponding $f_e^{i}$ functions by which the respective estimates may be evaluated). The PCRC 175 of the physical feature 173 illustrated in the FIG. 3A may define a single physical correlation and, as such, the PCRC evaluation function $f_{PCRC}$ by which PCRC metrics 188 of the physical feature 173 are derived may comprise and/or be derived from the first estimate metric; e.g., $PE = e^1$, or $f_{PCRC} = f_e^{1}(x^1 \ldots x^i)$.

The CPML engine 180 may be further configured to develop PCRC membership functions 184 for physical features 173. The PCRC membership function 184 developed for a physical feature 173 may be configured to quantify the degree to which instances of the physical feature 173 conform with the PCRC 175 of the physical feature 173. In some embodiments, a PCRC membership function 184 may be inversely proportional to PCRC metrics 188 of the physical feature 173. In the FIG. 3A embodiment, the PCRC membership function 184 ($f_m$) may be configured to quantify the degree to which physical attributes 143 ($x^1 \ldots x^i$) of the physical feature 173 conform to the PCRC 175 of the physical feature 173. The PCRC membership function 184 ($f_m$) may be based on and/or derived from PCRC metrics 188 (PE) determined for the physical feature 173, which may comprise a first estimate metric ($e^1$) configured to quantify deviation between the first physical attribute 143 ($x^1$) and estimates ($\dot{x}^1$) derived from physical attributes 143 ($x^2 \ldots x^i$) in accordance with the PCRC 175 ($f_p$); $PE = f_{PCRC}(x^1 \ldots x^i) = f_e^{1}(x^1 \ldots x^i)$, as disclosed above.

In the FIG. 3A embodiment, the PCRC membership function 184 ($f_m$) may be configured to produce values indicating membership (e.g., 1 or "true") in response to physical features 173 comprising physical attributes 143 ($x^1 \ldots x^i$) that conform with the PCRC 175, and may produce values indicating non-membership (e.g., 0 or "false") otherwise, per Eq. 10 below:

$$f_m(x^1 \ldots x^i) = PE_l < f_{PCRC}(x^1 \ldots x^i) < PE_r \quad \text{Eq. 10}$$

In Eq. 10, $f_m$ represents the PCRC membership function 184 of the physical feature 173 and $f_{PCRC}$ is a function configured to determine PCRC metrics 188 for the physical feature 173, as disclosed above; quantify error between estimates of the first physical attribute 143 ($\dot{x}^1$ determined per $f_p$ ($x^2 \ldots x^i$)) and the first physical attribute 143 ($x^1$) itself. In the FIG. 3A embodiment, the PCRC membership function 184 may comprise a unit step function and/or square wave bound by determined PCRC thresholds (e.g., left and right PCRC thresholds $PE_l$ and $PE_r$). In some embodiments, the PCRC thresholds may be set according to testing and experience. Alternatively, or in addition, the CPML engine 180 may be configured to learn PCRC thresholds of respective physical features 173.

In some embodiments, the estimated value of a physical attribute 143, such as an estimate of the first physical attribute 143 ($\dot{x}^1$), may deviate from the PCRC 175 during "nominal" operation of the CPC system 101. This PCRC deviation may be due to any number of factors, including, but not limited to: modeling error (e.g., inaccuracies in physical and/or physics based constraints, relationships, and/or correlations defined by the PCRC 175 of the physical feature 173), measurement error, calibration error, acquisition error, acquisition lag, synchronization error, transient error, steady-state error, settling time, jitter, conversion error (e.g., error and/or resolution loss during ADC or DAC), device error (e.g., error introduced by one or more acquisition devices 114, actuation devices 118, input components 134, output components 138, and/or the like), physical characteristics of the process 106 and/or respective process elements 108, and/or the like. The CPML engine 180 may be configured to develop PCRC membership functions 184 configured to model PCRC deviation observed during "nominal" operation of the CPC system 101. The CPML engine 180 may be configured to develop one or more PCRC fuzzy sets 183 in response to nominal training data 187 comprising the physical feature 173 (training data 187 comprising nominal feature vectors 151 configured to characterize "nominal" cyber-physical behavior). As used herein, a "PCRC fuzzy set" 183 refers to a fuzzy set 183 comprising quantities that are based on and/or derived in accordance with PCRC 175 of a physical feature 173. A PCRC fuzzy set 183 may comprise specified physical attributes 143, estimates derived from specified physical attributes 143, estimate metrics ($e^i$), PCRC metrics 188, and/or the like.

In the FIG. 3A embodiment, developing the PCRC membership function 184 may comprise evaluating nominal feature vectors 151 comprising instances of the physical feature 173, the evaluating comprising deriving estimates ($\dot{x}^1$) from physical attributes 143 ($x^2 \ldots x^i$) and determining PCRC metrics 188 configured to quantify deviation between the estimates ($\dot{x}^1$) and the first physical attribute 143 ($x^1$) (e.g., first estimate metrics ($e^1$), as disclosed herein). The evaluating may further comprise assigning physical features 173 to respective PCRC fuzzy sets 183, which may comprise assigning one or more physical attributes 143 ($x^1 \ldots x^i$), of estimates ($\dot{x}^1$), PCRC metrics 188, and/or corresponding estimate metrics ($e^1$) to selected PCRC fuzzy sets 183 (e.g., in accordance with a clustering and/or NNC procedure, as disclosed herein). The PCRC fuzzy sets 183 developed in response to nominal feature vectors 151 may, therefore, indicate a degree to which physical attributes 143 of the physical feature 173 ($x^1 \ldots x^i$) deviate from the PCRC 175 during "nominal" operation of the CPC system 101. The CPML engine 180 may configure a PCRC membership function 184 to model a selected PCRC fuzzy set 183. The PCRC membership function 184 may define PE thresholds in accordance with bounds of the PCRC metrics 188 comprising the selected PCRC fuzzy set 183 (define $PE_l$ and $PE_r$ values in accordance with left and right bounds of PCRC metrics 188 and/or estimate metrics ($e^1$) comprising the selected PCRC fuzzy set 183).

The CPML engine 180 may be further configured to learn an "ideal error" or "offset" $PE_m$ associated with the physical feature 173. The $PE_m$ may indicate average and/or mean PCRC metrics 188 of the corresponding PCRC fuzzy set 183. Alternatively, or in addition, the determined $PE_m$ may indicate average and/or mean estimate metrics associated with respective PCRC functions ($f_p$) of the physical feature 173. In the FIG. 3A embodiment, the $PE_m$ quantity may indicate average and/or mean error associated with the first estimate (e.g., average and/or mean error between $x^1$ and $\dot{x}^1$, as quantified by respective estimate metrics $e^1$). As illustrated in FIG. 3A, the determined $PE_m$ quantity may indicate an offset between the first physical attribute 143 ($x^1$) and estimates ($\dot{x}^1$) derived from corresponding physical attributes 143 ($x^2 \ldots x^1$). The offset quantity $PE_m$ may be due to any number of factors, as disclosed above (e.g., calibration error, jitter, and/or the like). The PCRC membership function 184 illustrated in FIG. 3A may, therefore, be configured to shift, adjust, and/or otherwise modify the PCRC 175 of the physical feature 173 (e.g., determine appropriate PE thresholds and/or PE offset). Evaluation of the PE quantities derived from physical attributes 143 ($x^1 \ldots x^i$) of the physical feature 173 may based on physical and/or physics-based correlations between specified physical attributes 143 ($x^1 \ldots x^i$) and, as such, evaluation of the physical feature 173 may be independent of particular ranges and/or values of physical attributes 143 ($x^1 \ldots x^i$) included in the training data 187. More specifically, evaluation of the PCRC 175 of the physical feature 173 may accurately characterize physical operation of the CPC system 101 regardless of the respective range and/or values of respective physical attributes 143 ($x^1 \ldots x^i$).

Referring back to FIG. 1D, the CPML engine 180 may be configured to determine $PE_m$ for respective physical features 173A-G in response to nominal training data 187 comprising the physical features 173A-G. The CPML engine 180 may determine $PE_m$ as an average and/or mean of PCRC metrics 188 of respective physical features 173A-G and/or respective estimate metrics (averages and/or means of respective estimate metrics $e^i$, each derived from errors associated with feature estimates $\dot{x}^i$ produced by a respective PCRC function $f_p^{\,i}$ as quantified by a respective evaluation function $f_e^{\,i}$, as disclosed herein). The PCRC membership functions 184H-N developed by the CPML engine 180 may, therefore, be configured to shift, adjust, and/or otherwise modify the PCRC 175A-G of respective physical features 173A-G based on and/or in response to the training data 187. Furthermore, the PCRC membership functions 184H-N may be capable of accurately characterizing the physical behavior of the CPC system 101 regardless of the ranges and/or values of respective physical attributes 143 (and/or whether such ranges and/or values were covered in the training data 187).

Figure 3B:
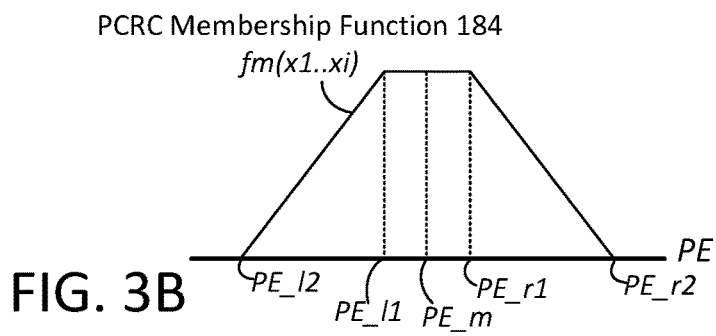
FIG. 3B illustrates a second example of a membership function configured to incorporate relationships between physical attributes.

The CPML engine 180 may configure the PCRC membership function 184 to provide more finely-grained indications of the degree to which physical features 173 conform with respective PCRC 175. FIG. 3B illustrates another embodiment of a PCRC membership function 184 developed for the physical feature 173 of FIG. 3A. As illustrated in FIG. 3B, the PCRC membership function 184 may be configured to return a maximum value (e.g., 1 or "true") for PCRC metrics 188 within first PCRC thresholds (e.g., first left and right thresholds $PE_{l1}$ and $PE_{r1}$), may return lower values in response to PCRC metrics 188 within second PCRC thresholds (e.g., second left and right error thresholds $PE_{l2}$ and $PE_{r2}$), and non-membership values (e.g., 0) otherwise. The CPML engine 180 may be configured to determine and/or learn the respective PCRC thresholds (and/or $PE_m$ quantity) in response to nominal training data 187, as disclosed herein.

Figure 3C:
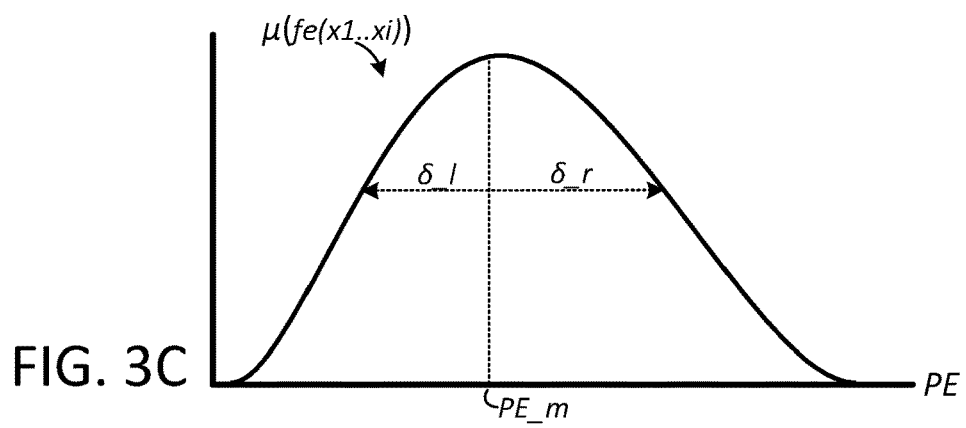
FIG. 3C illustrates a third example of a membership function configured to incorporate relationships between physical attributes.

In another embodiment, the CPML engine 180 may be configured to model a distribution of PCRC metrics 188 (and/or respective estimate metrics). In the FIG. 3C embodiment, the CPML engine 180 may develop a PCRC fuzzy set 183 comprising PCRC metrics 188 for nominal training data 187 comprising the physical feature 173 and may configure the PCRC membership function 184 to model the resulting PCRC fuzzy set 183. The PCRC membership function 184 may be configured to model a distribution of PCRC metrics 188 included in the PCRC fuzzy set 183. The PCRC membership function 184 may be configured to model the PCRC metric distribution using any suitable means (e.g., a statistical distribution). FIG. 3C illustrates an embodiment of a PCRC membership function 184 configured to model the PCRC fuzzy set 183 in accordance with a non-uniform Gaussian distribution $\mu(f_{PCRC}(x^1 \ldots x^i))$ having a determined mean ($PE_m$) and respective deviations ($\delta_l$ and $\delta_r$), as disclosed herein. The PCRC membership function 184 may be derived from one or more clusters developed in response to the nominal training data 187 (e.g., derived from cluster(s) comprising the PCRC fuzzy set 183, as disclosed herein).

Figure 4A:
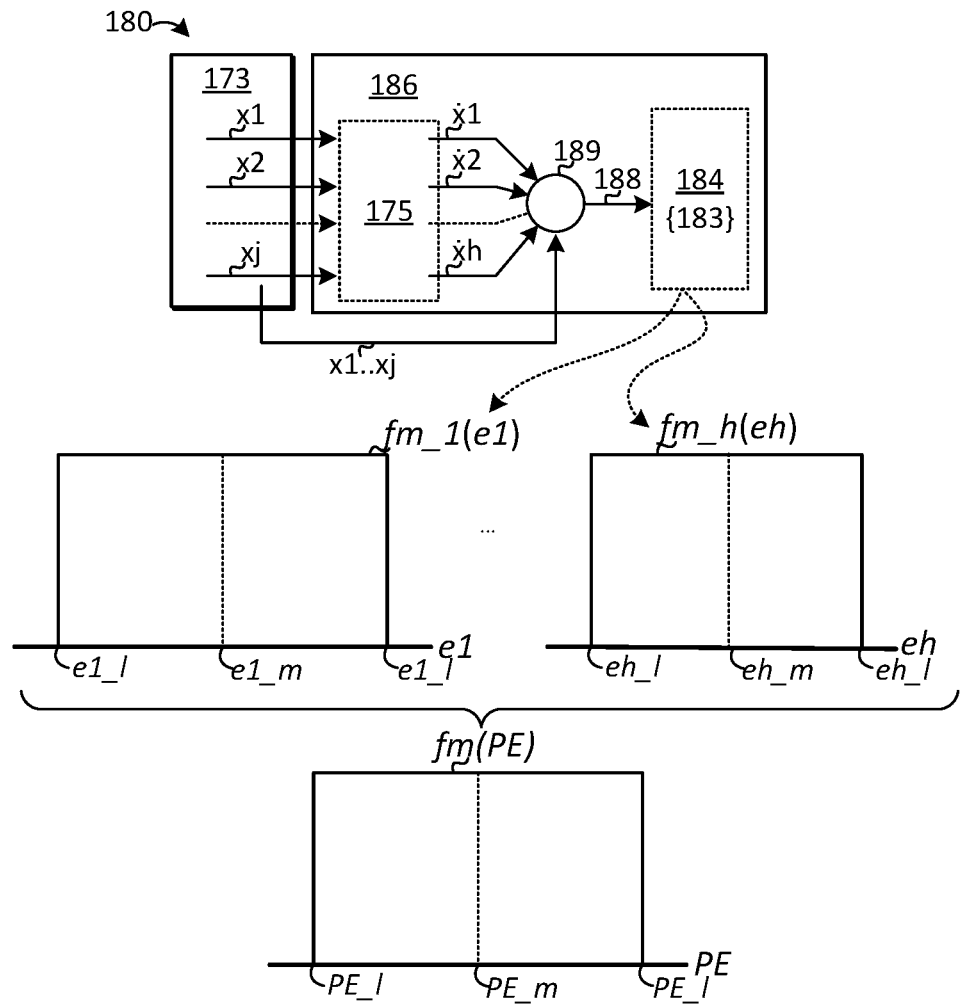
FIG. 4A illustrates an example of a cyber-physical machine learning engine.

As illustrated in FIG. 4A, the CPML engine 180 may comprise a physical feature evaluation (PFE) module 186 configured to, inter alia, evaluate physical features 173, as disclosed herein. The PFE module 186 may be configured to a evaluate physical feature 173 having PCRC 175 defining PCRC functions ($f_p$) for deriving estimates of h of j physical attributes 143 ($x^1 \ldots x^j$). The h estimates ($\dot{x}^i$) may correspond to a subset of the j physical attributes 143 ($x^1 \ldots x^j$); each of the h estimates ($\dot{x}^i$) may be derived from one or more of the j physical attributes 143 ($x^1 \ldots x^j$) in accordance with a respective PCRC function ($f_p^i$), as disclosed herein.

In the FIG. 4A embodiment, the PFE module 186 further comprises a physical feature (PF) evaluator 189. The PF evaluator 189 may be configured to determine PCRC metrics 188 for instances of respective physical features 173, the PCRC metrics 188 configured to quantify a degree to which physical attributes 143 of the physical features 173 ($x^1 \ldots x^j$) deviate from PCRC 175 of the physical features 173. The PCRC metrics 188 may be based on and/or derived from one or more estimate metrics ($e^i$). As disclosed above, the estimate metrics ($e^i$) may be configured to quantify an error, distance, and/or deviation between respective estimates ($\dot{x}^i$) and corresponding physical attributes 143 ($x^i$) of the physical feature 173. The PF evaluator 189 may be configured to produce h estimate metrics ($e^1 \ldots e^h$), each quantifying deviation between a respective one of the h estimates ($\dot{x}^i$) and a corresponding one of the j physical attributes 143 ($x^i$). In one embodiment, the estimate metrics ($e^i$) respective error quantities, differences, distances (e.g., Euclidian distances), RMS quantities, and/or the like, as disclosed herein. The PCRC metrics 188 of a physical feature 173 may be based on and/or derived from the determined estimate metrics ($e^i$); e.g., may comprise a sum, average, mean, maximum, and/or other aggregation of the h estimate metrics ($e^i$). In one embodiment, the PCRC metrics 188 (PE) may comprise an RMS deviation, determined as follows:

$$PE = \sqrt{\frac{\sum_1^h e^i}{h}},$$

where PE is the PCRC metric 188 of the physical feature 173 and $e^i$ is the estimate metric determined for the $i^{th}$ estimate of the physical feature 173 (in accordance with the $i^{th}$ PCRC function $f_p^i$). Alternatively, the PCRC metric 188 may comprise a maximum t-conorm of the estimate metrics ($e^i$). Although particular examples of means for quantifying a degree to which physical features 173 (and/or respective physical attributes 143) conform with PCRC 175 are described herein, the disclosure is not limited in this regard and could be adapted to incorporate any suitable means for defining PCRC 175 involving specified physical attributes 143 and/or quantifying a degree to which the specified physical attributes 143 conform with any suitable physical and/or physics-based constraint, relationship, and/or correlation.

In some embodiments, the PFE module 186 may be further configured to develop PCRC membership functions 184 for physical features 173, as disclosed herein. In the FIG. 4A embodiment, the PFE module 186 may be configured to develop a PCRC membership function 184 configured to incorporate the PCRC 175 of the physical feature 173, which may comprise defining conditions pertaining to comparisons between estimates ($\dot{x}^i$) and corresponding physical attributes 143 ($x^i$). The PCRC membership function 184 may be expressed in terms of one or more physical and/or physics-based constraints and/or correlations of the PCRC 175, as follows:

$$f_m(x^1 \ldots x^j) = \forall i \in h:(\dot{x}^i = = \dot{x}^i) \land \forall i \in m:(x_l^i > x_i > x_r^i) \qquad \text{Eq. 11}$$

In Eq. 11, $f_m$ is the PCRC membership function 184 for a physical feature 173 comprising PCRC 175 defining: a) physical and/or physics-based correlations for deriving h estimates ($\dot{x}^1 \ldots \dot{x}^h$) from specified physical attributes 143 ($x^1 \ldots x^j$); and b) physical and/or physics-based constraints associated with m of the specified physical attributes 143 ($x^1 \ldots x^j$). The PCRC membership function 184 comprises: a) correlation criteria defining comparisons between respective ones of the h estimates ($\dot{x}^i$) and corresponding physical attributes 143 ($x^i$); and b) constraint criteria defining constraints of respective ones of m of the physical attributes 143 (where $x_l^i$ and $x_r^i$ are left and right constraints of the $i^{th}$ physical attribute of the physical feature 173, respectively). In the Eq. 11 embodiment, the PCRC membership function 184 ($f_m$) may return 1 or "true" when the correlation and constraint criteria are satisfied and may return 0 or "false" otherwise (e.g., may comprise a binary or step-wise function). The PCRC membership function 184 may be configured to classify "nominal" physical behavior of the CPC system 101 and, as such, may be incorporated into one or more nominal fuzzy rules 181, as disclosed herein.

As disclosed above, in some embodiments estimates ($\dot{x}^1 \ldots \dot{x}^h$) of a physical feature 173 may deviate from PCRC 175 of the physical feature 173 during "nominal" operation of the CPC system 101. The PCRC deviation may be due to any number of factors, as disclosed above (e.g., measurement error, jitter, modeling error, and/or the like). The PFE module 186 may be configured to develop PCRC membership functions 184 configured to model PCRC deviation. The PFE module 186 may be configured to a develop a PCRC fuzzy set 183 in response to nominal training data 187, the PCRC fuzzy set 183 comprising estimate metrics ($e^i$) for respective ones of the h PCRC functions $f_p^i$ defined by the PCRC 175 of the physical feature 173). The PCRC fuzzy set 183 may, therefore, indicate a degree to which estimates ($\dot{x}^i$) of respective physical attributes 143 ($x^i$) deviate from respective PCRC functions $f_p^i$. As illustrated in FIG. 4A, the CPML engine 180 may be configured to determine a plurality of element membership functions ($f_m^i$), each configured to quantify the degree to which a respective estimate ($\dot{x}^i$) derived from specified physical attributes 143 ($\dot{x}^1 \ldots x^j$) of the physical feature 173 conforms with a respective PCRC function ($f_p^i$) and/or corresponding PS attribute ($x^i$). The PFE module 186 may be configured to determine a mean estimate metric ($e_m^i$) and estimate thresholds (left and right estimate thresholds, $e_l^i$ and $e_r^i$) for respective element membership functions ($f_m^i$). Developing and/or evaluating the PCRC membership function 184 ($f_m$) of the physical feature 173 may comprise developing and/or evaluating the element membership functions ($f_m^1 \ldots f_m^h$). The membership function ($f_m$) may comprise and/or be derived from the element membership functions ($f_m^1 \ldots f_m^h$) (e.g., the output of $f_m$ in response to a physical feature 173 may comprise an average, mean, and/or minimum of outputs of respective element membership functions $f_m^1 \ldots f_m^h$). Alternatively, or in addition, the PFE module 186 may determine a PCRC membership function ($f_m$) configured to model PCRC metrics 188 derived from respective sets of h estimate metrics ($e^i$), as disclosed herein. The PCRC membership function 184 may be configured to quantify the degree to which respective instances of the physical feature 173 belong to the PCRC fuzzy set 183 based on PCRC metrics 188, the PCRC metrics 188 derived from h element metrics ($e^i$), as follows:

$$f_m(x^1 \ldots x^j) = \forall i \in h(e_l^i < e^i < e_r^i), e^i = \dot{x}^i - x^i; \text{ or}$$

$$f_m(x^1 \ldots x^j) = PE_l < PE < PE_r, PE = f_{PCRC}(e^1 \ldots e^h) \quad \text{Eq. 12}$$

In Eq. 12, the PCRC membership function 184 is configured to evaluate whether the h estimates satisfy respective error thresholds calculated as a difference between the estimate ($\dot{x}^i$) and corresponding physical attribute 143 ($x^i$), where $e_l^i$ and $e_r^i$ are left and right estimate thresholds, respectively. Alternatively, or in addition, the PCRC membership function 184 may be configured to model PCRC deviation as quantified by PCRC metrics 188 (PE) of the PCRC fuzzy set 183, the PCRC metrics 188 (PE) based on and/or derived from respective estimate metrics ($e^i$) (e.g., in accordance with a PCRC evaluation function $f_{PCRC}$, as disclosed herein). The PCRC evaluation function ($f_{PCRC}$) may define any suitable means for determining PCRC metrics 188 from respective element metrics ($e^i$) including, but not limited to: an average, mean, sum, maximum, RMS quantity, and/or the like.

Figure 4B:
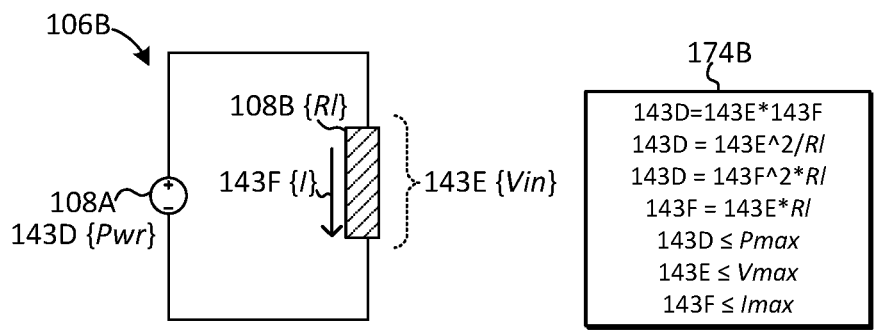
FIG. 4B illustrates an example of a membership function configured to model estimates of respective physical attributes of a physical feature.
Figure 4B:
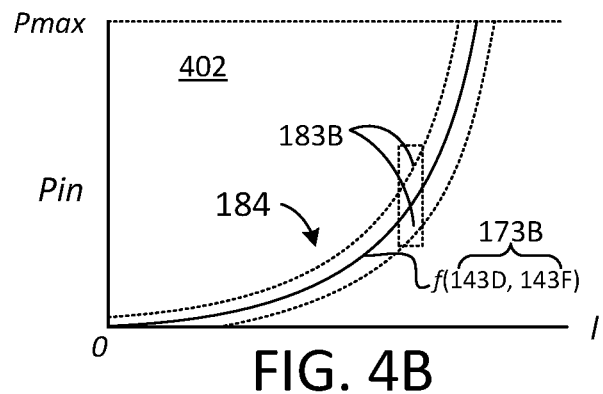

In some embodiments, the CPML engine 180 may be further configured to learn PCRC fuzzy sets 183 comprising element metrics ($e^i$), PCRC metrics 188, and/or the like. Learning the PCRC membership function 184 for a fuzzy rule 181 may comprise modeling a distribution of element and/or PCRC metrics 188 observed in nominal training data 187, as disclosed herein. FIG. 4B illustrates further embodiments of a CPML engine 180 configured to develop element membership functions $f_m^1 \ldots f_m^h$, each configured to model the distribution of a respective element metric ($e^1 \ldots e^h$) of the PCRC fuzzy set 183. The element membership functions $f_m^1 \ldots f_m^h$ may comprise respective non-uniform Gaussian distributions having respective mean and deviation parameters ($e_m^i$, $\delta_l^i$, and $\delta_r^i$) determined in accordance with a suitable ML procedure (e.g., clustering, NNC, and/or the like). Alternatively, or in addition, the PFE module 186 may be configured to develop a PCRC membership function 184 configured to model a distribution of PCRC metrics 188 of the PCRC fuzzy set 183 as a statistical distribution (e.g., a non-uniform Gaussian distribution, as disclosed herein).

Figure 5A:
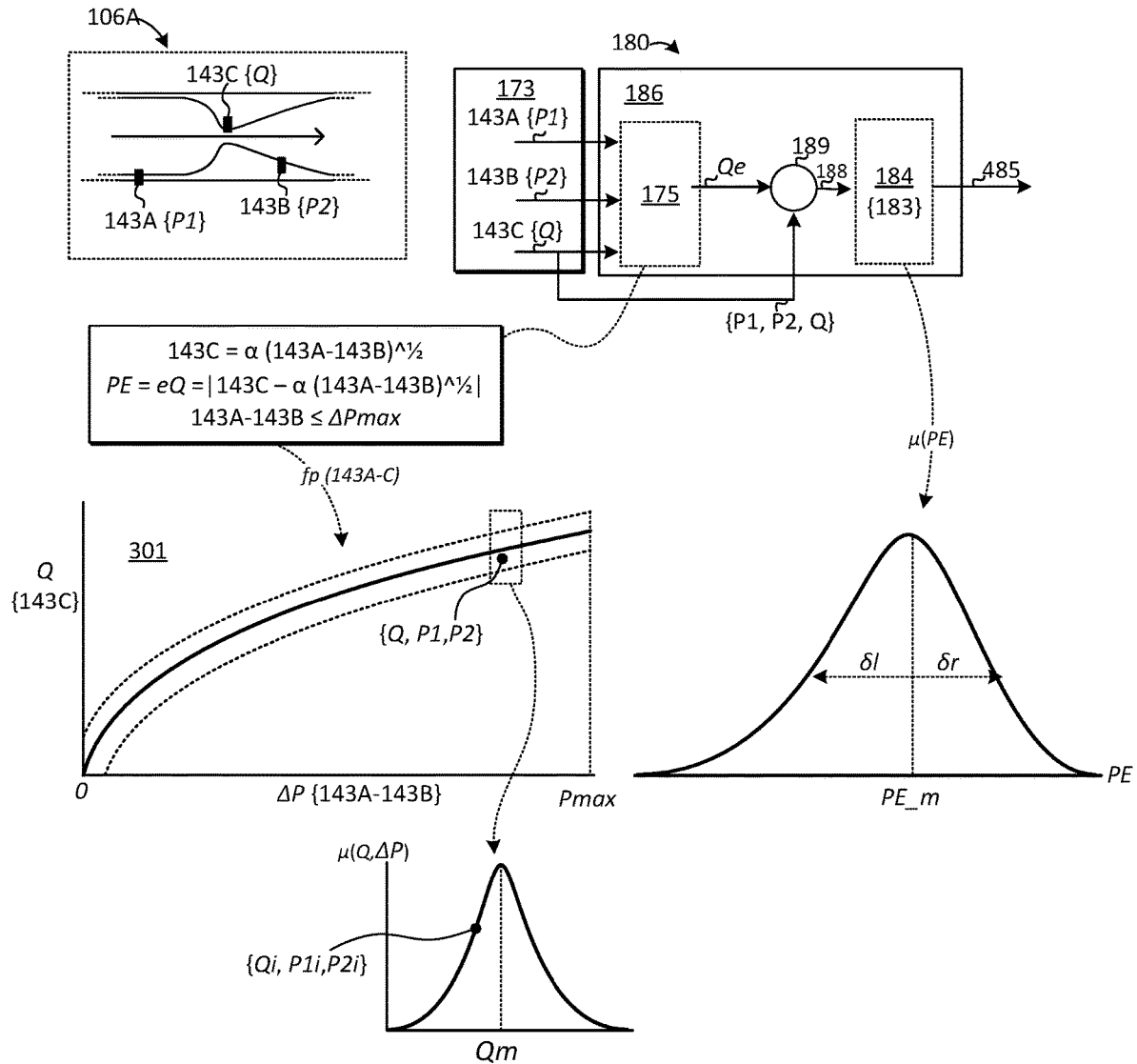
FIG. 5A illustrates a first example of a physical feature evaluation module.

FIG. 5A illustrates another embodiment of a PFE module 186 configured to develop and/or evaluate a physical feature 173 and associated PCRC 175, as disclosed herein. The physical feature 173 of the FIG. 5A embodiment may be configured to characterize physical behavior of a process 106A involving liquid flow across a pressure differential. The PCRC 175 of the physical feature 173 may define physics-based correlations involving a first physical attribute 143A (first pressure measurements, $P_1$), a second physical attribute 143B (second pressure measurements, $P_2$), and a third physical attribute 143C (flow rate Q across the resulting pressure differential ΔP), as follows:

$$Q = \alpha\sqrt{\Delta P}, \Delta P = P_1 - P_2, P_1 \leq P_{max}, P_2 \leq P_{max} \quad \text{Eq. 13}$$

In Eq. 13, α is a flow rate constant and $P_{max}$ is a maximum pressure constraint. As illustrated by plot 301 of FIG. 5A, the PCRC 175 of the physical feature 173 may specify a physical and/or physics-based correlation between physical attribute 143C {Q} and physical attributes 143A-B {ΔP} (e.g., $f_p(Q, P_1, P_2)$, $Q = \alpha\sqrt{P_1 - P_2}$). The physics-based correlation may hold for large ranges of physical attributes 143A-C, including ranges not covered in training data 187. PCRC 175 may further define means for quantifying a degree to which physical attributes 143A-C of respective physical features 173 conform with the PCRC 175 (e.g., define means for determining PCRC metrics 188 for the physical feature 173 in accordance with $f_{PCRC}(Q, P_1, P_2) = PE = e^Q = 143C - \alpha\sqrt{143A - 143B}$). The PFE module 186 may be configured to determine PCRC metrics 188, which may quantify differences between an estimate of physical attribute 143C derived from physical attributes 143A-B (Qe) and the value of physical attribute 143C.

The PFE module 186 may be further configured to develop a PCRC membership function 184 for the physical feature 173. The PCRC membership function 184 may be inversely proportional to PCRC metrics 188 determined for the physical feature 173. Alternatively, or in addition, the PCRC membership function 184 may be configured to quantify the degree to which physical attributes 143A-C conform with (and/or belong to) the PCRC 175 of the physical feature 173. The PCRC membership function 184 may be configured to produce feature affinity metrics 485 in response to instances of the physical feature 173. The feature affinity metrics 485 of the physical feature 173 may quantify a degree to which physical attributes 143A-C of the physical feature 173 conform with (and/or belong to) the PCRC 175 (e.g., degree to which the physical attributes 143A-C, Q, $P_1$, and $P_2$ conform with $f_p$ as illustrated in plot 301). The PCRC membership function 184 may be further configured to incorporate physical constraints defined by PCRC 175. The PCRC membership function 184 may output high feature affinity metrics 485 in response to physical features 173 comprising physical attributes 143A-C that conform with the PCRC 175 (fall along the plot line for $f_p$) and may produce low feature affinity metrics 485 otherwise (e.g., may produce non-membership feature affinity metrics 485 in response to physical features 173 comprising physical attributes 143 that violate one or more of the PCRC 175). Since the PCRC membership function 184 is evaluated in accordance with physics-based relationships between physical attributes 143A-C (as opposed to particular values and/or value ranges of the physical attributes 143A-C), the PCRC membership function 184 may be capable of correctly classifying physical features 173 regardless of whether the corresponding PS attribute ranges were covered by training data 187 used to develop the PCRC membership function 184.

In some embodiments, the PCRC membership function 184 may be further configured to model correlation range(s) at respective pressure differentials (ΔP) and/or flow rates (Q). The correlation range(s) may be configured to expand a range of PS attribute values 143A-C characterized as conforming with the PCRC 175 (e.g., may comprise a region around the plot line for $f_p$ as illustrated in FIG. 5A). The correlation range(s) may comprise and/or be defined by respective PCRC metrics 188 (e.g., mean PCRC metric 188 $PE_M$, left and/or right PE thresholds $PE_l$ and $PE_r$, and so on). The correlation range(s) may be configured to compensate for PCRC deviation, as disclosed herein. The extent of the correlation range(s) may be determined in accordance with testing, observation, and/or experience. Alternatively, or in addition, the correlation ranges may be learned in response to training data 187 comprising the physical feature 173, as disclosed herein.

As illustrated in FIG. 5A, in some embodiments, the PFE module 186 may be configured to develop a PCRC fuzzy set 183 comprising a distribution of PCRC metrics 188 (and/or respective element metrics) associated with the physical feature 173. The PCRC fuzzy set 183 may be developed in response to training feature vectors 151 comprising the physical feature 173, as disclosed herein. The PFE module 186 may determine PCRC metrics 188 for respective training feature vectors 151 and assign the PCRC metrics 188 to respective PCRC fuzzy sets 183 (e.g., a nominal PCRC fuzzy set 183). The PCRC metrics 188 of the nominal PCRC fuzzy set 183 may indicate a degree of PCRC deviation observed in the physical feature 173 during "nominal" operation of the CPC system 101. The PCRC membership function 184 may be configured to model the PCRC fuzzy set 183, as disclosed herein. The PCRC membership function 184 may model the PCRC fuzzy set 183 in accordance with a statistical distribution, such as a non-uniform Gaussian distribution having specified mean and deviation values ($PE_m$, $\delta_l$, and $\delta_r$). In some embodiments, the PFE module 186 may be further configured to determine parameters of the PCRC 175, such as the $\alpha$ parameter of Eq. 13. The PFE module 186 may be configured to determine values for the $\alpha$ that fit values of physical attributes 143 included in training feature vectors 151 at minimal error. The PFE module 186 may, therefore, be configured to shift, adjust, and/or otherwise modify the PCRC 175 of the physical feature 173 in response to training data 187.

The PCRC membership function 184 may be further configured to incorporate physical constraints pertaining to the physical attributes 143A-C. The PCRC membership function 184 may be configured to produce feature affinity metrics 485 in accordance with µ(PE) when the physical attributes 143A and 143B conform with maximum pressure constraint (when $P_1 < P_{max}$, and $P_2 < P_{max}$), and return 0 (non-membership) feature affinity metrics 485 otherwise (in response to physical features 173 comprising physical attributes 143A-B that exceed $P_{max}$).

The PCRC membership function 184 developed in response to nominal training data 187 may be configured to produce feature affinity metrics 485 configured to indicate the degree to which instances of the physical feature 173 conform with the PCRC fuzzy set 183 (and/or conform with the PCRC 175 of the physical feature 173). The PCRC membership functions 184 may, therefore, be included in nominal fuzzy rules 181 configured to classify "nominal" cyber-physical behavior of the CPC system 101. In some embodiments, the anomaly detector 150 may be further configured to define an "anomaly" PCRC membership function 184 for the physical feature 173, which may be configured to quantify the extent to which the physical feature 173 fails to conform with (and/or belong to) the PCRC 175 (the extent to which physical attributes 143A-C fail to conform to Eq. 13). The anomaly membership function 184 may be incorporated into one or more anomaly fuzzy rules 181, as disclosed herein.

Figure 5B:
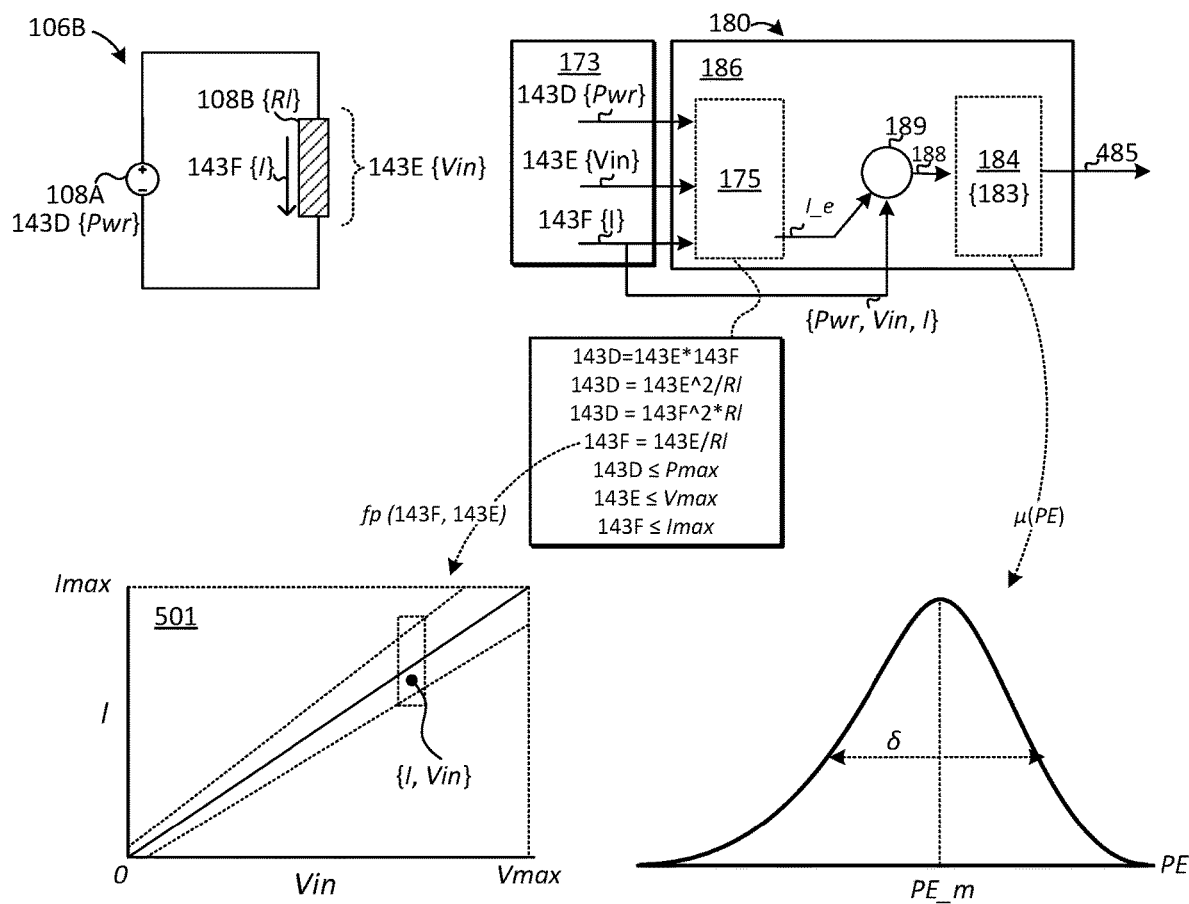
FIG. 5B illustrates a second example of a physical feature evaluation module.

In another non-limiting example illustrated in FIG. 5B, the anomaly detector 150 may define a physical feature 173 configured to characterize physical behavior of a process 106B involving the supply of electrical power (Pwr) to a resistive load ($R_l$). The PCRC 175 of the physical feature 173 may define physics-based correlations and/or constraints pertaining to power (Pwr) produced by a first element 108A (a power supply and/or generator) as quantified by physical attribute 143D, a voltage potential ($V_{in}$) at a second element 108B (e.g., a resistive load, $R_l$) as quantified by physical attribute 143E, and/or current (I) driven across and/or through $R_l$ as quantified by physical attribute 143F. The PCRC 175 may specify relationships such as, $Pwr = V_{in}I$, $$Pwr = \frac{V_{in}^2}{R_l},$$

$Pwr = I^2 R_l$, $V_{in} = IR_l$, and/or the like. The PCRC 175 may further define physical constraints, such as a maximum power output of element 108A, which may determine a maximum current and/or maximum voltage potentials ($V_{max}$ and/or $I_{max}$).

The physical feature 173 of the FIG. 5B embodiment may correspond to the physics-based relationship between physical attribute 143F {I} and physical attribute 143E {$V_{in}$} (e.g., $I = V_{in}/R_l$). As illustrated in plot 501, the physics-based correlations defined of PCRC 175 may enable estimates ($I_e$) of physical attribute 143F (I) to be derived from voltage measurements of physical attribute 143E. The PFE module 186 may be configured to determine PCRC metrics 188 configured to quantify the degree to which estimates of physical attribute 143F ($I_e$) derived from physical attribute 143E conform with the actual measured values of physical attribute 143F. The PCRC metrics 188 may correspond to a distance between actual, measured values of physical attribute 143F (I) and corresponding estimates ($I_e$); e.g., a distance between physical attributes 143F and 143E and the illustrated plot line for $f_p(I, V_{in})$.

The PFE module 186 may be further configured to develop a PCRC membership function 184 that incorporates the PCRC 175 illustrated in FIG. 5B. PCRC membership function 184 may be configured to model correlation range(s) corresponding to the physics-based correlation between physical attributes 143F and 143E. The correlation range(s) may define PCRC thresholds, as disclosed herein (error thresholds between estimates $I_e$ of the physical attribute 143F and measurements of the physical attribute 143F). In some embodiments, thresholds of the PCRC membership function 184 may be substantially constant over ranges of physical attributes 143E and 143F. Alternatively, as illustrated in FIG. 5B, the thresholds may be relative to respective values physical attributes 143E and 143F (may be proportional to the magnitude of physical attributes 143E and 143F in order to, inter alia, compensate for proportionality of resulting correlation errors).

In some embodiments, the PCRC membership function 184 may be configured to model a PCRC fuzzy set 183 comprising a distribution of PCRC metrics 188. The CPML engine 180 may be configured to learn the PCRC fuzzy set 183 in response to training data 187 comprising the physical feature 173, as disclosed herein. The PCRC membership function 184 may be configured to model the distribution of PCRC metrics 188 (and/or respective correlation errors between $I_e$ derived from physical attribute 143E and physical attribute 143F) in accordance with a distribution function, as disclosed herein (e.g., a Gaussian distribution function, or the like). The PCRC membership function 184 may be further configured to incorporate $V_{max}$ and/or $I_{max}$ physical constraints. The CPML engine 180 may determine feature affinity metrics 485 in accordance with µ(PE) when physical attributes 143D-F conform with the physical constraints defined by the PCRC 175 and return 0 (non-membership) feature affinity metrics 485 otherwise (e.g., in response to detecting violation of a physical constraint by one or more physical attributes 143D-F of the physical feature 173). The PCRC fuzzy set 183 and corresponding PCRC membership function 184 may be developed in response to nominal feature vectors 151 and, as such, may be incorporated into one or more nominal fuzzy rules 181, as disclosed herein. In some embodiments, the PFE module 186 may be further configured to develop anomaly PCRC membership function 184 configured to quantify the degree to which physical features 173 fail to conform with the PCRC 175, and may incorporate the anomaly PCRC membership function 184 (and/or corresponding PCRC fuzzy set 183) into one or more anomaly fuzzy rules 181.

Figure 5C:
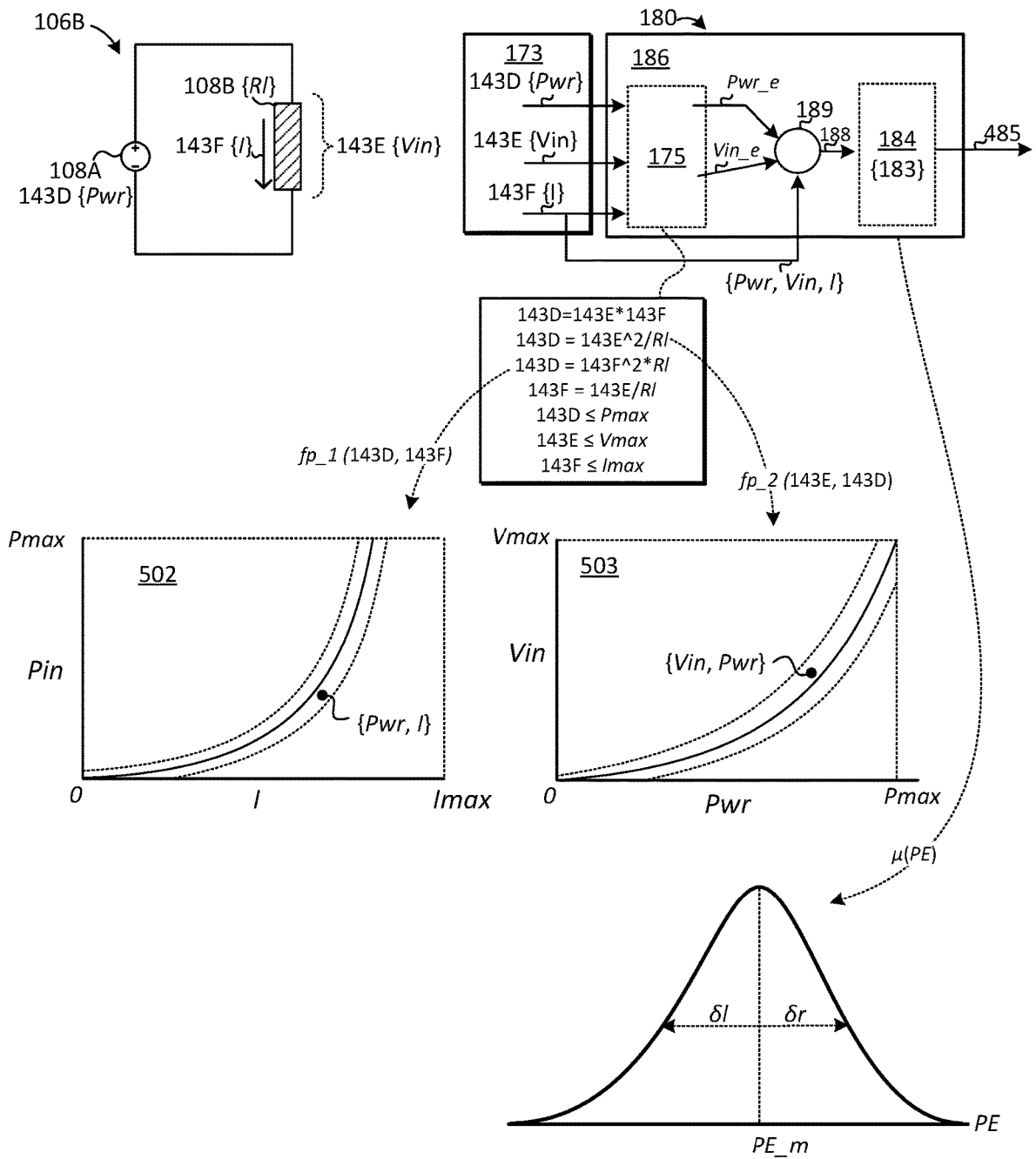
FIG. 5C illustrates a third example of a physical feature evaluation module.

FIG. 5C illustrates further embodiments of a physical feature 173 configured to characterize physical behavior of the process 106B. In the FIG. 5C embodiment, the physical feature 173 may relate to: a) first physics-based correlations between power generated by the element 108A (Pwr) as quantified by physical attribute 143D and current (I) driven through the resistive load ($R_l$), as illustrated in plot 502; and b) second physics-based correlations between $V_{in}$ at the resistive load ($R_l$) as quantified by physical attribute 143E and power per physical attribute 143D, as illustrated in plot 503. Evaluating the physical feature 173 may comprise deriving: a) an output power estimate (Pwr_e) based on physical attribute 143F (per $f_p^1(V_{in}, I)$), and b) an input voltage estimate (Vin_e) based on physical attribute 143D (per $f_p^2(V_{in}, Pwr)$). Evaluating the physical feature 173 may further comprise determining: a) a first element metric ($e^1$) quantifying deviation between the estimated power (Pwr_e) and physical attribute 143D (acquired Pwr), and b) a second element metric ($e^2$) quantifying deviation between the estimated input voltage (Vin_e) and physical attribute 143E (acquired $V_{in}$). PCRC metrics 188 of the physical feature 173 may comprise and/or be derived from the determined element metrics $e^1$ and $e^2$, as disclosed herein. The PCRC metrics 188 may quantify the degree to which physical attributes 143D-F of respective physical features 173 conform to the PCRC 175 (e.g., quantify distances between {Pwr, I} and plot 502 and/or {$V_{in}$, Pwr} and plot 503).

Figure 4C:
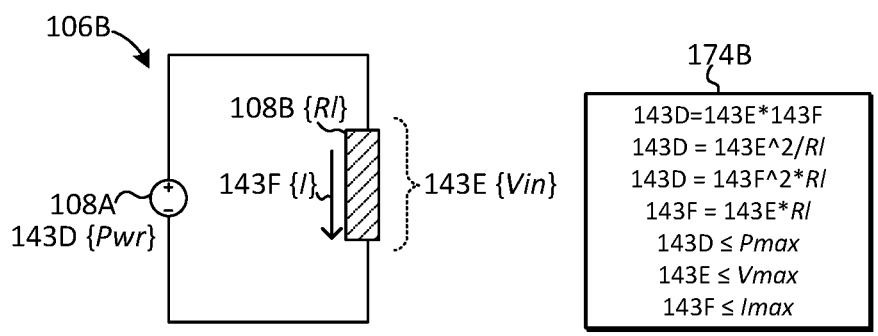
FIG. 4C illustrates an example of a membership function configured to model an error distribution of respective physical attributes of a physical feature.
Figure 4C:
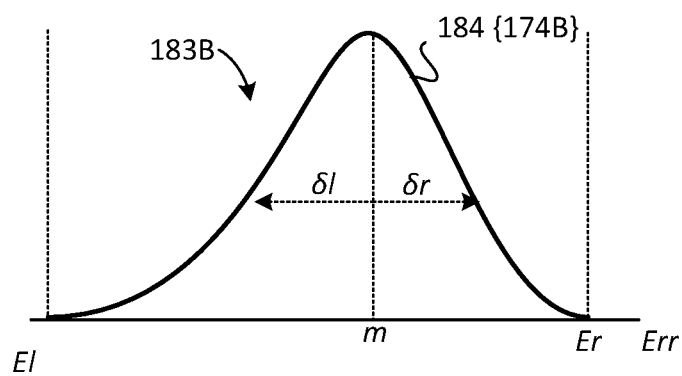

The PFE module 186 may be further configured to develop a PCRC membership function 184 that incorporates the PCRC 175 illustrated in FIG. 5C. In the FIG. 4C embodiment, the PCRC membership function 184 may be configured to incorporate: a) the first physics-based correlation involving physical attributes 143D and 143F (Pwr=$I^2*R_l$), and b) the second physics-based correlation involving physical attributes 143E and 143D ($V_{in}=\sqrt{Pwr*R_l}$). The PCRC membership function 184 may be configured to model correlation range(s) corresponding to the physics-based correlations, as disclosed herein. Alternatively, or in addition, the PCRC membership function 184 may be configured to model a PCRC fuzzy set 183 comprising a PCRC metrics 188 of physical features 173 included in training feature vectors 151. The PCRC membership function 184 may be configured to model a statistical distribution of the PCRC metrics 188 (and/or distributions of respective element metrics $e^1$ and $e^2$), as disclosed herein. The PCRC membership function 184 may be further configured to incorporate constraints pertaining to physical attributes 143D-F, as disclosed herein. The PCRC membership function 184 may return feature affinity metrics in accordance with µ(PE) for physical features 173 comprising physical attributes 143D-F that comply with the defined constraints and may return non-membership feature affinity metrics otherwise (e.g., when physical attributes 143D-F exceed one or more of the $P_{max}$, $V_{max}$, and/or $I_{max}$ constraints). The PCRC membership function 184 (and corresponding PCRC fuzzy set 183) may be developed in response to nominal training data 187 and, as such, may be incorporated into one or more nominal fuzzy rules 181. The PFE module 186 may be further configured to develop an anomaly PCRC membership function 184 configured to quantify a degree to which instances of the physical feature 173 deviate from the PCRC 175 and may incorporate the anomaly PCRC membership function 184 (and/or corresponding PCRC fuzzy sets 183) into anomaly fuzzy rules 181.

Figure 6:
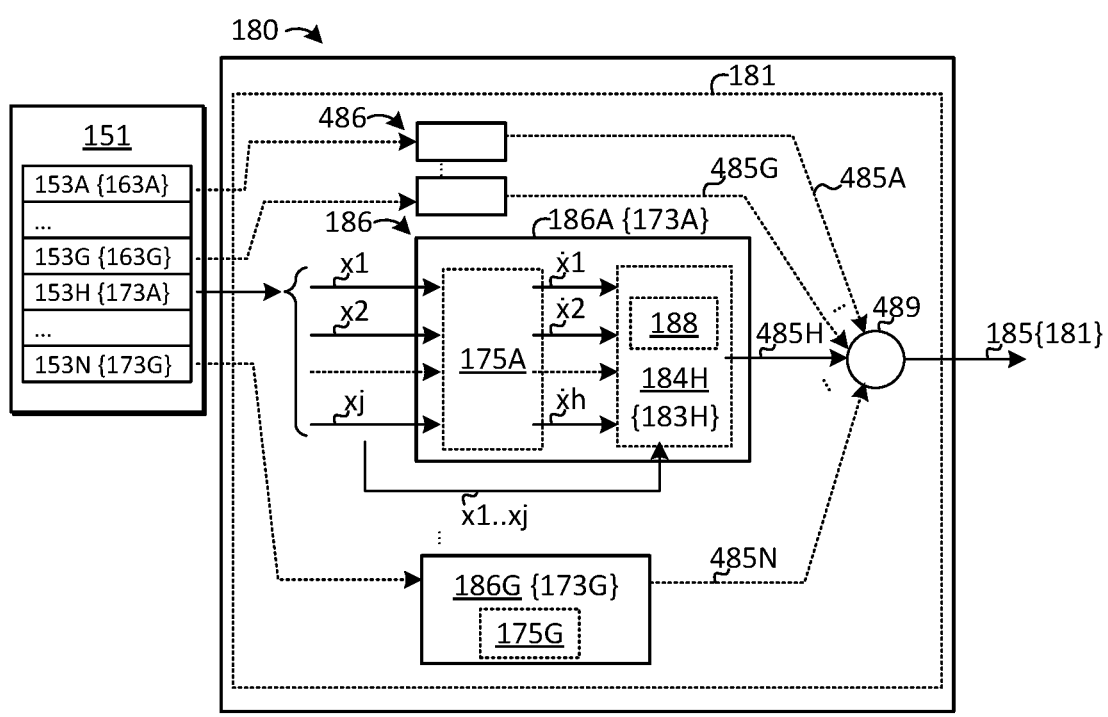
FIG. 6 illustrates another example of a cyber-physical machine learning engine.

FIG. 6 illustrates another example of a CPML engine 180, as disclosed herein. The CPML engine 180 may be configured to evaluate n-dimensional feature vectors 151 comprising cyber features 163 and physical features 173. Evaluating a feature vector 151 may comprise determining affinity metrics 185 configured to quantify the degree to which the feature vector 151 conforms with (and/or belongs to) specified fuzzy rules 181. In the FIG. 6 embodiment, the affinity metrics 185 for a fuzzy rule 181 may be a combination of feature affinity metrics 485 determined for respective features 153 of the feature vector 151. The CPML engine 180 may comprise cyber feature evaluation (CFE) modules 486 configured to evaluate respective cyber features 163 (e.g., cyber features 163A-G) and PFE modules 186 configured to evaluate respective physical features 173 (e.g., physical features 173A-G). The CFE modules 486 may be configured to evaluate membership functions 184 associated with respective cyber features 163A-G, as disclosed herein. The feature affinity metrics 485A-G produced by the cyber-feature membership functions 184 may be configured to quantify the degree to which respective cyber features 163A-G conform with (and/or belong to) corresponding antecedent fuzzy sets 183 of the fuzzy rule 181. The cyber-feature membership functions 184 may be configured to model statistical distributions of respective cyber features 163A-G, as disclosed herein.

The CPML engine 180 may further comprise PFE modules 186 configured to determine feature affinity metrics 485H-N quantifying the degree to which respective physical features 173A-G conform with the PCRC 175 thereof. The feature affinity metrics 485 determined for a physical feature 173 may quantify a degree to which physical attributes 143A-N of the physical feature 173 conform with (and/or belong to) the PCRC 175 of the physical feature 173. In the FIG. 6 embodiment, the PFE module c may be configured to quantify the degree to which physical feature 173A conforms with PCRC 175A, and so on, with PFE module 186G quantifying the degree to which physical feature 173G conforms with PCRC 175G.

Determining feature affinity metrics 485 for physical feature 173 may comprise evaluating one or more PCRC membership functions 184 (and/or element membership functions), as disclosed herein. In the FIG. 6 embodiment, the PCRC 175A may define physics-based correlations involving j physical attributes 143 ($x^1 \ldots x^j$). The PCRC 175A may define h PCRC functions ($f_p^1 \ldots f_p^h$) by which h PS attribute estimates ($\dot{x}^1 \ldots \dot{x}^h$) may be derived from one or more physical attributes 143 ($x^1 \ldots x^j$) of the physical feature 173A. In some embodiments, the PCRC membership function 184H may be based on PCRC metrics 188, which may be configured to quantify a degree to which physical attributes 143 ($x^1 \ldots x^j$) of the physical feature 173A conform with the PCRC 175A. The PCRC metrics 188 may comprise and/or be derived from element metrics ($e^1 \ldots e^h$) configured to quantify the degree to which respective PS attribute estimates ($\dot{x}^i$) conform with respective PCRC functions ($f_p^i$); e.g., quantify error between physical attributes 143 ($x^i$) of the physical feature 173A and estimates ($\dot{x}x^i$) derived from specified physical attributes 143 ($x^1 \ldots x^j$) in accordance with respective PCRC functions ($f_p^i$) of the PCRC 175A. Alternatively, or in addition, determining the feature affinity metric 485H may comprise evaluating a PCRC membership function 184H configured to model a PCRC fuzzy set 183H comprising a distribution of PCRC metrics 188 (and/or distributions of respective element metrics $e^j$), as disclosed herein.

The CPML engine 180 may further comprise an affinity evaluator 489 configured to determine affinity metrics 185 for the feature vector 151 (and fuzzy rule 181). The affinity evaluator 489 may be configured to combine feature affinity metrics 485A-N determined for respective features 153A-N. The affinity evaluator 489 may implement any suitable scheme for combining, aggregating, and/or otherwise deriving affinity metrics 185 from a plurality of feature affinity metrics 485A-N. In some embodiments, the affinity evaluator 489 may determine affinity metrics 185 in accordance with a minimum t-norm scheme (e.g., the affinity metric 185 may comprise a minimum t-norm of feature affinity metrics 485A-N). Although particular examples of feature affinity metrics 485 (and corresponding affinity metrics 185) are disclosed herein, the disclosure is not limited in this regard and could be adapted to incorporate any suitable means for quantifying affinity between respective features 153 and fuzzy rule membership functions 184 and/or means for aggregating, combining, and/or otherwise deriving affinity metrics 185 from such feature affinity metrics 485.

Figure 7:
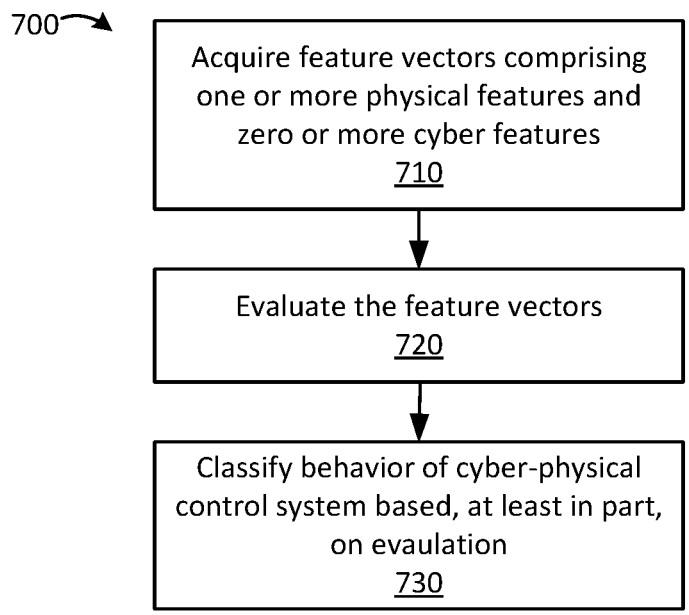
FIG. 7 is a flow diagram illustrating a first example of a method for anomaly detection in cyber-physical systems.

FIG. 7 is a flow diagram illustrating a first example of a method 700 for monitoring the cyber-physical health of a CPC system 101 (and/or detecting anomalous behavior of cyber-physical system 100, such as CPC systems 101). The steps and/or operations of the method 700 (and/or other methods described herein) may be implemented by a processor of a computing device, such as the processor 133 of an ICSC 130. The steps and/or operations may be implemented and/or embodied as computer-readable instructions stored on a non-transitory storage medium of a computing device, such as the persistent storage 139 of an ICSC 130. The computer-readable instructions may be configured to cause the computing device (and/or processor thereof) to implement respective steps and/or operations. Alternatively, or in addition, one or more of the steps and/or operations may be implemented by hardware components, such as logic circuitry, processing circuitry, an ASIC, an FPGA, and/or the like.

Step 710 may comprise acquiring feature vectors 151, as disclosed herein. Step 710 may comprise acquiring one or more physical features 173 and zero or more cyber features 163. Acquiring the cyber features 163 may comprise monitoring cyber communication, as disclosed herein. Acquiring the cyber features 163 may further comprise capturing messages 125 during respective monitoring windows and deriving cyber features 163 for the respective monitoring windows based on, inter alia, the captured messages 125. The cyber features 163 may comprise statistical characteristics of the captured messages 125, as disclosed herein.

Step 710 may comprise acquiring physical features 173 in accordance with respective PF specifications 174. The PF specification 174 of a physical feature 173 may define PCRC 175 involving specified physical attributes 143A-N. Step 710 may comprise determining PCRC 175 of physical features 173 in accordance with PCRC data 105, as disclosed herein. Step 710 may comprise defining physical and/or physics-based constraints, relationships, and/or correlations involving specified physical attributes 143A-N.

Step 710 may comprise acquiring physical attributes 143A-N of respective physical features 173 (in accordance with the PF specifications 174 thereof).

Step 720 may comprise evaluating the feature vectors 151 acquired at step 710. Step 720 may comprise applying the feature vectors 151 to membership functions 184 of respective fuzzy rules 181, each fuzzy rule 181 associated with a respective CPB classification 182. The fuzzy rules 181 may be developed, refined, and/or validated by use of training data 187, as disclosed herein. Step 720 may comprise developing membership functions 184 associated with cyber features 163 in accordance with clustering and/or NNC ML procedures, as disclosed herein. Step 720 may further comprise developing PCRC membership functions 184 for respective physical features 173. The PCRC membership function 184 of a physical feature 173 may be configured to incorporate PCRC 175 of the physical feature 173. The PCRC membership function 184 of a physical feature 173 may be configured to quantify the degree to which physical attributes 143 of the physical feature 173 conform with (and/or belong to) the PCRC 175 of the physical feature 173. In some embodiments, developing a PCRC membership function 184 may comprise developing a PCRC fuzzy set 183 comprising PCRC metrics 188 (and/or respective element metrics $e^j$) produced in response to physical features 173 included in training data 187. Step 720 may further comprise configuring the PCRC membership function 184 to model the PCRC fuzzy set 183. The PCRC membership functions 184 evaluated at step 720 may, therefore, be configured to quantify a degree to which PCRC metrics 188 of the physical features 173 conform with (and/or belong to) PCRC fuzzy sets 183 modeled thereby.

Step 720 may comprise determining affinity metrics 185 for respective fuzzy rules 181, each configured to quantify a degree to which the cyber-physical behavior characterized by the feature vector 151 conform with (and/or belong to) the class of cyber-physical behavior associated with the respective fuzzy rule 181. Step 720 may comprise determining a plurality of affinity metrics 185A-N for the feature vector 151, each configured to quantify the degree to which cyber-physical behavior characterized by the feature vector 151 conforms with (and/or belongs to) a respective fuzzy rule 181A-N. The affinity metrics 185 of a fuzzy rule 181 may be based on and/or derived from feature affinity metrics 485 of the fuzzy rule 181. The feature affinity metrics 485 of a fuzzy rule 181 may be configured to quantify a degree to which respective features 153 of the feature vector 151 conform with (and/or belong to) membership functions 184 (and/or fuzzy sets 183) of the fuzzy rule 181. Determining affinity metrics 185 for a fuzzy rule 181 may comprise: a) determining feature affinity metrics 485 for respective cyber features 163 of the feature vector 151 (e.g., feature affinity metrics 485A-G); b) determining feature affinity metrics 485 for respective physical features 173 of the feature vector 151 (e.g., feature affinity metrics 485H-N); and c) deriving the affinity metric 185 from the determined feature affinity metrics 485 (e.g., feature affinity metrics 485A-N). In some embodiments, the affinity metric 185 of a fuzzy rule 181 may comprise a minimum t-norm of the feature affinity metrics 485A-N of the fuzzy rule 181.

Step 730 may comprise classifying behavior of the cyber-physical system 100 (and/or CPC system 101) based, at last in part, on the evaluation of the feature vector(s) 151 at 720. Step 730 may comprise classifying the cyber-physical behavior of the CPC system 101 as "nominal" in response to affinity metrics 185 of nominal fuzzy rules 181 exceeding one or more health thresholds. Alternatively, step 730 may comprise classifying the cyber-physical behavior of the CPC system 101 as "unhealthy" or "anomalous" in response to affinity metrics 185 of anomaly fuzzy rules 181 exceeding one or more anomaly thresholds. In some embodiments, step 730 comprises determining AD metrics 155, as disclosed herein. Step 730 may comprise determining a CPSC value 192, which may correspond to a CPB classification 182 of the fuzzy rule 181 assigned to the feature vector 151. The fuzzy rule 181 may be assigned in accordance with affinity metrics 185 determined for respective fuzzy rules 181.

Figure 8:
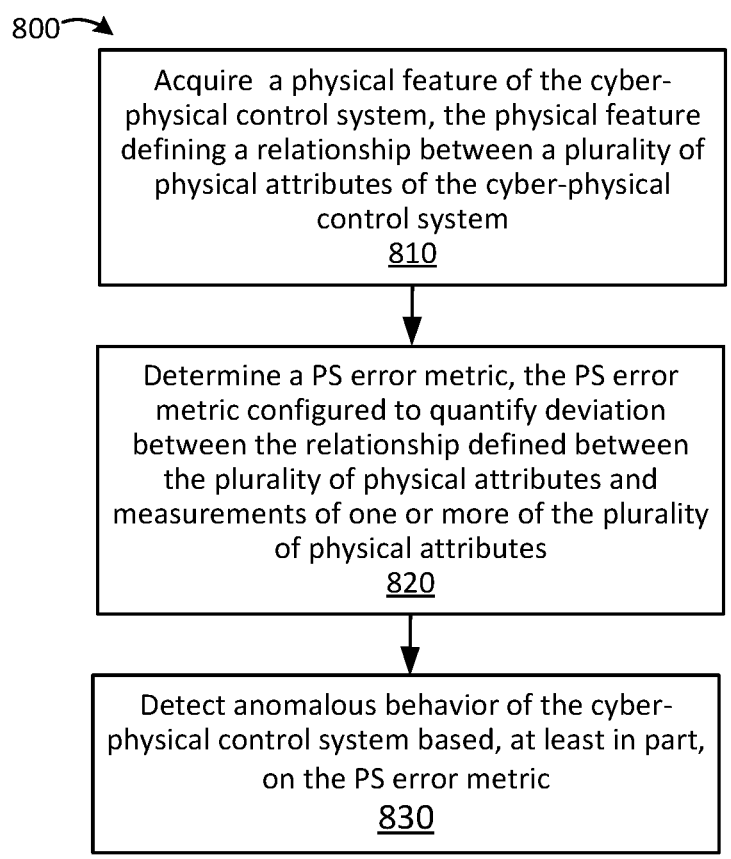
FIG. 8 is a flow diagram illustrating a second example of a method for anomaly detection in cyber-physical systems.

FIG. 8 is a flow diagram illustrating a second example of a method 800 for anomaly detection in cyber-physical systems 100. At 810, an anomaly detector 150 is configured to acquire a physical feature 173 of a cyber-physical system 100, the physical feature 173 defining a relationship between a plurality of physical attributes 143 of the cyber-physical system 100 (e.g., the physical features 173 comprising and/or defining PCRC 175 involving a plurality of physical attributes 143). The relationship defined by the physical feature 173 (and/or PCRC 175 thereof) may correspond to a physics-based correlational relationship between the plurality of physical attributes 143.

Acquiring the physical feature 173 may comprise receiving measurements of one or more physical attributes 143. The physical attributes 143 may be acquired by a PS acquisition module 172. The physical attributes 143 may be measured by one or more acquisition devices 114 coupled to process 106 of the cyber-physical system 100 (e.g., one or more sensor devices or the like). The measurements of the physical attributes 143 may be received through an electronic communication network, such as a CPS network 120 of the cyber-physical system 100.

At 820, the anomaly detector 150 determines a PS error metric 177, the PS error metric 177 configured to quantify deviation between the relationship defined between the plurality of physical attributes 143 (e.g., the PCRC 175 of the physical feature 173) and measurements of one or more of the plurality of physical attributes 143. At 820, the anomaly detector 150 may determine an estimate of a first physical attribute 143 of the plurality of physical attributes 143. The estimate may be based on the relationship between the plurality of physical attributes (the PCRC 175 of the physical feature 173) and measurements of one or more other physical attributes 143 of the plurality of physical attributes 143. The PS error metric 177 may be based, at least in part, on a difference between the estimate of the first physical attribute 143 and a measurement of the first physical attribute 143. At 820, the anomaly detector 150 may be further configured to determine an estimate of a second physical attribute 143 of the plurality of physical attributes 143 based on the relationship between the plurality of physical attributes 143 (the PCRC 175 of the physical feature 173) and the measurement of the first physical attribute 143. The PS error metric 177 may be based, at least in part, on the difference between the estimate of the first physical attribute 143 and the measurement of the first physical attribute 143 and a difference between the estimate of the second physical attribute 143 and a measurement of the second physical attribute 143.

At 830, the anomaly detector 150 may detect anomalous behavior of the cyber-physical system 100 based, at least in part, on the PS error metric 177. The anomaly detector 150 may determine whether the physical feature 173 indicates "nominal" behavior and/or operation of the cyber-physical system 100 or "anomalous" behavior and/or operation of the cyber-physical system 100. The anomaly detector 150 may be configured to implement one or more mitigation actions in response to detection of "anomalous" behavior. The mitigation actions may include issuing an alert and/or other notification to authorized personnel (e.g., through a terminal 103 and/or other HMI components 119 of the cyber-physical system 100). The mitigation actions may further include identifying the source of the "anomalous" behavior, such as the components 102 involve in the anomaly detection (e.g., components 102 associated with the physical feature 173). The mitigation actions may include operations to disconnect one or more of the components 102, reconfigure one or more of the components, isolate one or more of the components 102 from the cyber-physical system 100, and/or the like.

In some implementations, the anomaly detector 150 is configured to compare the PS error metric 177 to a threshold for the physical feature 173 (an error threshold, such as a PS error threshold determined for the physical feature 173). The PS error threshold may be determined based on a deviation between training measurements of the plurality of physical attributes 143, the training measurements configured to characterize "nominal" behavior and/or operation of the cyber-physical system 100. The "anomalous" behavior may be detected responsive to the PS error metric 177 exceeding the error threshold.

Alternatively, or in addition, the anomaly detector 150 may be configured to derive a first membership function 184 for the physical feature 173. The first membership function 184 may be derived from one or more fuzzy sets 183, the one or more fuzzy sets 183 corresponding to "nominal" operation of the cyber-physical system 100 and comprising training measurements of the plurality of physical attributes 143. The first membership function 184 may be configured to model a PS error distribution, the PS error distribution corresponding to differences between the training measurements of the plurality of physical attributes 143 and the relationship between the plurality of physical attributes 143 defined by the physical feature 173 (e.g., the PCRC 175 of the physical feature 173). At 830, the anomaly detector 150 may be configured to utilize the first membership function 184 to determine the PS error metric 177, the PS error metric 177 configured to quantify a degree to which the acquired measurements of the physical attributes 143 conform to the PS error distribution of the first membership function 184. Alternatively, or in addition, the anomaly detector 150 may determine an affinity metric 185 for the physical feature 173, the affinity metric 185 quantifying a degree to which the acquired measurements conform to the one or more fuzzy sets 183. The PS error metric 177 may be inversely proportional to the affinity metric 185.

In some implementations, the one or more fuzzy sets 183 further comprise training measurements of a cyber feature 163, the training measurements of the cyber feature 163 corresponding to "nominal" operation of the cyber-physical system 100 (and/or CPS network 120 thereof). The anomaly detector 150 may be configured to derive a second membership function 184 from the training measurements of the cyber feature 163. At 830, the anomaly detector 150 may be further configured to utilize the second membership function 184 to determine a cyber state (CS) error metric 167, the CS error metric 167 configured to quantify a degree to which acquired measurements of the cyber feature 163 correspond to the second membership function 184. The anomaly detector 150 may detect "anomalous" behavior and/or operation of the cyber-physical system 100 based, at least in part, on the PS error metric 177 and the CS error metric 167.

Figure 9:
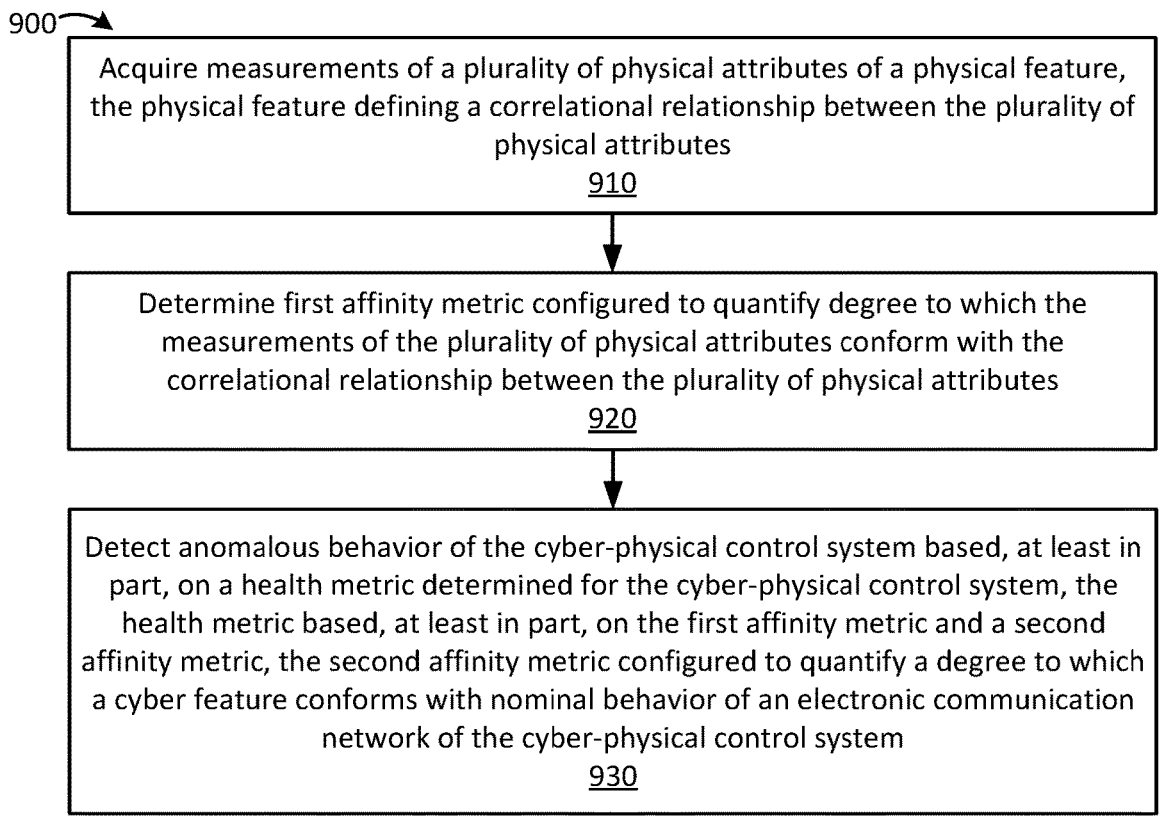
FIG. 9 is a flow diagram illustrating a third example of a method for anomaly detection in cyber-physical systems.

FIG. 9 is a flow diagram illustrating a third example of a method 900 for anomaly detection in cyber-physical systems 100. At 910, a PS monitor 172 may be configured to configured to acquire measurements of a plurality of physical attributes 143 of a cyber-physical system 100, the plurality of physical attributes 143 corresponding to a physical feature 173 that defines a correlational relationship between the plurality of physical attributes 143. The correlational relationship between the plurality of physical attributes 143 may correspond to a physics-based relationship between the plurality of physical attributes (e.g., may be defined by a PCRC 175 of the physical feature 173). The PS monitor 172 may be communicatively coupled to an acquisition device 114 (e.g., a sensor device) through an electronic communication network of the cyber-physical system 100 (e.g., the CPS network 120).

At 920, an anomaly detector 150 may be configured to determine a first affinity metric 185, the first affinity metric 185 configured to quantify a degree to which the measurements of the plurality of physical attributes 143 of the cyber-physical system 100 conform with the correlational relationship between the plurality of physical attributes 143. The anomaly detector 150 may be configured for operation on a processor 133 of an ICSC 130 (and/or processing resources of another computing device, such as the terminal 103 or the like).

The anomaly detector 150 may be further configured to detect "anomalous" behavior of the cyber-physical system 100 at 930 based, at least in part, on a health metric 193 determined for the cyber-physical system 100, the health metric 193 based, at least in part, on the first affinity metric 185 and a second affinity metric 185, the second affinity metric 185 configured to quantify a degree to which a cyber feature 163 conforms with "nominal" behavior of an electronic communication network of the cyber-physical system 100 (e.g., a CPS network 120).

At 930, the anomaly detector 150 may be further configured to determine an estimate of a first physical attribute 143 of the plurality of physical attributes 143 based on measurements of one or more other physical attributes 143 of the plurality of physical attributes 143 and the correlational relationship between the plurality of physical attributes 143 defined by the physical feature 173 (e.g., defined by the PCRC 175 of the physical feature 173). The first affinity metric 185 may be based, at least in part, on an error between the estimate of the first physical attribute 143 and a measurement of the first physical attribute 143.

In some implementations, the anomaly detector 150 is further configured to determine an estimate of a second physical attribute 143 of the plurality of physical attributes 143 based, at least in part, on the measurement of the first physical attribute 143 and the correlational relationship between the plurality of physical attributes 143 defined by the physical feature 173. The first affinity metric 185 may be based, at least in part, on the error between the estimate of the first physical attribute 143 and the measurement of the first physical attribute 143 and an error between the estimate of the second physical attribute 143 and the measurement of the second physical attribute 143.

The anomaly detector 150 may be configured to derive a first membership function 184 from one or more fuzzy sets 183, the one or more fuzzy sets 183 comprising training measurements of the plurality of physical attributes 143, the training measurements configured to characterize "nominal" behavior and/or operation of the cyber-physical system 100. The first membership function 184 may be configured to model an error distribution between respective training measurements of the plurality of physical attributes 143 and the correlational relationship between the plurality of physical attributes defined by the physical feature 173. The anomaly detector 150 may utilize the first membership function 184 to determine the first affinity metric 185.

In some implementations, the anomaly detector 150 further comprises a CS monitor 162. At 920, the CS monitor 162 may be configured to acquire measurements of the cyber feature 163. The anomaly detector 150 may be configured to derive a second membership function 184 from the one or more fuzzy sets 183, the second membership function 184 configured to model a distribution of the cyber feature 163 under "nominal" behavior and/or operation of the cyber-physical system 100. At 930, the anomaly detector 150 may utilize the second membership function 184 to determine the second affinity metric 185.

Figure 10:
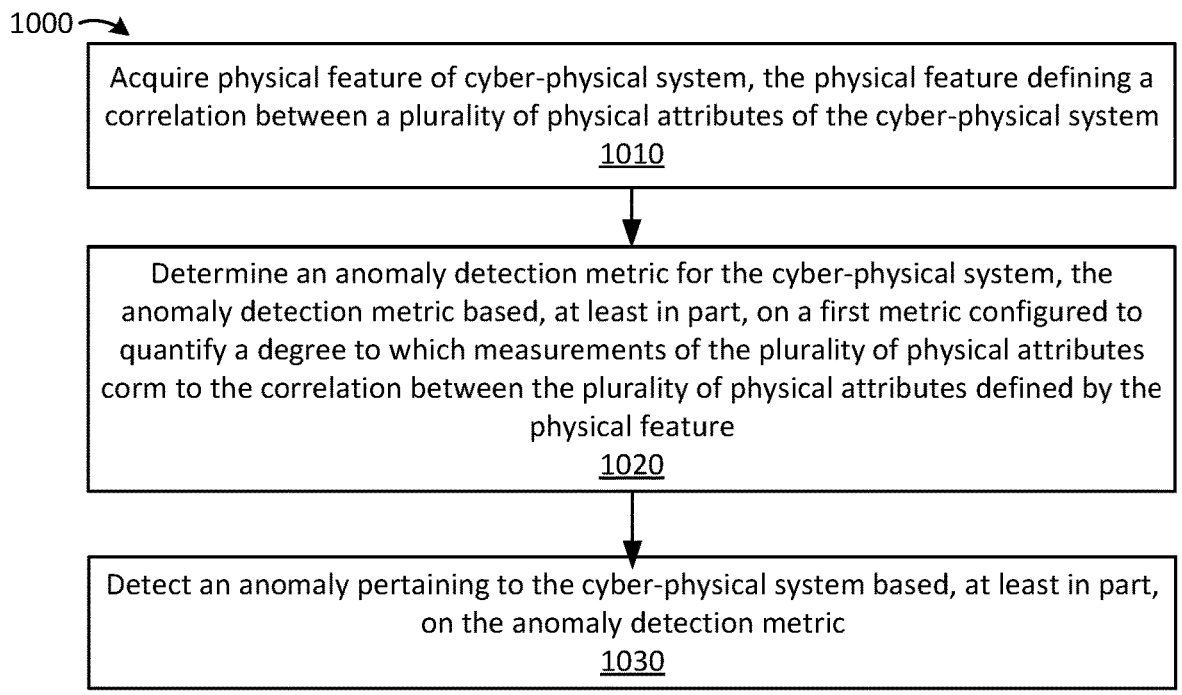
FIG. 10 is a flow diagram illustrating a fourth example of a method for anomaly detection in cyber-physical systems.

FIG. 10 is a flow diagram illustrating a fourth example of a method 1000 for anomaly detection in cyber-physical systems 100, as disclosed herein. Step 1010 may comprise acquiring a physical feature 173 of a cyber-physical system 100, the physical feature 173 defining a correlation between a plurality of physical attributes 143 of the cyber-physical system 100 (e.g., a PCRC 175). At 1010, a PS monitor 162 of an anomaly detector 150 may acquire measurements of the plurality of physical attributes 143 by use of one or more acquisition devices 114. The acquisition devices 114 may be coupled to the process 106 and/or one or more elements 108 of the process 106 controlled by the CPC system 101 of the cyber-physical system 100.

Step 1020 may comprise determining an AD metric 155 for the cyber-physical system 100. The AD metric 155 may be based, at least in part, on a first metric configured to quantify a degree to which measurements of the plurality of physical attributes 143 conform to the correlation between the plurality of physical attributes 143 defined by the physical feature 173 (e.g., quantify a degree to which the plurality of physical attributes 143 of the physical feature 173 conform with the PCRC 175 of the physical feature 173). The first metric may comprise one or more of a PS error metric 177 an affinity metric 185, and/or the like.

At 1020, the anomaly detector 150 may determine an estimate of an estimate of a first physical attribute 143 of the plurality of physical attributes 143 based on a measurement of one or more other physical attributes 143 of the plurality of physical attributes 143 and the correlation between the plurality of physical attributes 143 defined by the physical feature 173. The first metric may be based, at least in part, on a difference between the estimate of the first physical attribute 143 and a measurement of the first physical attribute 143.

In some implementations, step 1020 may further comprise determining an estimate of a second physical attribute 143 of the plurality of physical attributes 143 based, at least in part, on the measurement of the first physical attribute 143 and the correlation between the plurality of physical attributes 143 defined by the physical feature 173. The first metric may be based, at least in part, on the difference between the estimate of the first physical attribute 143 and the measurement of the first physical attribute 143 and a difference between the estimate of the second physical attribute 143 and a measurement of the second physical attribute 143.

Alternatively, or in addition, step 1020 may comprise determining the first metric by use of a membership function 184 determined for the physical feature 173, the membership function 184 configured to model a distribution of physical error metrics of one or more physical attributes 143 of the plurality of physical attributes 143 of the physical feature 173. In one example, the distribution corresponds to "anomalous" operation of the cyber-physical system 100 and the first metric is inversely proportional to the degree to which the physical attributes 143 correspond to the first fuzzy rule 181. In another example, the distribution corresponds to "nominal" operation of the cyber-physical system 100 and the first metric is proportional to the degree to which the physical attributes 143 correspond to the first fuzzy rule 184.

Step 1030 may comprise detecting an anomaly pertaining to the cyber-physical system 100 based, at least in part, on the AD metric 155 determined at 1020. Step 1030 may comprise comparing the AD metric 155 determined at 1020 to one or more thresholds. Alternatively, or in addition, step 1030 may comprise combining the first metric with one or more other metrics (e.g., may comprise combining a plurality of PS error metrics 177 and/or affinity metrics 185).

In some implementations, step 1010 may further comprise acquiring a cyber feature 163. The cyber feature 163 may be acquired by a CS monitor 162 of the anomaly detector 150. The cyber feature 163 may be configured to characterize behavior and/or operation of a cyber state of the CPC system 101 (e.g., characterize behavior and/or operation of the CPS network 120 of the CPC system 101). Step 1020, may further comprise determining a second metric, the second metric based, at least in part, on a degree to which the acquired cyber feature 163 conforms to a second membership function 184. The second membership function 184 may be configured to model a distribution of the cyber feature 163 under "nominal" operation of the cyber-physical system 100. The AD metric 155 determined for the cyber-physical system 100 at 1020 may be based, at least in part, on a combination of the first metric and the second metric (e.g., may be a combination of one or more PS error metrics 177 and CS error metrics 167, a combination of a plurality of affinity metrics 185, and/or the like).

This disclosure has been made with reference to various exemplary embodiments. However, those skilled in the art will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system, e.g., one or more of the steps may be deleted, modified, or combined with other steps.

Additionally, as will be appreciated by one of ordinary skill in the art, principles of the present disclosure may be reflected in a computer program product on a computer-readable storage medium having computer-readable program code means embodied in the storage medium. Any tangible, non-transitory computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a computer-readable memory that can direct a computer or other programmable data processing apparatus to function in a particular manner, such that the instructions stored in the computer-readable memory produce an article of manufacture, including implementing means that implement the function specified. The computer program instructions may also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions specified.

While the principles of this disclosure have been shown in various embodiments, many modifications of structure, arrangements, proportions, elements, materials, and components, which are particularly adapted for a specific environment and operating requirements, may be used without departing from the principles and scope of this disclosure. These and other changes or modifications are intended to be included within the scope of the present disclosure.

The foregoing specification has been described with reference to various embodiments. However, one of ordinary skill in the art will appreciate that various modifications and changes can be made without departing from the scope of the present disclosure. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles. The scope of the present invention should, therefore, be determined only by the following claims.

We claim:

1. A method for anomaly detection in a cyber-physical system (CPS), the method comprising:

deriving a physics-based correlation from a configuration of one or more physical components of the CPS, the physics-based correlation defining a mathematical relationship between a plurality of physical attributes of the CPS, the plurality of physical attributes comprising a first physical attribute and a second physical attribute;

acquiring measurements of respective physical attributes of the plurality of physical attributes from the CPS, the measurements associated with a capture time;

applying the mathematical relationship defined between the plurality of physical attributes to determine an estimated value for the first physical attribute at the capture time based, at least in part, on a measurement of the second physical attribute associated with the capture time;

determining a physical state (PS) error metric for the capture time, the PS error metric configured to quantify deviation of the acquired measurements associated with the capture time from the mathematical relationship defined between the plurality of physical attributes by the physics-based correlation, wherein the PS error metric is based, at least in part, on an error between a measurement of the first physical attribute associated with the capture time and the estimated value of the first physical attribute determined for the capture time; and detecting anomalous behavior of the CPS based, at least in part, on the PS error metric.

2. The method of claim 1, wherein the physics-based correlation is further configured to define a constraint of a first physical attribute of the plurality of physical attributes, and wherein the PS error metric is based, at least in part, on a degree to which the measurement of the first physical attribute conforms with the constraint.

3. The method of claim 1, further comprising receiving measurements of one or more physical attributes of the plurality of physical attributes from a sensor device coupled to a physical process of the CPS.

4. The method of claim 3, wherein:
the estimated value for the first physical attribute at the capture time is based, at least in part, on a measurement of a third physical attribute acquired at the capture time.

5. The method of claim 1, further comprising:
determining an estimate of the second physical attribute of the plurality of physical attributes based, at least in part, on the mathematical relationship defined between the plurality of physical attributes by the physics-based correlation and the measurement of the first physical attribute;
wherein the PS error metric is based, at least in part, on a difference between the estimate of the first physical attribute and the measurement of the first physical attribute and a difference between the estimate of the second physical attribute and a measurement of the second physical attribute.

6. The method of claim 1, further comprising:
determining an error threshold for the physics-based correlation, the error threshold based on a deviation between training measurements of the plurality of physical attributes, the training measurements configured to characterize nominal operation of the CPS; and
detecting the anomalous behavior of the CPS responsive to the PS error metric exceeding the error threshold.

7. The method of claim 1, further comprising:
deriving a first membership function from one or more fuzzy sets, the one or more fuzzy sets corresponding to nominal operation of the CPS and comprising training measurements of the plurality of physical attributes, wherein the first membership function is configured to model a PS error distribution, the PS error distribution corresponding to differences between the training measurements of the plurality of physical attributes and the mathematical relationship defined between the plurality of physical attributes by the physics- based correlation;
acquiring measurements of the plurality of physical attributes; and
utilizing the first membership function to determine the PS error metric, the PS error metric configured to quantify a degree to which the acquired measurements of the physical attributes conform to the PS error distribution of the first membership function.

8. The method of claim 7, wherein the one or more fuzzy sets further comprise training measurements of a cyber feature, the training measurements of the cyber feature corresponding to nominal operation of an electronic communication network of the CPS, the method further comprising:

deriving a second membership function from the training measurements of the cyber feature;
utilizing the second membership function to determine a cyber state (CS) error metric, the CS error metric configured to quantify a degree to which acquired measurements of the cyber feature correspond to the second membership function; and
detecting the anomalous behavior of the CPS based, at least in part, on the PS error metric and the CS error metric.

9. An apparatus for monitoring a CPS, the apparatus comprising:
a processor; and
an anomaly detector configured for operation on the processor, the anomaly detector further configured to:
derive a physics-based correlation from a configuration of one or more physical components of the CPS, the physics-based correlation defining a mathematical relationship between a plurality of physical attributes of the CPS, the plurality of physical attributes comprising a first physical attribute and a second physical attribute;
acquire measurements of respective physical attributes of the plurality of physical attributes from the CPS, the measurements associated with a capture time;
apply the mathematical relationship defined between the plurality of physical attributes to determine an estimated value for the first physical attribute at the capture time based, at least in part, on a measurement of the second physical attribute associated with the capture time;
determine a first affinity metric for the capture time, the first affinity metric configured to quantify a degree to which the acquired measurements associated with the capture time conform to the mathematical relationship defined between the plurality of physical attributes by the physics-based correlation, wherein the first affinity metric is based, at least in part, on an error between a measurement of the first physical attribute associated with the capture time and the estimated value of the first physical attribute determined for the capture time; and
detect anomalous behavior of the CPS based, at least in part, on a health metric determined for the CPS, the health metric based, at least in part, on the first affinity metric and a second affinity metric, the second affinity metric configured to quantify a degree to which a cyber feature conforms with nominal behavior of an electronic communication network of the CPS.

10. The apparatus of claim 9, wherein the physics-based correlation is further configured to define a constraint of the first physical attribute, and wherein the first affinity metric is based, at least in part, on a degree to which the measurement of the first physical attribute conforms with the constraint.

11. The apparatus of claim 9, wherein the anomaly detector is communicatively coupled to a sensor device through the electronic communication network of the CPS.

12. The apparatus of claim 9, wherein:
the estimated value for the first physical attribute at the capture time is based, at least in part, on a measurement of a third physical attribute acquired at the capture time.

13. The apparatus of claim 1, wherein:
the anomaly detector is further configured to determine an estimate of the second physical attribute of the plurality of physical attributes based, at least in part, on the measurement of the first physical attribute and the correlational relationship between the plurality of physical attributes defined by the physics-based correlation; and the first affinity metric is based, at least in part, on the error between the estimate of the first physical attribute and the measurement of the first physical attribute and an error between the estimate of the second physical attribute and the measurement of the second physical attribute.

14. The apparatus of claim 9, wherein the anomaly detector is further configured to:

derive a first membership function from one or more fuzzy sets, the one or more fuzzy sets comprising training measurements of the plurality of physical attributes, the training measurements configured to characterize nominal operation of the CPS, wherein the first membership function is configured to model an error distribution between respective training measurements of the plurality of physical attributes and the correlational relationship between the plurality of physical attributes defined by the physics-based correlation; and utilize the first membership function to determine the first affinity metric.

15. The apparatus of claim 14, further comprising:
a cyber state (CS) monitor configured to acquire measurements of the cyber feature;
wherein the anomaly detector is further configured to:
derive a second membership function from the one or more fuzzy sets, the second membership function configured to model a distribution of the cyber feature under nominal operation of the CPS; and
utilize the second membership function to determine the second affinity metric.

16. A non-transitory computer-readable storage medium comprising instructions configured to cause a processor to implement operations for anomaly detection in a cyber-physical system (CPS), the operations comprising:

deriving a physics-based correlation from a configuration of one or more physical components of the CPS, the physics-based correlation defining a mathematical relationship between a plurality of physical attributes of the CPS, the plurality of physical attributes comprising a first physical attribute and a second physical attribute;

acquiring measurements of respective physical attributes of the plurality of physical attributes from the CPS, the measurements associated with a capture time;

applying the mathematical relationship defined between the plurality of physical attributes to determine an estimated value for the first physical attribute at the capture time based, at least in part, on a measurement of the second physical attribute associated with the capture time;

determining an anomaly detection metric for the capture time, the anomaly metric based, at least in part, on a first metric configured to quantify a degree to which the acquired measurements conform to the mathematical relationship defined between the plurality of physical attributes by the physics-based correlation, the first metric based, at least in part, on an error between a measurement of the first physical attribute associated with the capture time and the estimated value of the first physical attribute determined for the capture time; and detecting an anomaly pertaining to the CPS based, at least in part, on the anomaly detection metric.

17. The non-transitory computer-readable storage medium of claim 16, the operations further comprising receiving measurements of one or more of the plurality of physical attributes of the CPS from one or more sensor devices coupled to a physical process of the CPS.

18. The non-transitory computer-readable storage medium of claim 16, wherein the physics-based correlation is further configured to define a constraint of the first physical attribute and the first metric is based, at least in part, on a degree to which the measurement of the first physical attribute conforms with the constraint.

19. The non-transitory computer-readable storage medium of claim 18, the operations further comprising:

determining an estimate of the second physical attribute for the capture time based, at least in part, on the mathematical relationship defined between the plurality of physical attributes by the physics-based correlation and the measurement of the first physical attribute;

wherein the first metric is based, at least in part, on a difference between the estimate of the first physical attribute and the measurement of the first physical attribute and a difference between the estimate of the second physical attribute and the measurement of the second physical attribute.

20. The non-transitory computer-readable storage medium of claim 16, further comprising:

determining the first metric by use of a membership function determined for the physics-based correlation, the membership function configured to model a distribution of physical error metrics of one or more physical attributes of the plurality of physical attributes of the physics-based correlation, the distribution corresponding to anomalous operation of the CPS, wherein the first metric is inversely proportional to a degree to which measurements of the plurality of physical attributes conform with the membership function.

21. The non-transitory computer-readable storage medium of claim 16, further comprising:

determining the first metric by use of a first membership function determined for the physics-based correlation, the first membership function configured to model a distribution of physical error metrics of one or more physical attributes of the plurality of physical attributes of the physics-based correlation, the distribution corresponding to nominal operation of the CPS, wherein the first metric quantifies a degree to which measurements of the plurality of physical attributes conform with the first membership function.

* * * * *